US005491940A

United States Patent [19]

Bruchu

[11] Patent Number: 5,491,940

[45] Date of Patent: Feb. 20, 1996

[54] METHOD AND APPARATUS FOR MOUNTING WINDOW ON ANGLED SILL

[75] Inventor: Todd W. Bruchu, Lake Elmo, Minn.

[73] Assignee: Andersen Corporation, Bayport, Minn.

[21] Appl. No.: 325,995

[22] Filed: Oct. 19, 1994

[51] Int. Cl.[6] .......................... E06B 1/56

[52] U.S. Cl. .......................... 52/213; 52/214; 52/215; 52/216; 52/217; 52/98; 52/730.3; 52/730.4; 52/730.5; 52/730.6; 52/734.1; 52/734.2; 52/745.16; 49/504

[58] Field of Search .......................... 52/213–217, 98, 52/717.03, 730.3, 730.4, 730.5, 730.6, 734.1, 734.2, 745.16; 49/468, 504–505; 248/188.2, 188.6

[56] References Cited

U.S. PATENT DOCUMENTS

| | | | |
|---|---|---|---|
| 3,859,754 | 1/1975 | Budich et al. . | |
| 4,184,297 | 1/1980 | Casamayor | 52/202 |
| 4,308,704 | 1/1982 | Lloyd | 52/717.03 |
| 4,674,246 | 6/1987 | Giguere . | |
| 5,014,466 | 5/1991 | Winner . | |
| 5,014,486 | 5/1991 | Mayle | 52/717.03 X |
| 5,412,922 | 5/1995 | Vittori et al. | 52/745.16 |

*Primary Examiner*—Carl D. Friedman
*Assistant Examiner*—Christopher Todd Kent
*Attorney, Agent, or Firm*—Merchant, Gould, Smith, Edell, Welter & Schmidt

[57] ABSTRACT

The present invention provides a variable angle wedge that supports a replacement window and compensates for whatever sill angle exists on the previous window frame. A flange opposite the variable angle extends between a window engaging member and a sill engaging member. The angle defined between the window engaging member and the sill engaging member can be decreased by removing a distal portion of the flange.

20 Claims, 39 Drawing Sheets

702

FIG.42
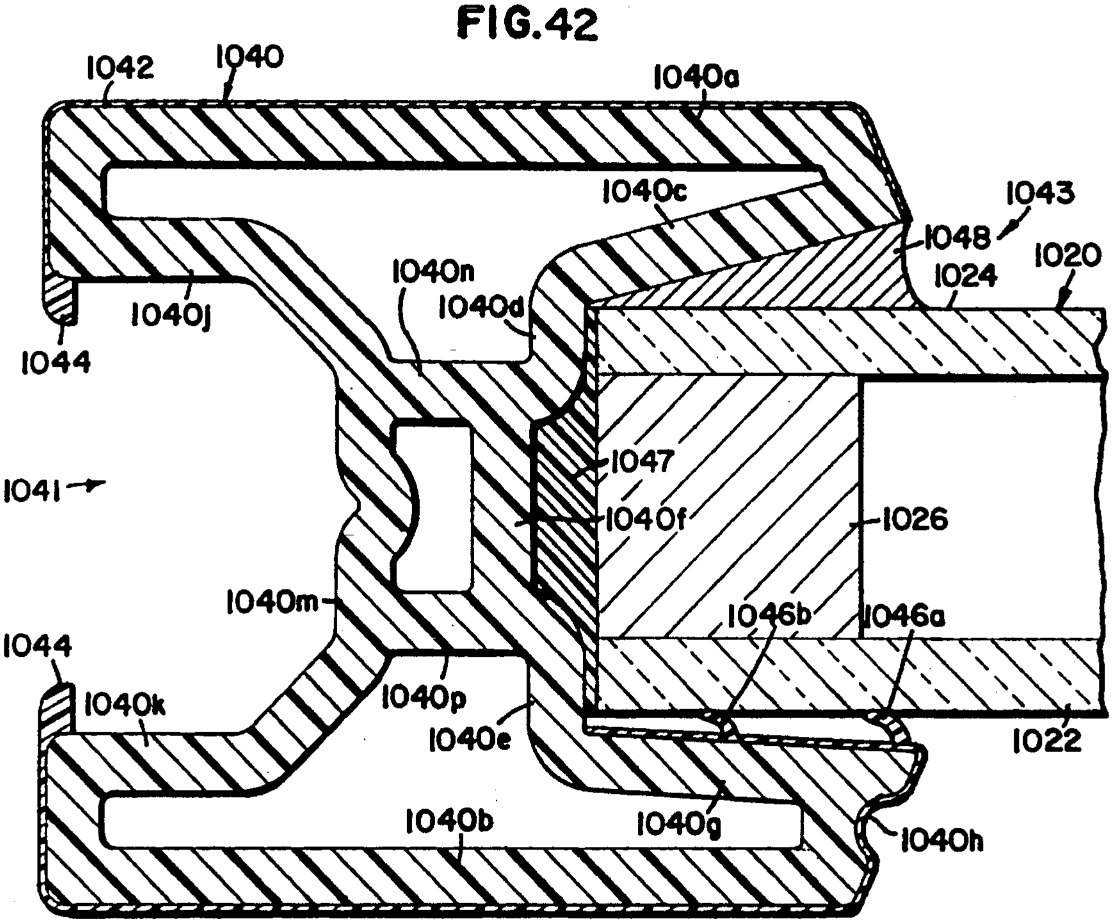
FIG.43
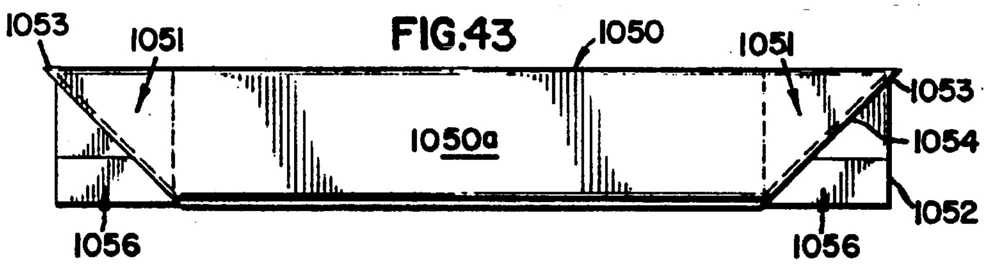
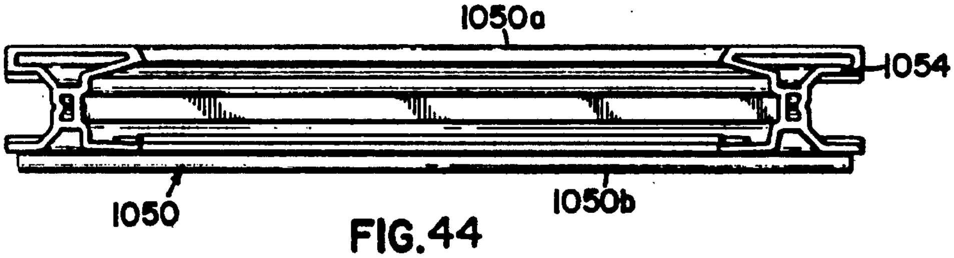
FIG.44

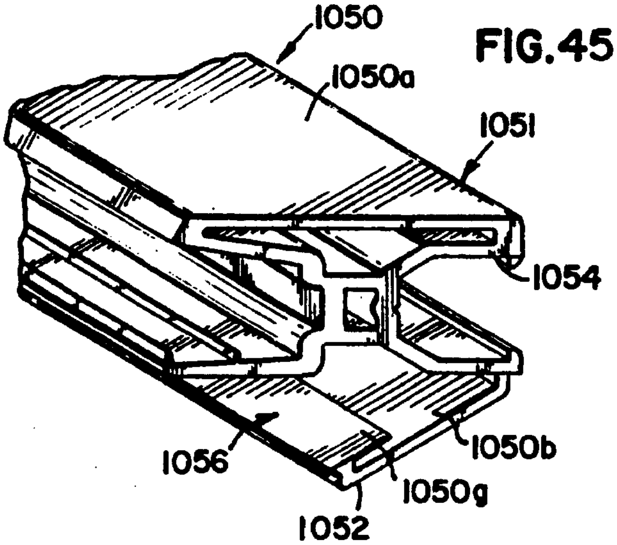
FIG.45
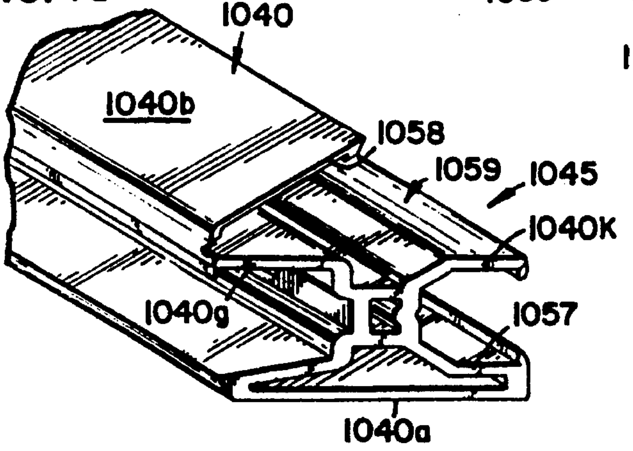
FIG.48
FIG.46
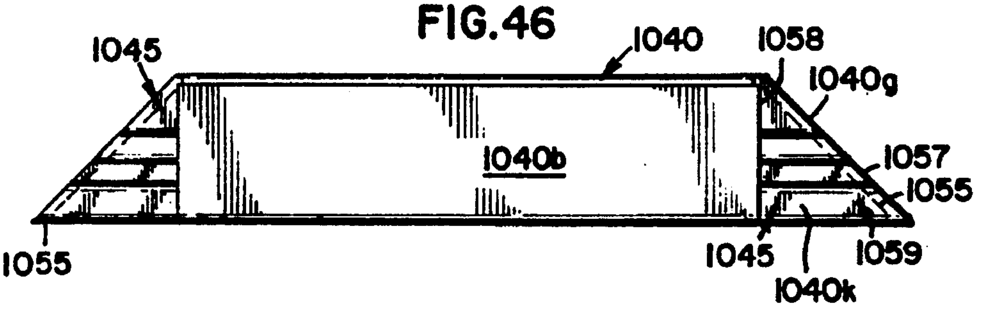
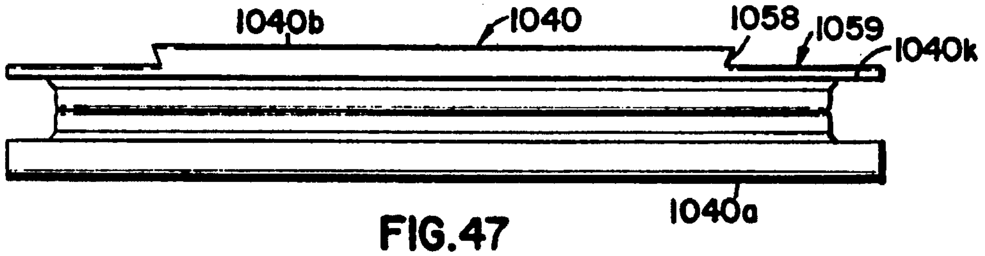
FIG.47

FIG. 54
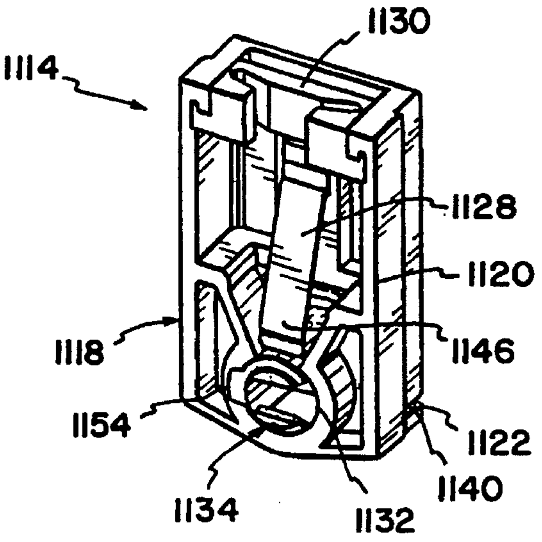
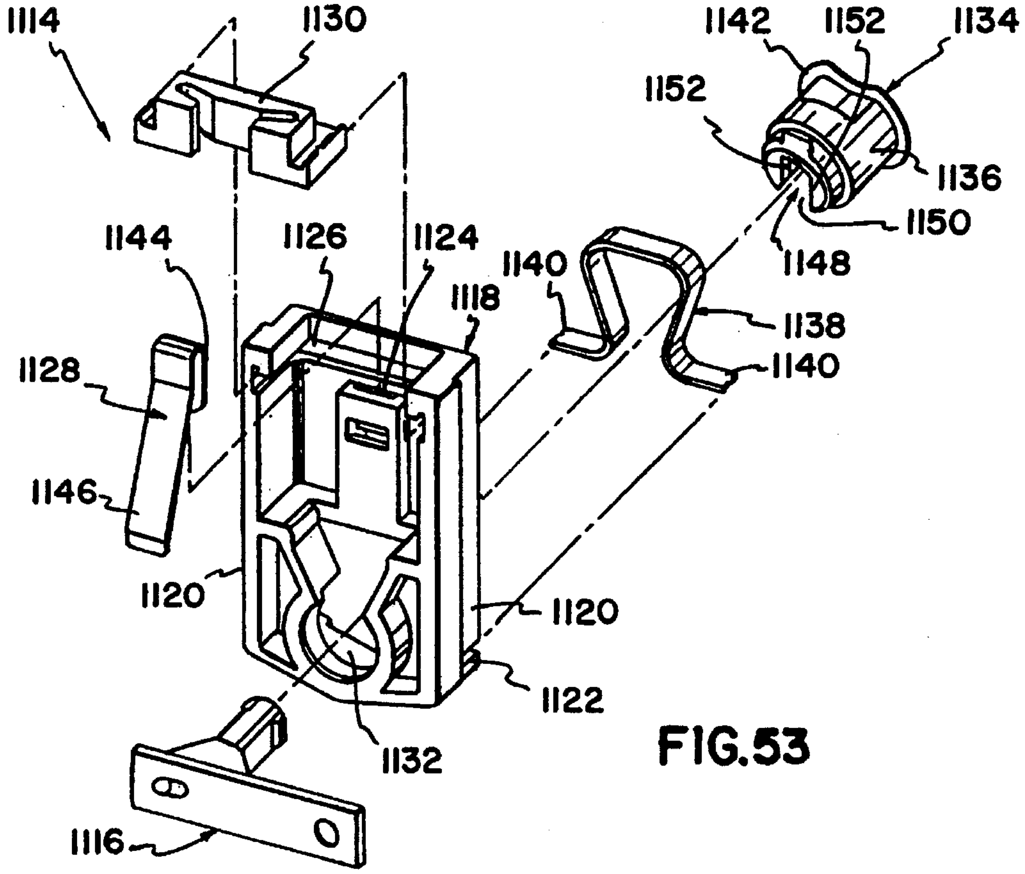
FIG.53

METHOD AND APPARATUS FOR MOUNTING WINDOW ON ANGLED SILL

FIELD OF THE INVENTION

The present invention relates to windows and more particularly, to installation of a replacement window within a framed opening having a sill disposed at an angle relative to horizontal.

BACKGROUND OF THE INVENTION

Many technological improvements in window and door design have been made available over the last several years. For instance, the insulating properties of newer window constructions are greatly improved over older window constructions, which can often provide significant energy cost savings to property owners. Consequently, a significant need has developed for replacing windows and doors during remodeling of older homes and buildings with newer, more efficient components.

One type of window replacement is referred to in the industry as "pocket replacement" of windows. In this application, the existing window is removed from its frame by removing enough molding on one side of the window to gain access to the full dimensions of the rough opening. One advantage of this application is that many of the trim pieces are left intact. However, many older windows have sills built into the wall at an angle relative to horizontal, and most newer windows are designed to be installed on a horizontal surface. According, there exists a need for replacement window structure that accommodates the sill angle of older window assemblies, so that the replacement window is securely supported by the preexisting sill and a satisfactory seal is formed therebetween.

SUMMARY OF THE INVENTION

The present invention provides a variable angle wedge that supports a replacement window and compensates for whatever sill angle exists on the previous window frame. A flange opposite the variable angle of the wedge extends between a window engaging member and a sill engaging member. The angle defined between the window engaging member and the sill engaging member can be decreased by removing a distal portion of the flange. An advantage of the present invention is that the same type of window frame suitable for other applications, such as new construction or window in/window out replacement, can be used for pocket replacement windows. The variable angle wedge is cost effective to manufacture and install and reliable in use. These advantages and others will become apparent upon a more detailed description of the preferred embodiment.

BRIEF DESCRIPTION OF THE DRAWING

With reference to the Figures of the Drawing, wherein like numerals represent like parts and assemblies throughout the several views.

FIG. 42 is a cross-sectional view of the profile of a rail sash member in the sash of FIG. 41, taken along line 2—2;

FIG. 43 is an elevational view of an exterior side of a stile sash member in the sash of FIGS. 40–41;

FIG. 44 is an elevational view of an inner side of the stile sash member of FIG. 43, showing the glass receiving channel formed therein;

FIG. 45 is a perspective view of one end of the stile sash member of FIG. 43, showing the flange disposed on the interior side thereof;

FIG. 46 is an elevational view of an interior side of a rail sash member in the sash of FIGS. 40–41;

FIG. 47 is an elevational view of an outer side of the rail sash member of FIG. 40, showing the outer channel formed thereon;

FIG. 48 is a perspective view of one end of the rail sash member of FIG. 46, showing the recess formed thereon;

FIG. 51 is a perspective view of a heating platen consistent with the invention, shown disposed between opposing stile and rail sash members (in phantom) prior to the heat welding operation;

FIG. 53 is an exploded perspective view of a sliding locking block with a pivot;

FIG. 54 is a perspective view of the sliding locking block shown in FIG. 53, depicted in an assembled state and without the pivot;

DETAILED DESCRIPTION OF A PREFERRED EMBODIMENT

Figure 1:
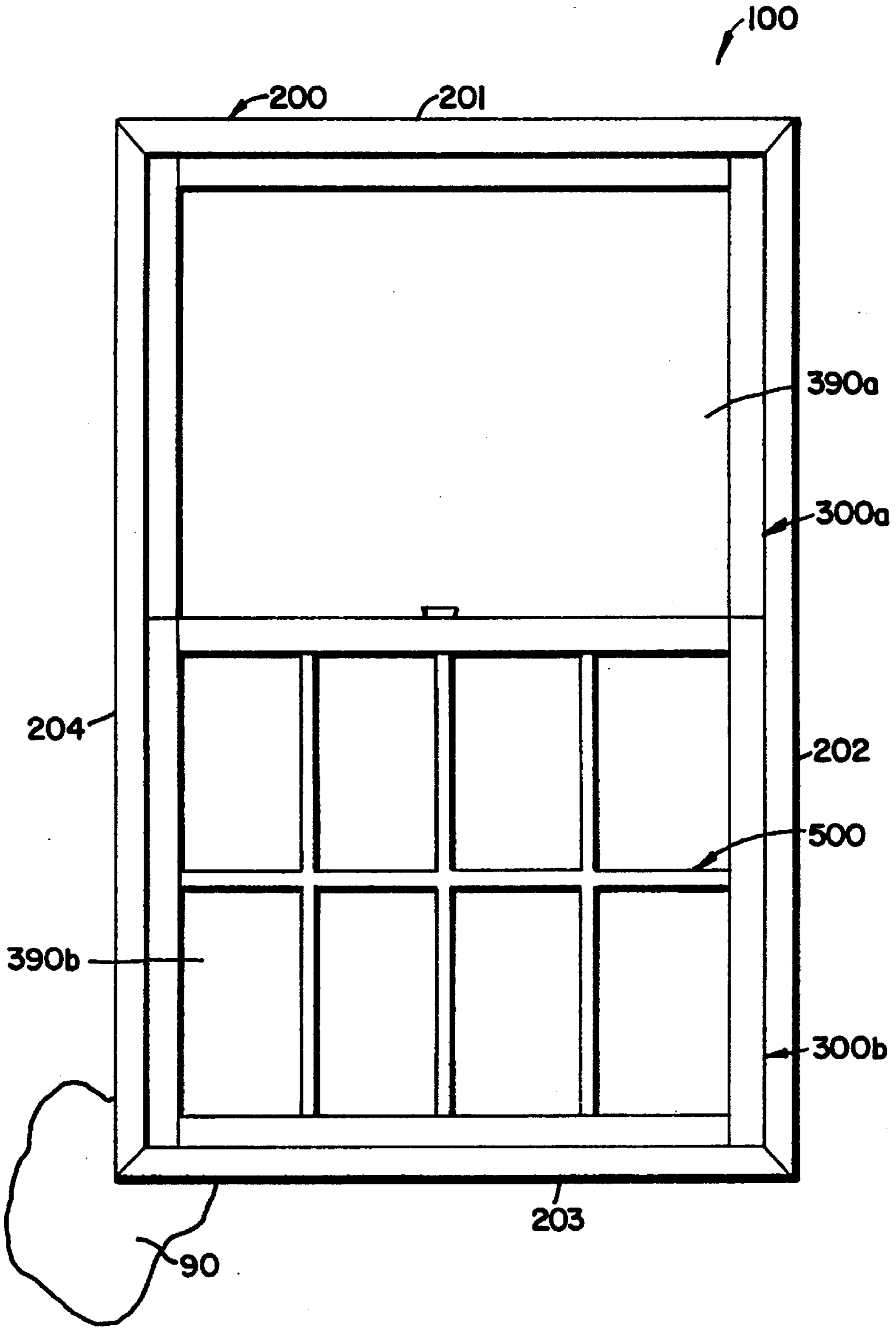
FIG. 1 is a front view of a preferred embodiment double hung window assembly constructed according to the principles of the present invention (as viewed from an interior side of the window assembly)

A preferred embodiment double-hung window unit constructed according to the principles of the present invention is designated as 100 in FIG. 1. The window 100 generally includes a window frame 200, an upper sash **300*a*, and a lower sash 300*b*. The window frame 200 is secured relative to a wall 90. The lower sash 300***a* and the upper sash 300*b* are slideably mounted within the window frame 200.

Window Frame

The window frame 200 includes four window frame members 201–204 that are secured end to end at right angles relative to one another to form the window frame 200. Each of the four window frame members 201–204 is an extrusion of a composite material including wood and polyvinyl chloride, and each has the cross-sectional profile 210 shown in FIG. 2. The window frame members 201–204 are welded to one another by applying heat until a bond forms between some of the polyvinyl chloride in each of two adjacent members.

Figure 2:
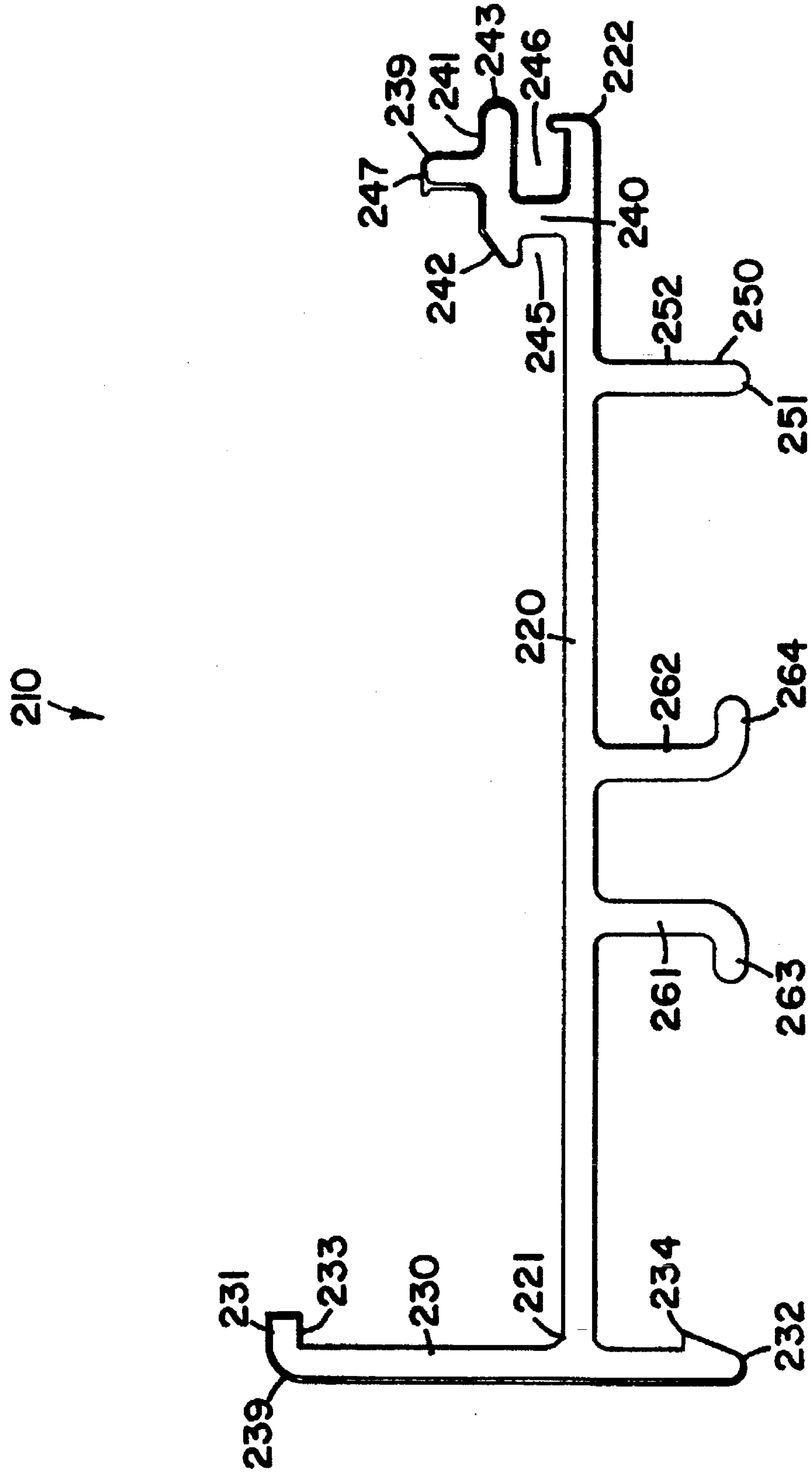
FIG. 2 is a profile or sectioned side view of a preferred embodiment window frame constructed according to the principles of the present invention.

As shown in FIG. 2, the profile 210 includes a main beam 220 that extends between a first end 221 and a second end 222. The first end 221 is proximate the interior side of the frame, and the second end 222 is proximate the exterior side of the frame. An endwall 230 is integrally joined to the first end 221 and extends perpendicular to the main beam 220. The endwall 230 is coated or otherwise covered with an aesthetically pleasing and weather resistant material 239 that presents and maintains a finished appearance. The endwall 230 extends away from the main beam 220 toward a first end 231 on the sash side of the frame 200, and the endwall 230 also extends in an opposite direction away from the main beam 220 and toward a second end 232 on the jamb side of the frame 200. A lip 233 extends perpendicularly from the first end 231 toward the exterior side of the frame 200. Also, the first end 231 is rounded on the interior side of the frame 200 and thereby enhances the finished appearance of the frame 200 as viewed from the interior side of the window assembly 100. A shoulder 234 extends from the endwall 230 proximate the second end 232 and toward the exterior side of the frame 200.

The second end 222 of the main beam 220 is rounded on the jamb side of the frame 200. A relatively short distance inward from the second end 222, toward the interior side of the frame 200, a stem 240 is integrally joined to the main beam 220 and extends perpendicularly from the sash side of the frame 200. At an end opposite the main beam 220, the stem 240 is integrally joined to a flange 241 that extends perpendicular to the stem 240 and parallel to the main beam 220. The flange 241 extends inward to a first, pointed end 242 and outward to a second, rounded end 243. The first end 242 is beveled inward and toward the main beam 220 and terminates in a rounded point. The main beam 220, the stem 240, and the first, pointed end 242 of the flange 241 cooperate to define a substantially U-shaped border about a groove 245 that faces or opens toward the interior side of the frame. The main beam 220, the stem 240, and the second end 243 of the flange 241 cooperate to define a substantially U-shaped border about a groove 246 that faces or opens toward the exterior of the frame. A screen supporting flange 247 is integrally joined to the flange 241 and extends perpendicularly from the sash side of the flange 241. Relative to the stem 240, the flange 247 is offset toward the exterior side of the frame.

A relatively short distance inward from the stem 240, toward the interior side of the frame 200, an exterior trim supporting flange 250 is integrally joined to the main beam 220 and extends from the jamb side thereof to a rounded, distal end 251. The flange 250 is linear and extends perpendicularly away from the main beam 220. The flange 250 presents an exterior facing surface 252 against which an exterior trim piece may abut. An aesthetically pleasing and weather resistant material 249 is disposed about the main beam 220 from a point proximate the flange 250 outward to the second end 222 and all the way about the components supported on the stem 240, terminating proximate the pointed, first end 242 of the flange 240.

Intermediate the endwall 230 and the flange 250, a pair of legs 261 and 262 are integrally joined to the main beam 220 and extend from the jamb side thereof. The legs 261 and 262 are mirror images of one another and extend perpendicularly away from the main beam 220. A foot 263 extends from a distal end of the leg 261, and a foot 264 extends from a distal end of the leg 262. The feet 263 and 264 extend in opposite directions away from one another. Various functions of the frame 200 and its components are discussed below with reference to different applications of the present invention.

Sill Liner

Figure 3:
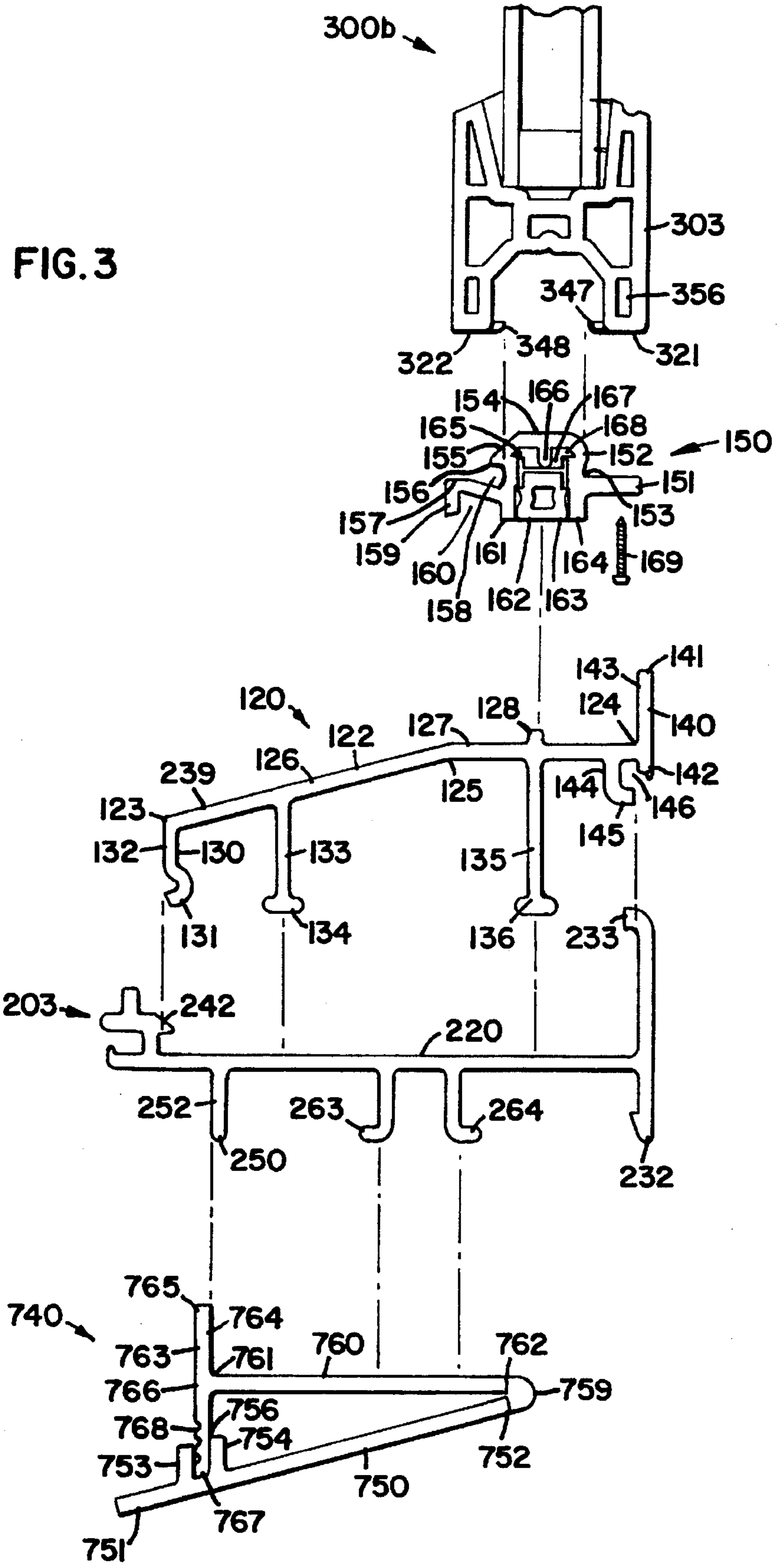
FIG. 3 is a profile or sectioned side view of preferred embodiment lower sash and sill jamb components constructed according to the principles of the present invention.

A sill liner 120 is secured to the lower or sill frame member 203 to form a sill for the window 100. As shown in FIG. 3, the profile of the sill liner 120 includes a main beam 122 that extends between a first end 123 and a second end 124. An angle or elbow 125 in the main beam 122 divides the beam into an outwardly and downwardly sloping portion 126 and a horizontal portion 127 on which the lower sash 300*b* comes to rest. A nub 128 projects up from the horizontal portion 127 and engages weather strip 162 in a bottom rail filler 150 on the lower sash 300*b* when the lower sash is closed against the sill liner 120.

An outwardmost flange 130 is integrally joined to the first or outwardmost end 123 of the main beam 122 and extends downward therefrom. The flange 130 terminates in an outwardly open hook 131 sized and configured to mate with the rounded point 242 on the frame member 203 (having the profile 210). The flange 130 also provides an outwardly facing surface 132 that cooperates with other structure to retain a screen 40 relative to the window frame 200, as discussed below.

Intermediate the outwardmost end 123 and the elbow 125, a leg 133 is integrally joined to the main beam 122 and extends downward therefrom. The leg 133 terminates in a foot 134 designed to rest upon the main beam 220 of the frame member 203. Beneath the nub 128, a second, longer leg 135 is integrally joined to the main beam 122 and extends downward therefrom. The leg 135 extends substantially perpendicular from the horizontal portion 127 of the main beam 122 and substantially parallel to the first leg 133. The leg 135 terminates in a foot 136 designed to rest upon the main beam 220 of the frame member 203. The feet 134 and 136 engage the main beam 220 on opposite sides of the legs 261 and 262 extending downward from the main beam 220 to the head jamb.

An inwardmost flange 140 is integrally joined to the second end 124 of the main beam 122. The flange 140 extends from a second end 142 just beneath the main beam 122 to a first end 141 at a relatively greater distance above the beam. The portion of the flange 140 extending above the beam 122 provides an outwardly directed surface 143 behind which the lower sash member 300*b* comes to rest. A relatively short distance from the second end 124, toward the exterior side of the window assembly 100, a frame engaging flange 144 is integrally joined to the main beam 122 and extends downward therefrom. The flange 144 terminates in a lip 145 directed toward the interior side of the window 100 assembly. The lip 145, the flange 144, the second end 142 of the inwardmost flange 140, and the interconnecting portion of the beam 122 cooperate to define a generally rectangular channel 146 that opens at its lowermost and innermost corner. In other words, the channel 146 is completely closed on its upward and outward sides and partially closed on its downward and inward sides. The channel 146 is sized and configured to mate with the lip 233 on the frame profile 210. To assemble the sill portion of the window 100, the channel 146 and the lip 233 are interlocked, and then the hooked end 131 is guided along and beyond the beveled edge of the pointed end 242 and into snap fitting interengagement therewith.

An aesthetically pleasing and weather resistant material 239 is disposed on the sill liner 120 from the outwardly facing portion 132 of the hooked end 131, up to and over the beam 122, and about and to the lower end 142 of the inwardmost flange 140.

Head Liner

Figure 4:
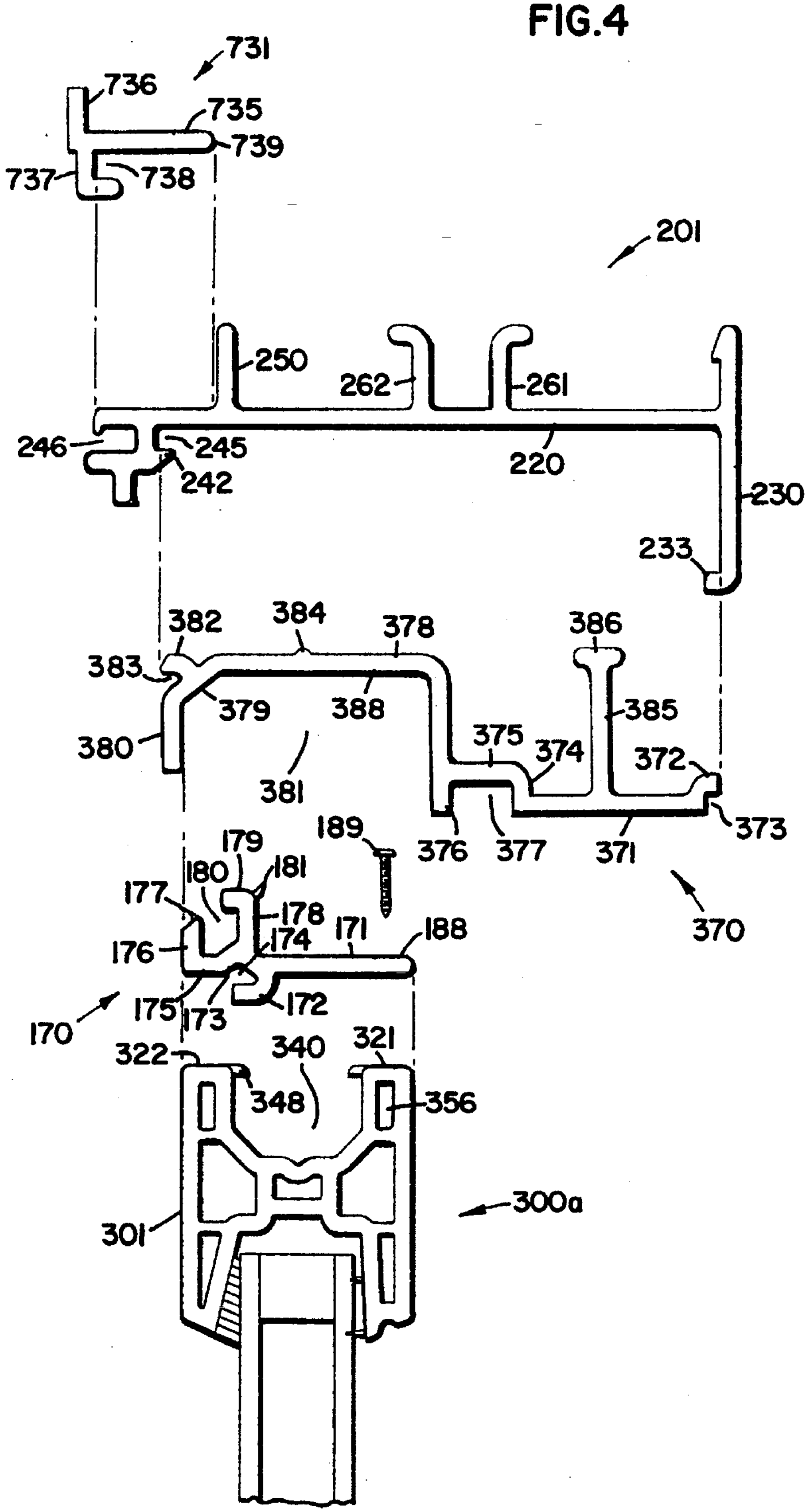
FIG. 4 is a profile or sectioned side view of preferred embodiment upper sash and head jamb components constructed according to the principles of the present invention and shown in projection relative to one another.

A head liner 370 is secured to the upper frame member 201 (having the profile 210). As shown in FIG. 4, the profile of the head liner 370 includes a beam 371 which extends laterally toward the interior side of the window assembly 100 and terminates in a shoulder 372 that cooperates with the beam 371 to define an interior corner 373, which interengages with the lip 233 on the frame member 201. The beam 371 extends in an opposite direction, toward the exterior side of the window assembly 100, and integrally joins a standoff 374, which extends substantially upward, perpendicular from the beam 371. The standoff 374 extends into and integrally joins a base 375, which extends substantially perpendicular away from the standoff 374 and toward the exterior side of the window assembly 100. The base 375 extends into and integrally joins an intermediate wall 376, which extends substantially perpendicular downward from the base 375 to a distal end, and substantially perpendicular upward from the base 375, as well. The standoff 374 and the intermediate wall 376 form opposing sidewalls of a first downwardly open channel 377, which is also bordered by the first base 375. The intermediate wall 376 extends upward into and integrally joins a second base 378, which extends substantially perpendicular away from the intermediate wall 376 and toward the exterior side of the window assembly 100.

The second base 378 extends into and integrally joins a channel member 379, which extends at an angle of approximately 135 degrees away from the second base 378, downward and toward the exterior side of the window assembly 100. The channel member 379 extends into and integrally joins an end wall 380, which extends downward away from the channel member 379 to a distal end. The end wall 380 is substantially perpendicular to the second base 378. The end wall 380 and the intermediate wall 376 form opposing sidewalls of a second downwardly open channel 381, which is also bordered by the channel member 379 and the second base 378. A tab 382 extends outward and upward from a side of the channel member 379 opposite the channel 381. The tab 382 cooperates with the channel member 379 to define a notch 383 that opens toward the exterior side of the window assembly 100. The notch 383 is sized and configured to receive the pointed end 242 on the frame member 201. To assemble the head portion of the window 100, the shoulder 372 and the lip 233 are interlocked, and then the tab 382 is guided along and beyond the beveled edge of the pointed end 242 and into snap fitting interengagement therewith.

A nub 384 projects upward from the second base 378 and engages the main beam 220 of the frame member 201. A leg 385 extends upward from the beam 371 and terminates in a foot 386, which also engages the main beam 220 when the head liner 370 is secured to the frame member 201. The nub 384 and the foot 386 engage the main beam 220 on opposite sides of the legs 261 and 262 extending from the main beam 220 to the head jamb. The window assembly 100 is secured relative to a head jamb by means of screws that are threaded into and through the first base 375 and the main beam 220, between the legs 261 and 262. The first channel 377 provides a recessed area that shelters the heads of the screws.

Window Sash

Figure 5:
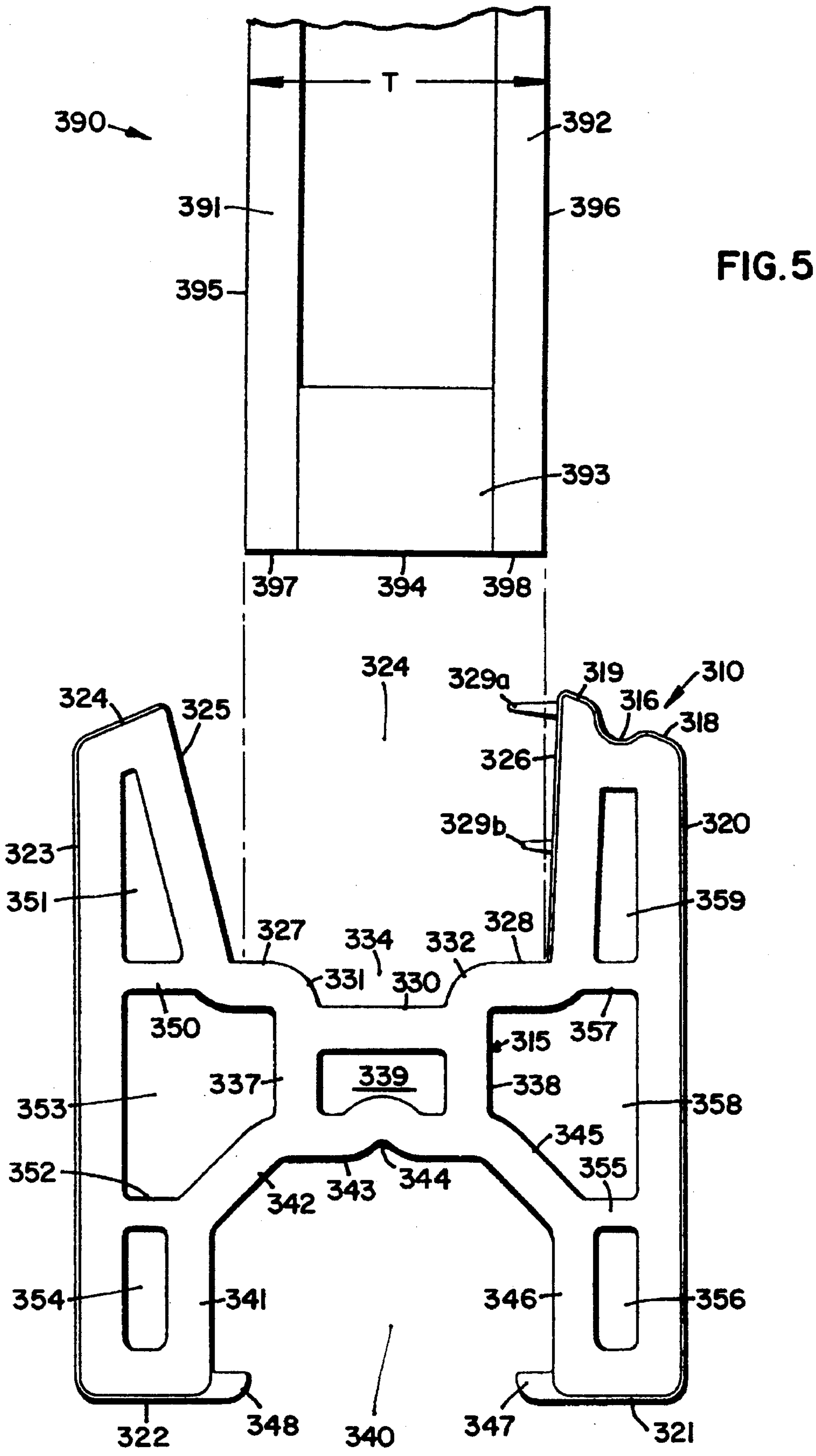
FIG. 5 is a profile or sectioned side view of a preferred embodiment window sash and glass panel constructed according to the principles of the present invention and shown in projection relative to one another.

Each of the window sashes **300*a* and 300*b* includes four window sash members 301–304 that are secured end to end at right angles relative to one another to support a glass panel 390. As shown in FIG. 5, each glass panel 390 includes an exterior pane of glass 391 and an interior pane of glass 392 secured in parallel, side by side relationship to one another by a seal 393 that extends about a perimeter 394 of the glass panel 390. The seal 393 cooperates with the edges 397 and 398 of the glass panes to define a sidewall about the perimeter 394 of the glass panel. The glass panel 390 may also be said to have an exterior face 395, and an interior face 396**, which define a thickness T therebetween.

Each of the four window sash members 301–304 is an extrusion of a composite material including wood and polyvinyl chloride, and each has the cross-sectional profile 310 shown in FIG. 5. The window sash members 301–304 are welded to one another by applying heat until a bond forms between some of the polyvinyl chloride in each of two adjacent members.

As shown in FIG. 5, the profile 310 is generally H-shaped, having an exterior wall 323, an interior wall 320, and an intermediate structure 315 extending transversely therebetween. These components cooperate to define a substantially U-shaped channel 324 that opens inward, toward the glass panel 390, and a substantially U-shaped channel 340 that opens outward, away from the glass panel 390 and toward the frame 200. The exterior wall 323 and the interior wall 320 extend substantially parallel to the glass panes 391 and 392.

A first internal bridge 350 is integrally joined to the exterior wall 323 nearer an inward end thereof. A second internal bridge 352 is integrally joined to the exterior wall 323 nearer an outward or frameward end thereof. The bridges 350 and 352 are spaced approximately as far apart from one another as from their respective ends of the exterior wall 323. The bridges 350 and 352 extend substantially parallel to one another from the exterior wall 323 toward the interior wall 320. The bridge 350 extends into and integrally joins a glass engaging sidewall 325 that borders the inwardly opening channel 324. The sidewall 325 extends inward from the bridge 350, away from the frame 200, and at an angle between five and fifteen degrees away from the exterior face 395 of the glass panel 390. An inward wall 324 extends between and integrally joins an opposite end of the sidewall 325 and the inward end of the exterior wall 323. The exterior wall 324 slopes downward away from the glass panel 390. The sidewall 325 and the exterior wall 323 converge toward the inward wall 324 and thereby define a substantially V-shaped member that overlies a portion of the exterior face 395 of the glass panel 390. This V-shaped portion cooperates with the first bridge 350 to define a substantially triangular compartment 351 therebetween.

A shoulder 327 is integrally joined to the juncture between the bridge 350 and the sidewall 325. The shoulder 327 extends from this juncture as a relatively thicker linear extension of the bridge 350. The shoulder 327 extends into and integrally joins a nested sidewall 331, which extends substantially perpendicular from the shoulder 327 and toward the frame 200. The sidewall 331 extends into and integrally joins a first base 330, which extends substantially perpendicular to the sidewall 331 and toward the interior wall 320. A third internal bridge 337 extends beyond the juncture between the sidewall 331 and the first base 330 as a linear extension of the sidewall 331. The third internal bridge 337 extends into and integrally joins a second base 343, which extends substantially perpendicular to the third bridge 337 and toward the interior wall 320.

A channel member 342 is integrally joined to the juncture between the third internal bridge 337 and the second base 343. The channel member 342 extends from this juncture toward the frame 200 and toward the exterior wall 323, at angles of approximately 135 degrees relative to the third bridge 337 and relative to the second base 343. The channel member 342 extends into and integrally joins an end of the second bridge 352 opposite the exterior wall 323. The channel member 342, the second bridge 352, the exterior wall 323, the first bridge 350, the shoulder 327, and the third bridge 337 cooperate to define a second compartment 353.

Figure 6:
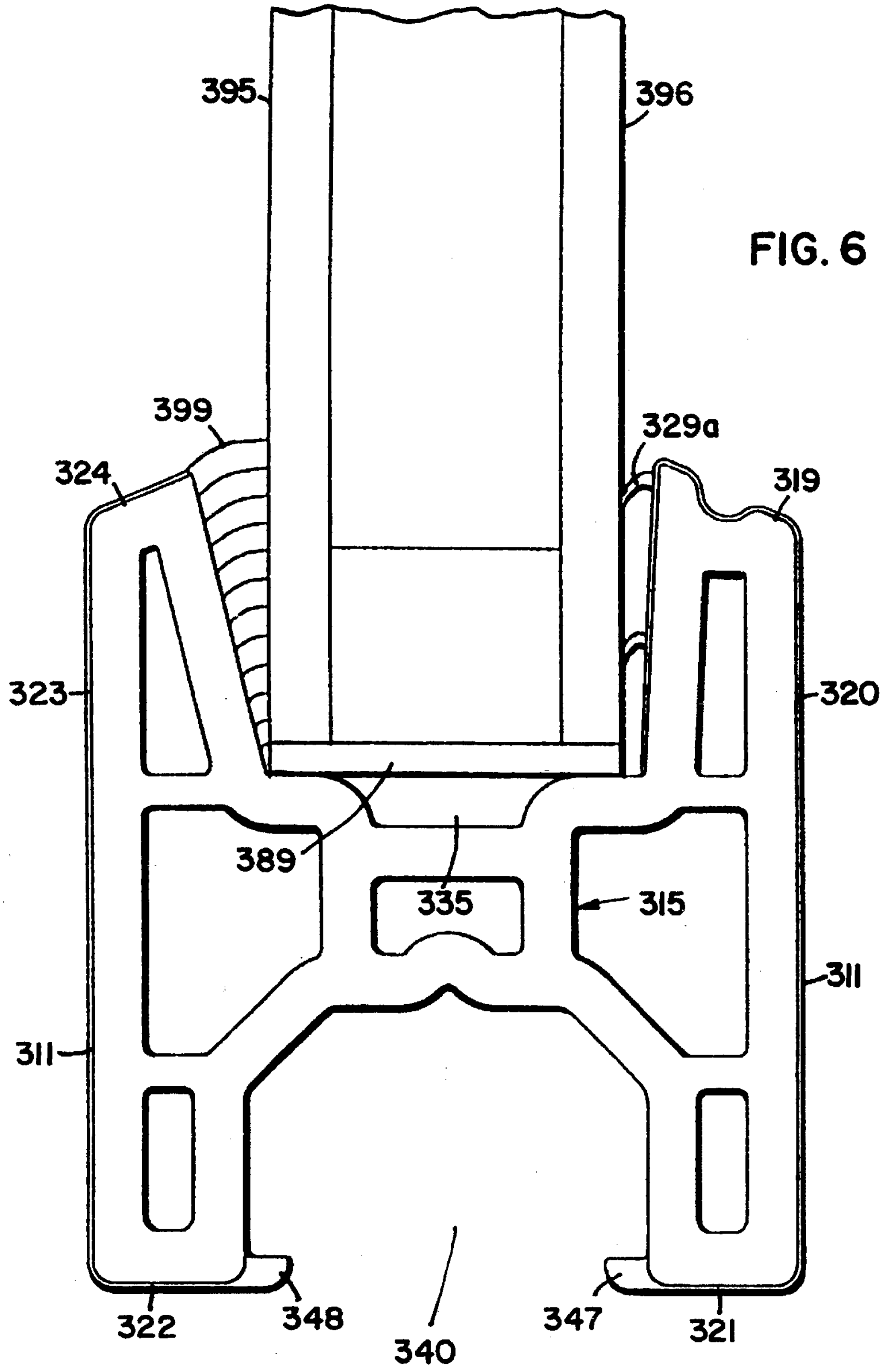
FIG. 6 is a profile or sectioned side view of a preferred embodiment window sash and glass panel constructed according to the principles of the present invention and shown assembled to one another.

A sidewall 341 is integrally joined to the juncture between the channel member 342 and the second bridge 352. The sidewall 341 extends from this juncture toward the frame and substantially perpendicular to the second bridge 352. The sidewall 341 extends into and integrally joins an outward or frameward wall 322, which integrally interconnects the sidewall 341 and the frameward end of the exterior wall 323 and extends substantially perpendicular to both. The frameward wall 322, the exterior wall 323, the second bridge 352, and the sidewall 341 cooperate to define a third, substantially rectangular compartment 354. As shown in FIG. 6, a weather resistant, aesthetically pleasing coating 311 is disposed on the exteriors of the inward wall 324, the exterior wall 323, and the frameward wall 322. A relatively thicker tab 348 of the coating 311 projects beyond the frameward wall 322 and across a portion of the channel 340.

In several respects, the profile 310 is symmetrical about a line centered between the exterior wall 323 and the interior wall 320. In this regard, a fourth internal bridge 357 is integrally joined to the interior wall 320 nearer an inward end thereof, and a fifth internal bridge 355 is integrally joined to the interior wall 320 nearer an outward or frameward end thereof. The bridges 355 and 357 are spaced approximately as far apart from one another as from their respective ends of the interior wall 320. The bridges 355 and 357 extend substantially parallel to one another from the interior wall 320 toward the exterior wall 323. The fourth bridge 357 extends into and integrally joins a glass engaging sidewall 326 that borders the inwardly opening channel 324. The sidewall 326 is not a mirror image of the sidewall 325, but rather, the sidewall 326 extends inward from the fourth bridge 357, away from the frame 200, and defines an angle of less than five degrees relative to the exterior face 395 of the glass panel 390.

An interior wall 319 extends between and integrally joins an opposite end of the sidewall 326 and the inward end of the interior wall 320. The interior wall 319 is not a mirror image of the inward wall 324, but rather, has a groove 316 formed therein. The sidewall 326 and the interior wall 320 extend approximately parallel to one another and extend from opposite ends of the interior wall 319 to define a substantially U-shaped member that overlies a portion of the interior face 396 of the glass panel 390. This U-shaped member cooperates with the fourth bridge 357 to define a fourth, substantially rectangular compartment 359 therebetween.

A shoulder 328 is integrally joined to the juncture between the fourth bridge 357 and the sidewall 326. The shoulder 328 extends from this juncture as a relatively thicker linear extension of the fourth bridge 357. The shoulder 328 extends into and integrally joins a nested sidewall 332, which extends substantially perpendicular from the shoulder 328 and toward the frame 200. The sidewall 332 extends into and integrally joins the first base 330, which extends substantially perpendicular to the sidewall 332 and toward the corresponding sidewall 331. A sixth internal bridge 338 extends beyond the juncture between the sidewall 332 and the first base 330 as a linear extension of the sidewall 332. The sixth bridge 338 extends into and integrally joins the second base 343, which extends substantially perpendicular to the sixth bridge 338 and toward the corresponding third bridge 337.

A channel member 345 is integrally joined to the juncture between the sixth bridge 338 and the second base 343. The channel member 345 extends from this juncture toward the frame 200 and toward the interior wall 320, at angles of approximately 135 degrees relative to the sixth bridge 338 and the second base 343. The channel member 345 extends into and integrally joins an end of the fifth bridge 355 opposite the interior wall 320. The channel member 345, the fifth bridge 355, the interior wall 320, the fourth bridge 357, the shoulder 328, and the sixth bridge 338 cooperate to define a fifth compartment 358.

A sidewall 346 is integrally joined to the juncture between the channel member 345 and the fifth bridge 355. The sidewall 346 extends from this juncture toward the frame and substantially perpendicular to the fifth bridge 355. The sidewall 346 extends into and integrally joins a frameward wall 321, which integrally interconnects the sidewall 346 and the frameward end of the interior wall 320 and extends substantially perpendicular to both. The frameward wall 321, the interior wall 320, the fifth bridge 355, and the sidewall 346 cooperate to define a sixth, substantially rectangular compartment 356. As shown in FIG. 6, a weather resistant, aesthetically pleasing coating 311 is disposed on the exteriors of the sidewall 326, the interior wall 319, the interior wall 320, and the frameward wall 321. A relatively thicker tab 347 of the coating 311 projects beyond the frameward wall 321 and across a portion of the channel 340.

The substantially rectangular compartments 354, 356, and 359 provide surprisingly effective chases for screws that secure hardware relative to the sash members, particularly since the composite material from which the sash members are made is relatively rigid and thus, is generally not well suited for receiving nails or screws transverse to its surface. Tests have shown that screws threaded into the length of such a compartment are more secure than identical screws threaded into pine wood.

The third bridge 337 and the sixth bridge 338 are equal in length and extend parallel to one another. The first base 330 and the second base 343 are equal in length and extend parallel to one another. The third bridge 337, the first base 330, the sixth bridge 338, and the second base 343 cooperate to define a seventh, substantially rectangular compartment 339 which interconnects the exterior and interior portions of the sash profile 310. A dimple 344 is formed at the midpoint of the second base 343 to serve as a pilot for receiving the pointed ends of screws.

The nested sidewalls 331 and 332 and the first base 330 cooperate to define a substantially U-shaped channel 334. The sidewalls 325 and 326 and the shoulders 327 and 328 cooperate with the U-shaped channel 334 to define the larger U-shaped channel 324. The sidewall 325 functions to retain the exterior face 395 of the glass panel 390. The sidewall 326 functions to retain the interior face 396 of the glass panel 390.

The width of the channel 324 is defined by the distance between the sidewalls 325 and 326, which are spaced sufficiently far apart to receive the glass panel 390. In other words, the width of the channel 324 is greater than the thickness T of the glass panel 390. A pair of weather strips **329*a* and 329*b* project from the interior sidewall 326 into the channel 324. The weather strips 329*a* and 329*b* provide a means for sealing whatever gap exists between the interior face engaging sidewall 326 and the interior face of the glass panel 396. The sidewall 325 extends from the shoulder 327 at an angle of approximately 95 to 105 degrees to facilitate insertion of the glass panel into the channel 324. As shown in FIG. 6, a sealant 399 functions to seal the gap and provides a gap between the exterior face engaging sidewall 325 and the exterior face 395 of the glass panel 390**.

The width of the channel 334, as defined between the sidewalls 331 and 332, is less than the thickness T of the glass panel 390. Rubber spacers 389 are interspersed along the channel 324 and span the nested channel 334. A peripheral edge 397 of the exterior glass pane 391 rests against portions of the spacers 389 supported by the shoulder 327 extending from the exterior sidewall 325 and perpendicular relative to the glass pane 391. A peripheral edge 398 of the interior glass pane 392 rests against portions of the spacers 389 supported by the shoulder 328 extending from the interior sidewall 326 and perpendicular relative to the glass pane 392. The glass panel 390 spans the channel 334 and cooperates with the sidewalls 331 and 332 and the first base 330 to define a condensation cavity 335.

Side Liners

Figure 7:
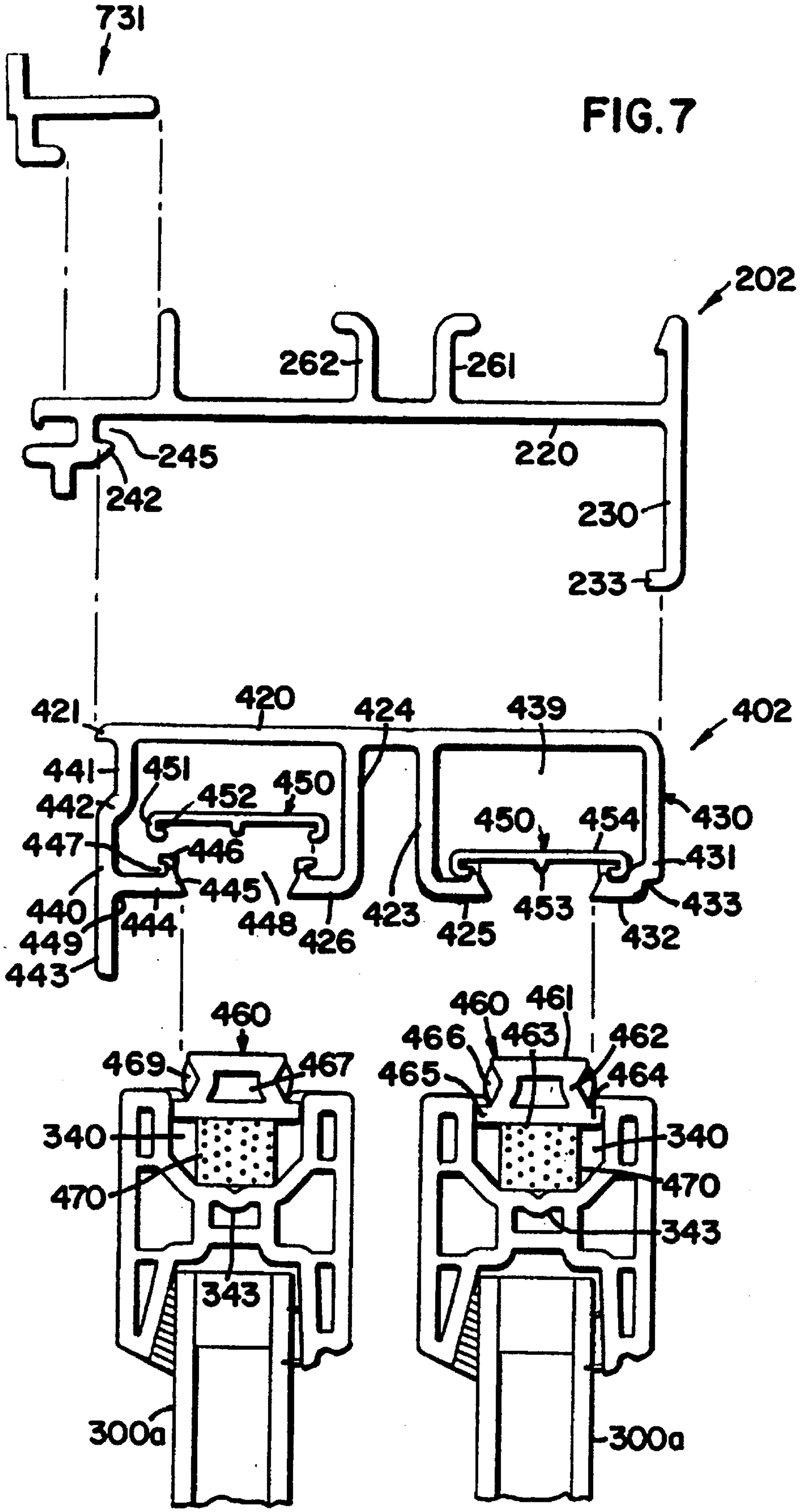
FIG. 7 is a profile or sectioned side view of preferred embodiment upper and lower sashes and side jamb components constructed according to the principles of the present invention and shown in projection relative to one another.

A side liner 402 is secured to the right side frame member 202, and an identical side liner 404 is secured to the left side frame member 204. As shown in FIG. 7, the profile of each side liner includes a main beam 420 that extends between and integrally interconnects an interior wall 430 and an exterior wall 440. A tab 421 projects beyond the exterior wall 440 and interengages the notch 245 on the frame when the main beam 420 is proximate the main beam 220.

The exterior wall 440 includes a first segment 441 that extends downward from the main beam 420 and integrally joins a standoff 442, which extends downward and toward the exterior side of the window assembly 100. The standoff 442 extends into and integrally joins a second segment 443, which extends substantially parallel to the first segment 441. A third segment 444 is integrally joined to an intermediate portion of the second segment 443. The third segment 444 extends toward the interior side of the window assembly 100 and terminates in a pointed end 445. Just inside the pointed end 445, a substantially L-shaped flange 446 extends toward the frame member 202 and then toward the exterior side of the window assembly 100 to define a notch 447. The third segment 444 and a distal portion of the second segment 443 cooperate to define an interior corner 449 that receives the upper sash corner defined by the exterior walls 322 and 323.

The interior wall 430 extends substantially perpendicular from the main beam 420 and away from the frame 202. The interior wall 430 extends into and integrally joins a first standoff 431, which extends toward the exterior side of the window assembly 100 and away from the frame 202. The first standoff 431 extends into and integrally joins a second standoff 432, which extends toward the exterior side of the window assembly 100. The standoffs 431 and 432 cooperate to define an internal corner or shoulder 433 which engages the lip 233 on the frame member 204. The second standoff 432 is a mirror image of the third segment 444 in that it also terminates in a pointed end 445 that supports a substantially L-shaped member 446, which extends toward the frame 202 and then toward the interior side of the window assembly 100 to define a notch 447.

Intermediate the endwalls 430 and 440, a pair of legs 423 and 424 are integrally joined to the main beam 420 and extend away from the frame member 202. The legs 423 and 424 are mirror images of one another and extend perpendicularly away from the main beam 420. A foot 425 extends from a distal end of the leg 423, and a foot 426 extends from a distal end of the leg 424. The feet 425 and 426 extend in opposite directions away from one another. The feet 425 and 426 are mirror images of the third segment 444 and the second standoff 432, respectively, in that each similarly terminates in a pointed end 445 that supports a substantially L-shaped member 446, which extends toward the frame 200 and then perpendicularly to define a notch 447.

Counterbalances and Pivot Pins

The foot 426, the leg 424, the main beam 420, the first segment 441, the standoff 442, the second segment 443, and the third segment 444 cooperate to define a substantially C-shaped channel 448, which houses hardware that interconnects the upper sash **300*a* and the frame 200. This interconnecting means 409 functions to counterbalance the weight of the sash and facilitate movement of the upper sash 300*a* in a linear path relative to the frame 200 and pivoting of the upper sash 300*a* about its lower or sill end. Some aspects of this interconnecting means 409 are shown in FIGS. 53–56**.

FIG. 53 shows an exploded view of a sliding locking block, generally referred as 1114, and a sash pivot 1116. One sliding locking block 1114 is slideably mounted within each side jamb channel or compartment 439. A pivot 1116 is fastened to lower opposite sides of each sash **300*a* and 300*b*. Pivots 1116 are supported for rotation by sliding locking blocks 1114. Each sash is tiltable about a longitudinal axis through pivots 1116 disposed on opposite sides of sashes 300*a* and 300*b*. The sliding locking block 1114 has a housing 1118 preferably of rigid plastic. This housing 1118 has sliding surfaces 1120 with slots 1122. The housing 1118 has an aperture 1124 and a plate groove 1126 for attaching a sash pivot retainer spring 1128 and a metal plate 1130, respectively. A counterbalance spring (shown in FIG. 55) is attached to metal plate 1130. The housing 1118 has a circular channel 1132 for receiving a locking cam 1134, having camming surfaces 1136. Housing 1118 also has a box-like area for receiving a locking spring 1138 which has serrated end portions 1140. Locking cam 1134 has a head 1142 which, as known to those skilled in the art, retains spring 1138 in the box-like area of housing 1118**.

Sash pivot retainer spring 1128, as shown in FIG. 53, has a hooked first end 1144 which is received by aperture 1124 to operably connect retainer spring 1128 to housing 1118. Retainer spring 1128 also has free end 1146. Retainer spring 1128 is preferably spring steel. The locking cam 1134, as shown in FIG. 53, has a sash pivot opening 1148 with an open top slot 1150. Located proximate a front side of locking cam 1134 on opposite sides of sash pivot opening 1148, are inwardly disposed cam flanges 1152.

FIG. 54 shows a perspective view of the assembled sliding locking block 1114 without pivot 1116. Retainer spring 1128 and plate 1130 are shown installed within housing 1118. Free end 1146 of spring 1128 is in a normal position proximate the front side of locking cam 1134. Locking cam 1134 is shown inserted within circular channel 1132 and is retained within locking block 1114 by a tab 1154. FIG. 54 also shows one serrated end portion 1140 of spring 1128 retracted within slot 1122 in sliding surface 1120.

Figure 55:
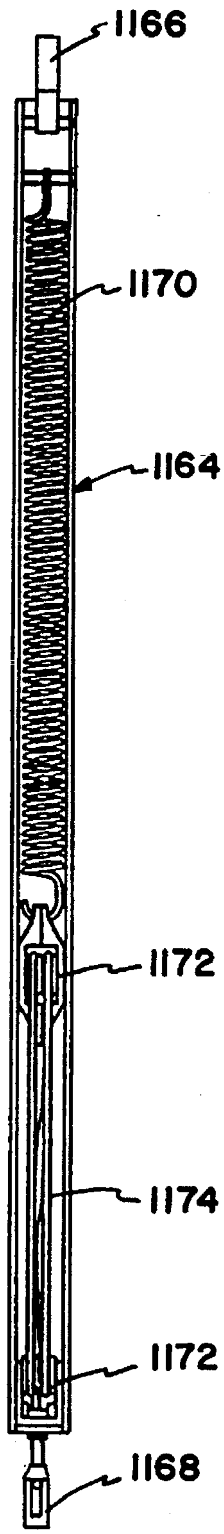
FIG. 55 is a side view of a counterbalance that interconnects the sliding locking block shown in FIG. 54 to the window frame.

FIG. 55 shows a counterbalance, generally referred to as 1164. At least one counterbalance 1164 is placed in each side jamb channel or compartment 439 proximate a top portion of the window of frame by hook 1166 proximate one end of counterbalance 1164. Proximate the other end of the counterbalance 1164 is a tab 1168 for connecting the counterbalance 1164 to plate 1130 of sliding locking block 1114. Counterbalance 1164 also has a spring 1170, pulleys 1172, and a cord 1174 operably connected as well known in the art.

Figure 56:
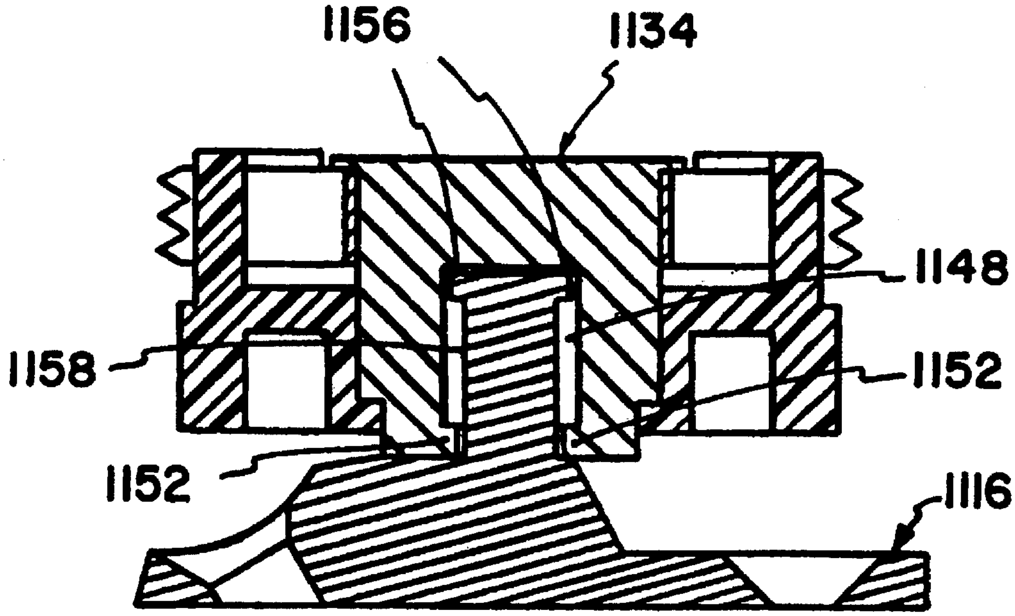
FIG. 56 is a sectioned top view of the sliding block shown in FIG. 53, depicted in an assembled state.

As shown in FIG. 56, when pivot 1116 is inserted into sash pivot opening 1148, the elongated portion 1158 extends into the opening beyond cam flanges 1152. Pivot flanges 1156 of pivot 1116 are disposed widely enough that when pivot 1116 is inserted in this manner, pivot flanges 1156 engage with cam flanges 1152 so that pivot 1116 cannot be pulled out of the pivot opening 1148 in a direction approximately parallel to a longitudinal axis of the elongated portion 1158. This feature is particularly important during transport and installation of window.

This interconnecting means or hardware 409 is disclosed and described in greater detail in U.S. patent application Ser. No. 07/927,204 filed on Aug. 7, 1992, and assigned to the assignee of the present invention. To the extent that it facilitates understanding of the present invention, this patent application is incorporated herein by reference to same.

A cover or clip 450 inserts into and effectively spans the channel 448 thereby defining a smaller, substantially U-shaped channel bounded on opposing sides by the third segment 444 and the foot 426 and their respective L-shaped members 446. The clip 450 includes a main panel 454 that extends between a pair of substantially J-shaped ends 451, which extend away from the frame 202 and then toward one another to define a pair of notches 452. Intermediate the J-shaped ends 451, a rail 453 extends in an opposite direction from the clip 450, away from the frame 202. The J-shaped ends 451 on the clip 450 interengage the L-shaped members 446 on the third segment 444 and the flange 426 to secure the clip 450 relative to the channel 448. The clip 450 enhances the structural integrity of the side jamb liner 402, as it prevents the opposing sidewalls of a respective jamb channel from deflecting away from one another, which might otherwise occur when the window is subjected to heavy wind.

The flange 425, the leg 423, the main beam 420, the interior wall 430, and the standoffs 431 and 432 similarly cooperate to define an adjacent, substantially C-shaped channel, which houses counterbalance hardware that facilitates opening of the lower sash 300*b*. Another clip 450 inserts into and effectively spans the channel to form a compartment 439 and conceal the counterbalance hardware. The J-shaped ends 451 on the clip 450 interengage the L-shaped members 446 on the standoff 432 and the flange 425 to secure the clip 450 relative to the channel and effectively seal the hardware 409 within the compartment 439.

Selectively Engaged Stops

Figure 8:
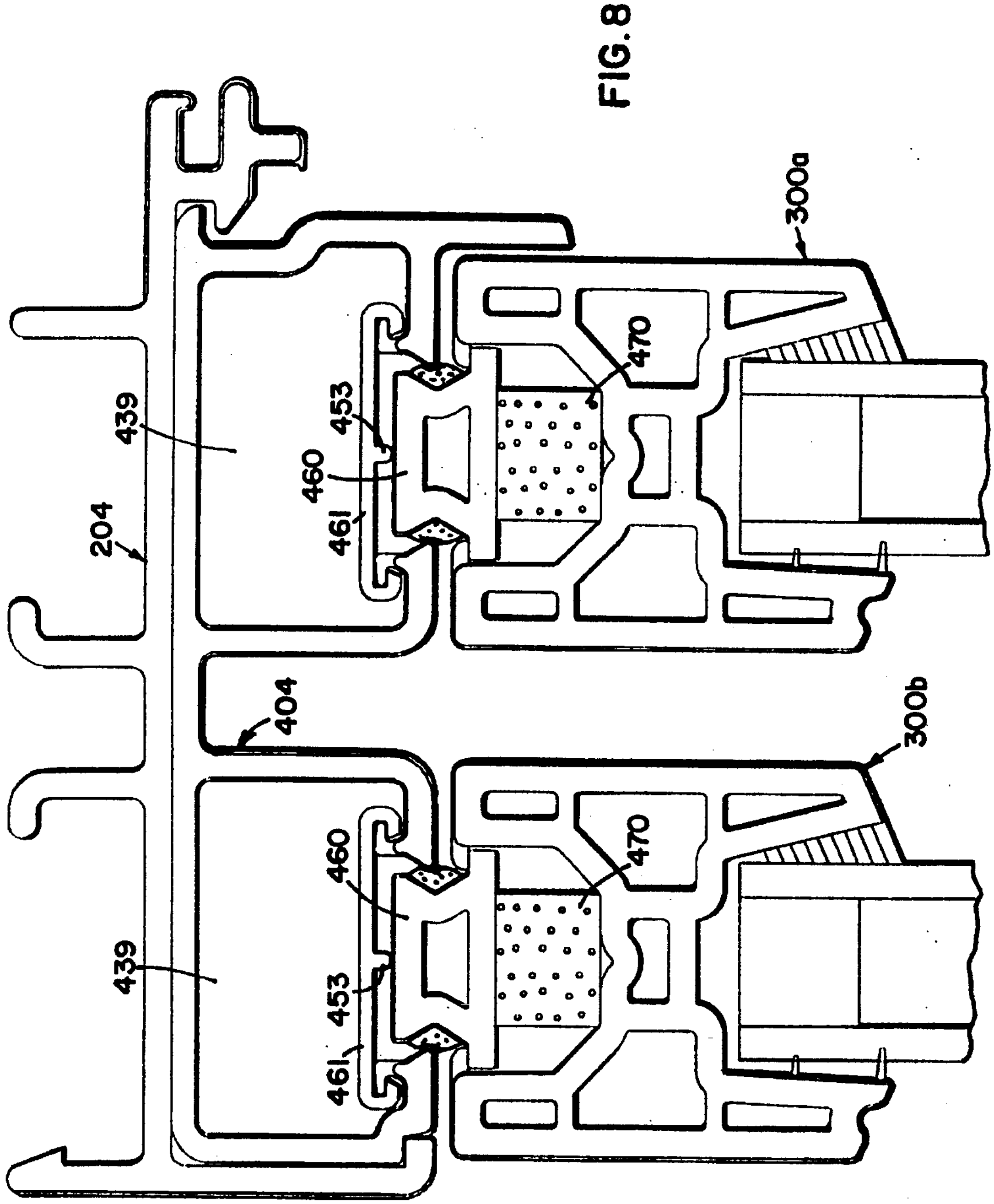
FIG. 8 is a profile or sectioned side view of preferred embodiment upper and lower sashes and side jamb components constructed according to the principles of the present invention and shown assembled relative to one another and in a first configuration.
Figure 9:
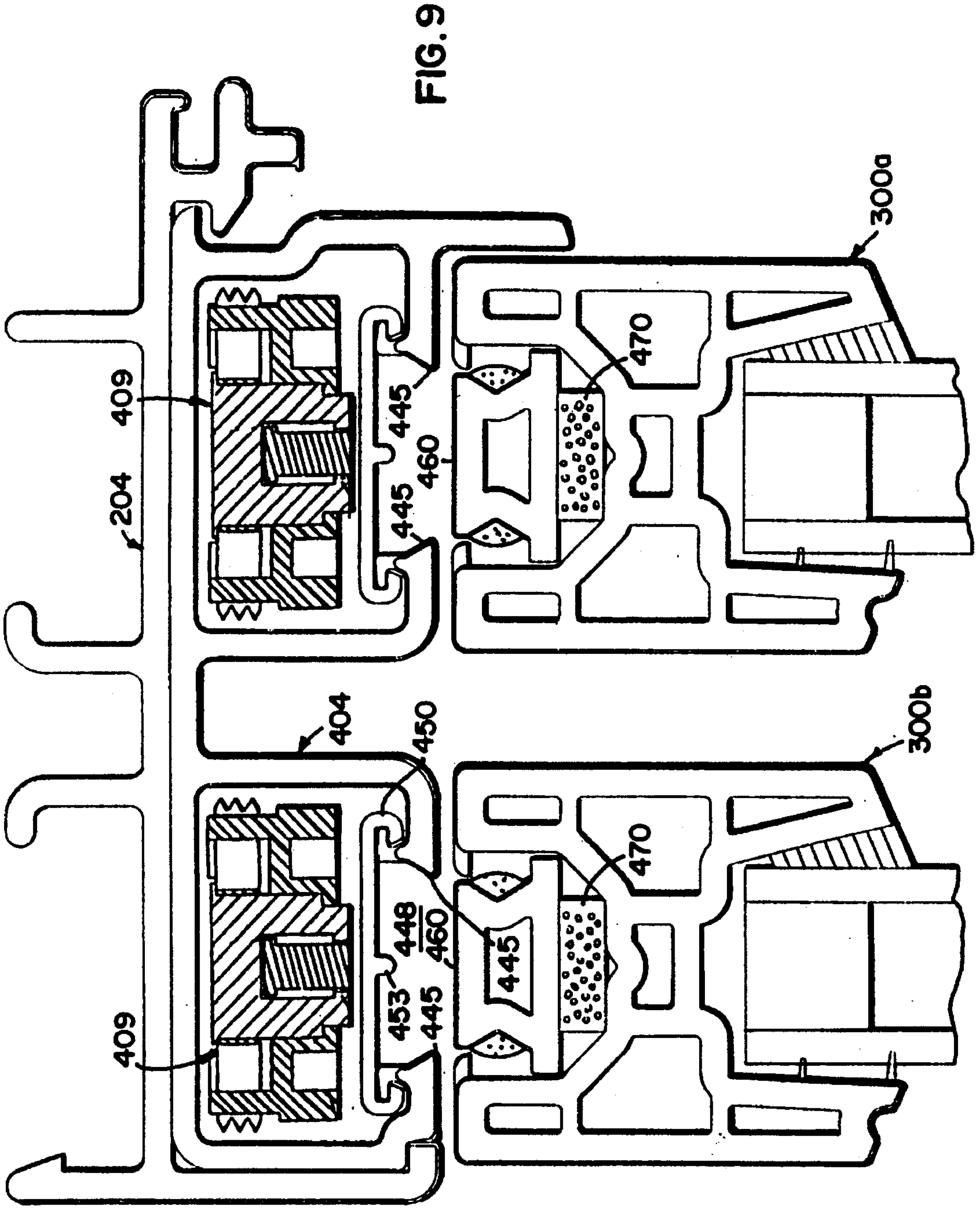
FIG. 9 is a profile or sectioned side view of preferred embodiment upper and lower sashes and side jamb components constructed according to the principles of the present invention and shown assembled relative to one another and in a second configuration.

As shown in FIGS. 7–9, a stop 460 is secured relative to each side of the upper sash 300*a* and the lower sash 300*b*. In a preferred embodiment, each stop 460 is an extrusion of a composite material including wood and polyvinyl chloride. The stops 460 function as a second interconnecting means between each sash and the frame, selectively constraining each sash to move up and down along a linear path within the frame.

Each stop 460 has a uniform profile that may be described as substantially trapezoidal. A first, relatively shorter parallel side or wall 461 extends substantially parallel to the main beam 420 on the side liner 402. A second, relatively longer parallel side or wall 463 similarly extends substantially parallel to the main beam 420, between a first end 464 and a second 465. A pair of equal length, non-parallel, V-shaped sides or walls 462 and 466 integrally interconnect the parallel sides 461 and 463 and cooperate therewith to define an internal compartment 467 that also may be described as having a substantially trapezoidal cross-section or profile.

The longer wall 463 of the stop 460 is disposed within the channel 340, and an elongate piece of resilient, semi-rigid foam 470 is disposed between the stop 460 and the base wall 343 of the channel 340. The foam 470 biases the stop 460 outward from the channel 340 and into engagement with the side jamb liner 402. The ends 464 and 465 of the longer wall 463 extend beyond the junctures with the V-shaped walls 462 and 466 and thereby define a longer wall length, which is less than the interior width of the channel 340, as defined between the sidewalls 341 and 346, but greater than the distance between the tabs 347 and 348, which limit access into and out of the channel 340. Thus, the tabs 347 and 348 retain the stop 460 and the foam 470 within the channel 340. On the other hand, the length of the shorter wall 461 is less than the channel access width defined between the tabs 347 and 348. Thus, the shorter wall 461 is free to move between a first position interengaged with the side jamb liner, and a second position free of the side jamb liner.

The V-shaped walls 462 and 466 on the stop 460 may be said to be convexly oriented relative to one another and thus, provide notches on the external sides of the stop 460. An elongate weather strip 469 is disposed in each of these notches and extends in convex fashion from the concave walls 462 and 466. When the sash is in a normal operating condition, as shown in FIG. 1, for example, the foam 470 biases the shorter wall 461 out of the sash channel 340 and into the jamb channel 448 in such a manner that the weather strips 469 occupy the span between the pointed ends 445, as shown in FIG. 8. This arrangement provides a positive, overlapping seal along the entire sides of the sashes 300*a* and 300*b* and constrains the sashes to travel in a linear path up and down relative to the frame 200. When it is desirable to access the exterior faces 395 of the glass panels 390, the stops 460 are withdrawn from the jamb channels 448 to arrive at the configuration shown in FIG. 9, and thereby allow pivoting of the sashes about their respective lower ends relative to the frame.

Figure 10:
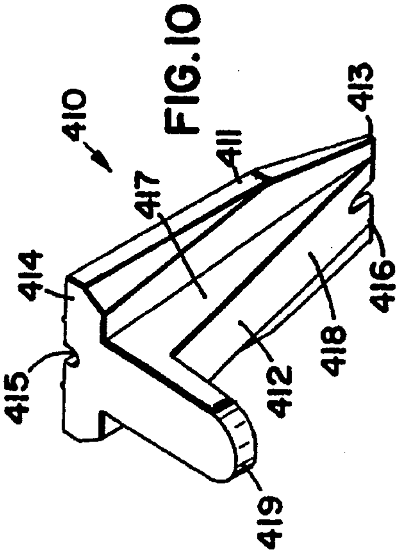
FIG. 10 is an isometric view of a preferred embodiment lower sash release component constructed according to the principles of the present invention.

The stops 460 on the lower sash 300*b* are retracted from the side jamb liners 402 and 404 by means of release operators 410, one of which is shown in FIG. 10, to allow pivoting of the lower sash 300*b* relative to the frame 200. Each operator 410 includes a generally flat base 411 and a generally L-shaped member 412 secured to one side of the base 411. A longitudinal groove 415 is formed in an opposite side of the base 411. The base 411 extends from a relatively thin, leading end 413 to a relatively thick, trailing end 414. The L-shaped member 412 likewise extends from a relatively thin, leading end 416 to a relatively thick, trailing end 417. The L-shaped member 412 includes a wedge portion 418 that increases in thickness from the leading end 416 to the trailing end, and a handle portion 419 that extends substantially perpendicular from the base 411 proximate the trailing end 414.

An operator 410 is disposed within each channel 448, above the lower sash 300*b*, and with the leading ends 413 and 416 directed downward toward the lower sash 300*b*. Each base 411 is retained proximate a respective clip 450 by a respective pair of opposing ends 445 that limit the opening of each channel 448. The groove 415 in each operator 410 engages the nub 453 on a respective clip 450, and the handle 419 on each operator extends outward beyond its channel 448 so as to be accessible to a person standing near the interior side of the window assembly 100. When not in use, the operators, 410 are moved to upwardmost positions within their respective channels 448 and thus, are visible, if at all, against the backdrop of a similarly colored upper sash member 301 on the upper sash 300*a*.

When pivoting of the lower sash 300*b* is desired, the lower sash 300*b* is moved upward some distance from the sill liner 120, and each operator 410 is moved downward and between a respective clip 450 and a respective stop 460 on the lower sash 300*b*. Each operator 410 effectively "wedges" an topmost portion of a respective stop 460 out of its respective channel 448, thereby allowing a person to pivot the lower sash 300*b* inward about its lower end. Once wedged at the top, the stops 460 simply ease out of their respective channels 448 from top to bottom in response to the pivoting. The bottommost portion of each stop 460 remains captured between a respective sash member 302 or 304 and a respective side jamb 402 or 404, so the stops 460 simply ease back into their respective channels 448 from bottom to top when the lower sash 330*b* is pivoted back into its locked position relative to the frame 200.

Figure 11:
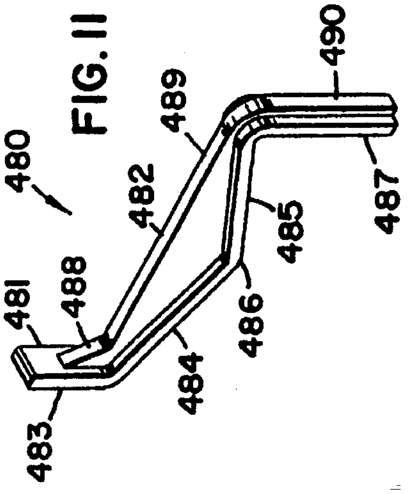
FIG. 11 is an isometric view of a preferred embodiment upper sash release component constructed according to the principles of the present invention.
Figure 12:
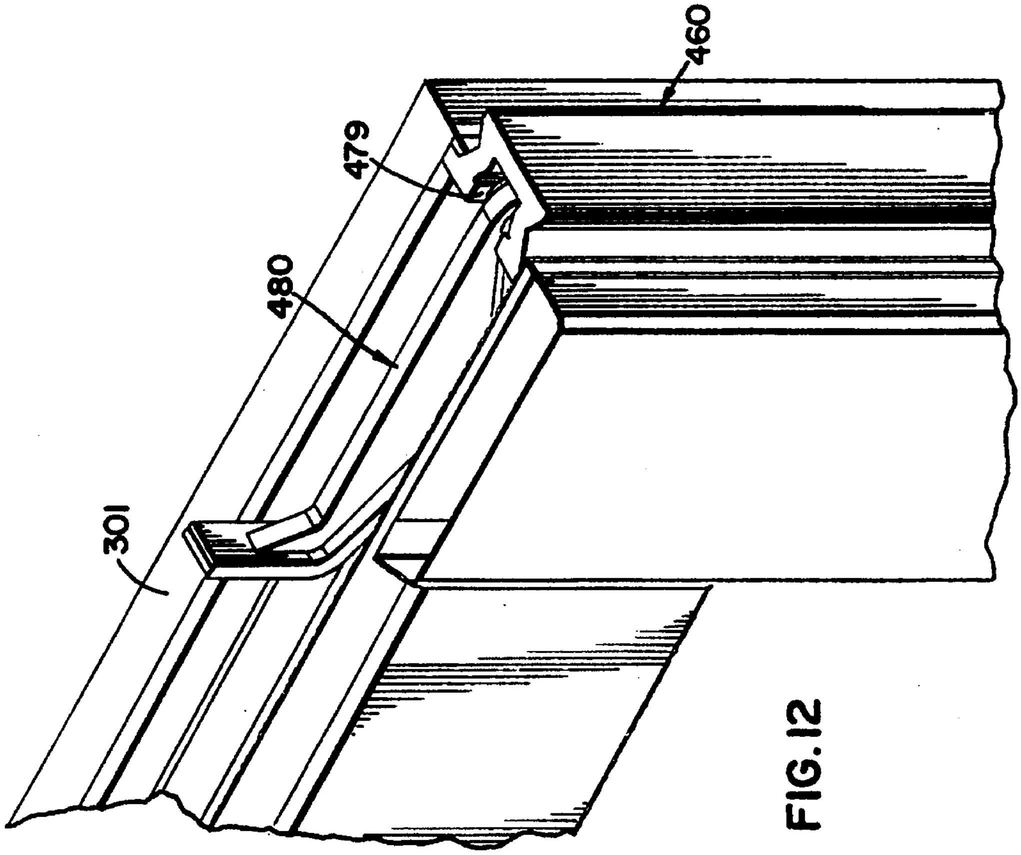
FIG. 12 is an isometric view of preferred embodiment upper sash and upper sash release components constructed according to the principles of the present invention and shown assembled relative to one another.

The stops 460 on the upper sash 300*a* function in much the same manner as those on the lower sash 300*b*, but in response to different release mechanisms, one of which is designated as 480 in FIGS. 11 and 12. Each mechanism or operator 480 includes a generally S-shaped bar 481 and a web 482 extending perpendicularly from the S-shaped member 481. The S-shaped bar 481 extends from a handle 483 to a V-shaped intermediate portion consisting of equal length segments 484 and 485 to a finger 487. The web 482 is disposed on the concave side of the V-shaped portion and extends from an intermediate portion of the handle 483 to a distal end of the finger 487 and cooperates with the S-shaped member 481 to give the mechanism 480 a T-shaped cross-section. The web 482 includes a first, substantially triangular portion 488 extending from the handle 483 to a second, substantially triangular portion 489 extending across the V-shaped portion to a third, linear portion extending along the finger 487. The side of the second substantially triangular portion 489 opposite the corner 486 of the V-shaped portion extends substantially perpendicular relative to the handle 483 and the finger 487, which extend in opposite directions therefrom.

The mechanism 480 is disposed in the channel 340 on the upper sash member 301 in such a manner that the finger 487 extends downward into the compartment 467 in the stop 460, and the handle 483 extends upward beyond the channel 340. The corner 486 of the V-shaped portion rests upon the base 343, and a notch 479 is formed in an upper end of the longer parallel wall 463 on the stop 460 to receive the segment 485 proximate the finger 487. As a result, the mechanism 480 lies within the channel 340 with the side of the upwardmost side of the second substantially triangular portion 489 substantially parallel to the base 343. The top rail filler 170 (not shown in FIG. 12) covers the channel 340 and retains the mechanism 480 therein, and the handle 483 projects out an opening in the top rail filler 170 so as to be accessible to a person standing proximate the interior side of the window assembly 100. The intermediate wall 178 assures adequate clearance for the handle 483 relative to the head jamb liner 370.

When pivoting of the upper sash 300*a* is desired, the lower sash 300*b* must first be released and pivoted relative to the frame 200. Then, the handles 483 on opposite sides of the upper sash 300*a* are simple pulled toward one another to retract a topmost portion of each stop 460 out of its respective channel 448, thereby allowing a person to pivot the upper sash 300*a* inward about its lower end. Once extracted at the top, the stops 460 simply ease out of their respective channels 448 from top to bottom in response to the pivoting. The bottommost portion of each stop 460 remains captured between a respective sash member 302 or 304 and a respective side jamb 402 or 404, so the stops 460 simply ease back into their respective channels 448 from bottom to top when the upper sash 330*a* is pivoted back into its locked position relative to the frame 200.

Bottom Rail Filler

A bottom rail filler 150 is secured to the lower sash member 303 on the lower sash 300*b*. As shown in FIG. 3, the bottom rail filler 150 includes a lateral flange 151 that lies beneath the frameward wall 121 on the lower sash 300*b* and is secured thereto by means of a screw 169 that threads into and through the flange 151 and the sixth compartment 356. The flange 151 extends into and integrally joins a first vertical wall 152, which extends substantially perpendicular upward from the flange 151. A notch 153 is formed in the juncture between the flange 151 and the wall 152, and the tab 347 on the lower sash 300*b* inserts into the notch 153. The wall 152 extends into and integrally joins a horizontal base 154, which extends substantially perpendicular from the wall 152 and toward the exterior side of the window assembly 100. The base 154 extends into and integrally joins another wall 155, which extends substantially perpendicular downward from the base 154. The wall 155 extends into and integrally joins a second lateral flange 157, which extends substantially perpendicular from the wall 155 and toward the exterior side of the window assembly 100. The flange 157 lies beneath the frameward wall 322 on the lower sash 300*b*. A shoulder 156 juts outward from the second vertical wall 155 and cooperates with the second lateral flange 157 to define a notch 158 that receives the tab 348 on the lower sash 300*b*. The flange 157 extends into and integrally joins a first leg 159, which extends downward to a distal end that engages the horizontal portion 127 on the sill liner 120.

The second vertical wall 155 also extends into and integrally joins a second leg 161, which extends down from the juncture between the second vertical wall 155 and the second lateral flange 157, to a distal end that also engages the horizontal portion 127 on the sill liner 120. The second leg 161 and the first leg 159 form opposing sidewalls of a substantially U-shaped channel 160, which is also bordered by the second lateral flange 157. The first vertical wall 152 similarly extends into and integrally joins a third leg 164, which extends down from the juncture between the first vertical wall 152 and the first lateral flange 151, to a distal end that also engages the horizontal portion 127 on the sill liner 120. The third leg 164 and second vertical wall 155 and the second leg 161 and first vertical wall 152 form opposing sidewalls of a substantially U-shaped channel 163, which opens downward toward the sill liner 120.

Shoulders 165 on the vertical walls 152 and 155 project into the channel 163, as does a nub 166 on the base 154. A substantially H-shaped clip 167 inserts into the channel 163 and is secured in place by snap fit of barbed distal ends 168 relative to the shoulders 165. The nub 166 engages an intermediate portion of the clip 167 to maintain pressure on the snap fit arrangement. Weather strip 162 in the general shape of a square tube is disposed in the channel 163 and a portion of the clip 167. When the lower sash 300*b* comes to rest on the sill liner 120, the nub 128 on the sill liner 120 engages the weather strip 162 to provide an overlapping seal therebetween.

Top Rail Filler

A top rail filler 170 is secured to the upper sash member 301 on the upper sash 300*a*. As shown in FIG. 4, the top rail filler 170 includes a lateral flange 171 that lies above the frameward wall 121 on the upper sash 300*a* and is secured thereto by means of a screw 189 that threads into and through the flange 171 and the sixth compartment 356. The flange 171 extends substantially across the channel 340 and integrally joins a substantially L-shaped member 172, which extends downward from the flange 171 and then toward the exterior side of the window assembly 100. The flange 171 continues into and integrally joins a base 173, which extends at an angle of approximately 135 degrees upward from the flange 171 and toward the exterior side of the window assembly 100. The L-shaped member 172, the base 173, and their junctures with the flange 171 define a notch 174 that opens toward the exterior side of the window assembly 100. The tab 348 on the upper sash member 301 inserts into the notch 174.

The base 173 extends into and integrally joins a second lateral flange 175, which is substantially co-linear with the first lateral flange 171. The second lateral flange 175 lies above the frameward wall 322 on the upper sash 300*a* when the tab 348 is interengaged with the notch 174. The second lateral flange 175 extends into and integrally joins an end wall 176, which extends substantially perpendicular from the second lateral flange 175 and toward the frame 200. A weather strip 177 is secured to a distal end of the end wall 176. When the upper sash member 301 is moved to its upwardmost position within the frame 200, the end wall 176 rests just inside the end wall 380 on the head liner 370, and the weather strip 177 contacts the channel member 379.

An intermediate wall 178 is integrally joined to and extends upward or frameward from the juncture between the first lateral flange 171 and the base 173. The intermediate wall 178 extends into and integrally joins a third lateral flange 179, which extends substantially perpendicular away from the intermediate wall 178 and toward the exterior side of the window assembly 100. The third lateral flange 179, the intermediate wall 178, the base 173, the second lateral flange 175, and the end wall 176 cooperate to define a substantially hexagonal channel 180 that opens substantially perpendicular from the base 173. A weather strip 181 extends from the juncture between the intermediate wall 178 and the third lateral flange 179. When the upper sash 300*a* is moved to its upwardmost position within the frame 200, the third lateral flange 179 abuts the base 378 on the head liner 370, and the weather strip 181 contacts the base 378, as well.

Sash Interlock

Figure 13:
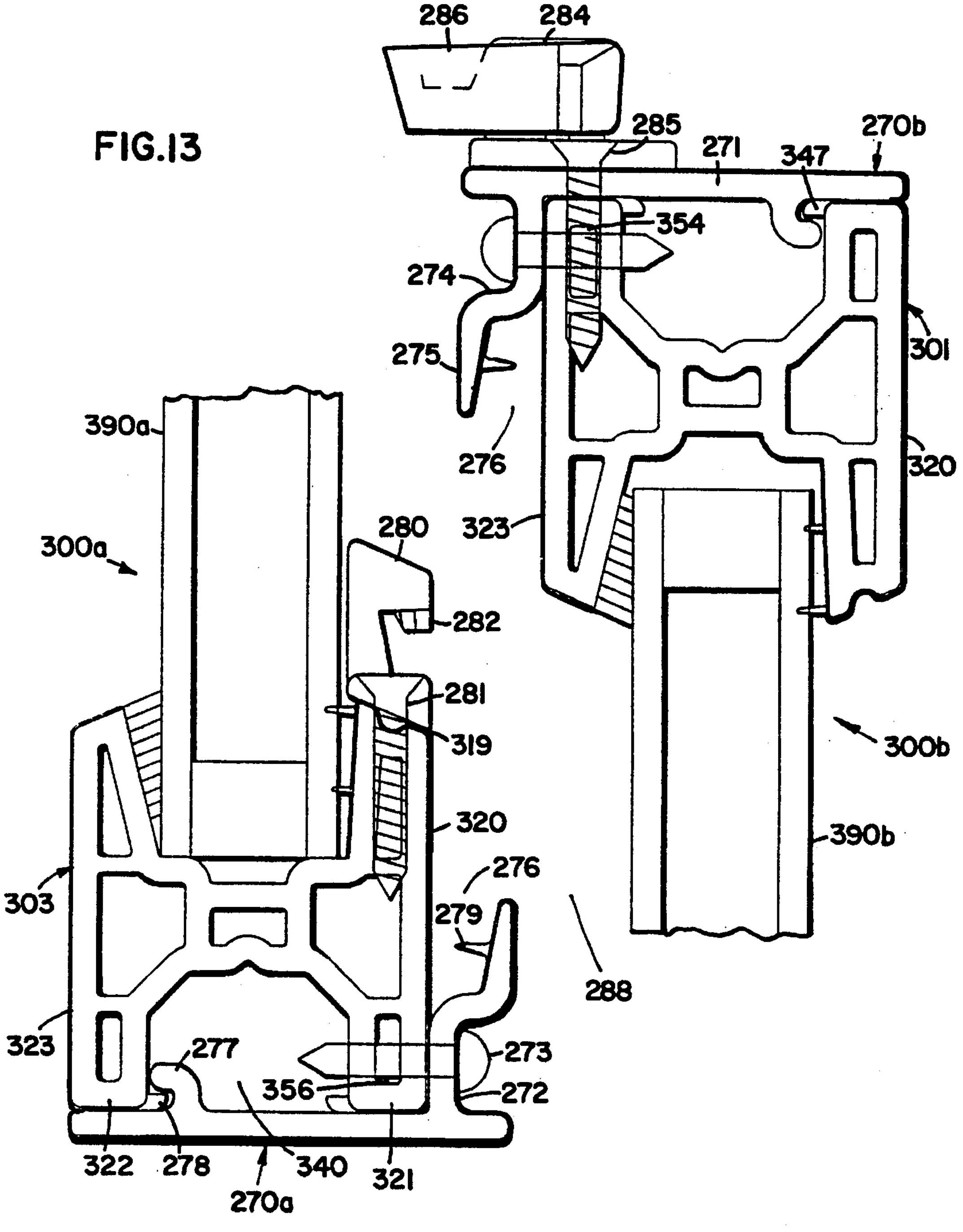
FIG. 13 is a profile or sectioned side view of preferred embodiment upper and lower sashes and interlock components constructed according to the principles of the present invention and shown assembly relative to one another.
Figures 14, 15:
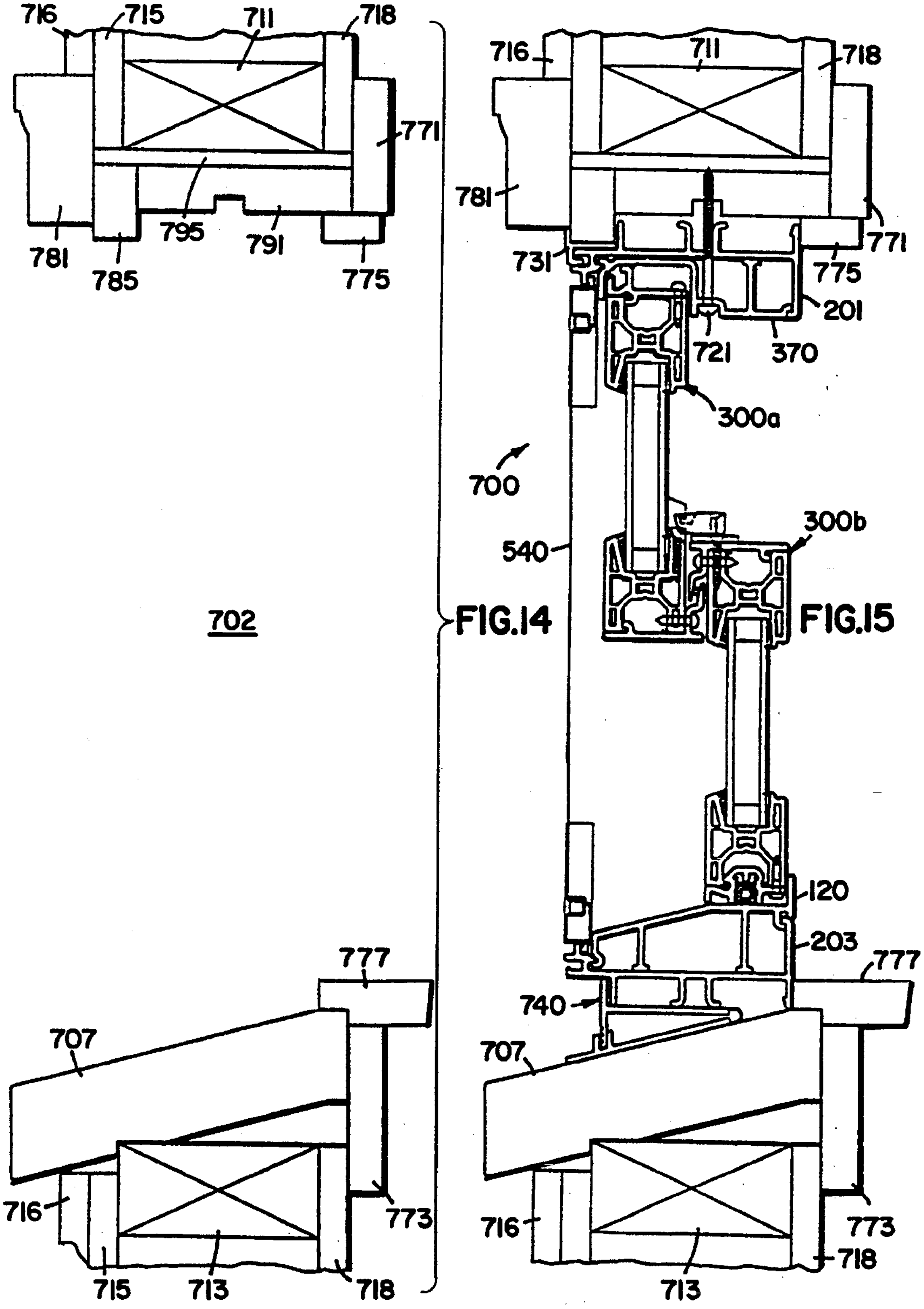
FIG. 14 is a sectioned side view of a rough opening suitable for supporting a double hung window assembly constructed according to the principles of the present invention for pocket replacement of an existing double hung window assembly.
FIG. 15 is a sectioned side view of a preferred embodiment double hung window assembly constructed according to the principles of the present invention for pocket replacement of an existing double hung window assembly and shown secured within the rough opening depicted in FIG. 14.
Figure 17:
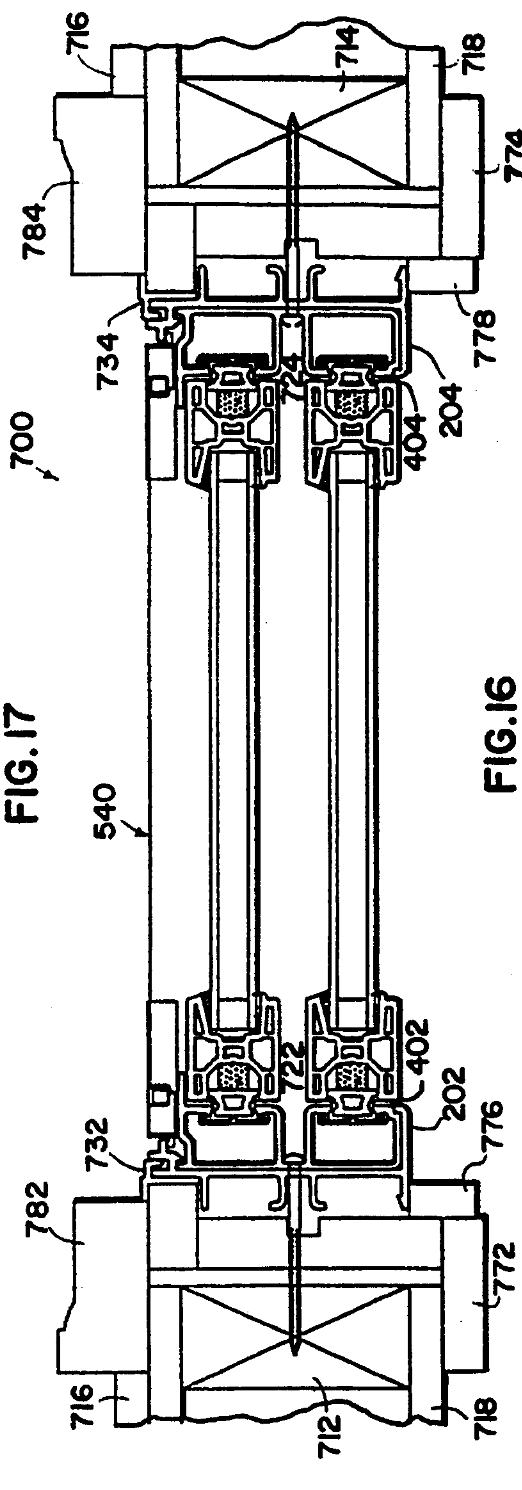
FIG. 17 is a sectioned top view of the rough opening and preferred embodiment double hung window assembly depicted in FIG. 15.
Figure 16:
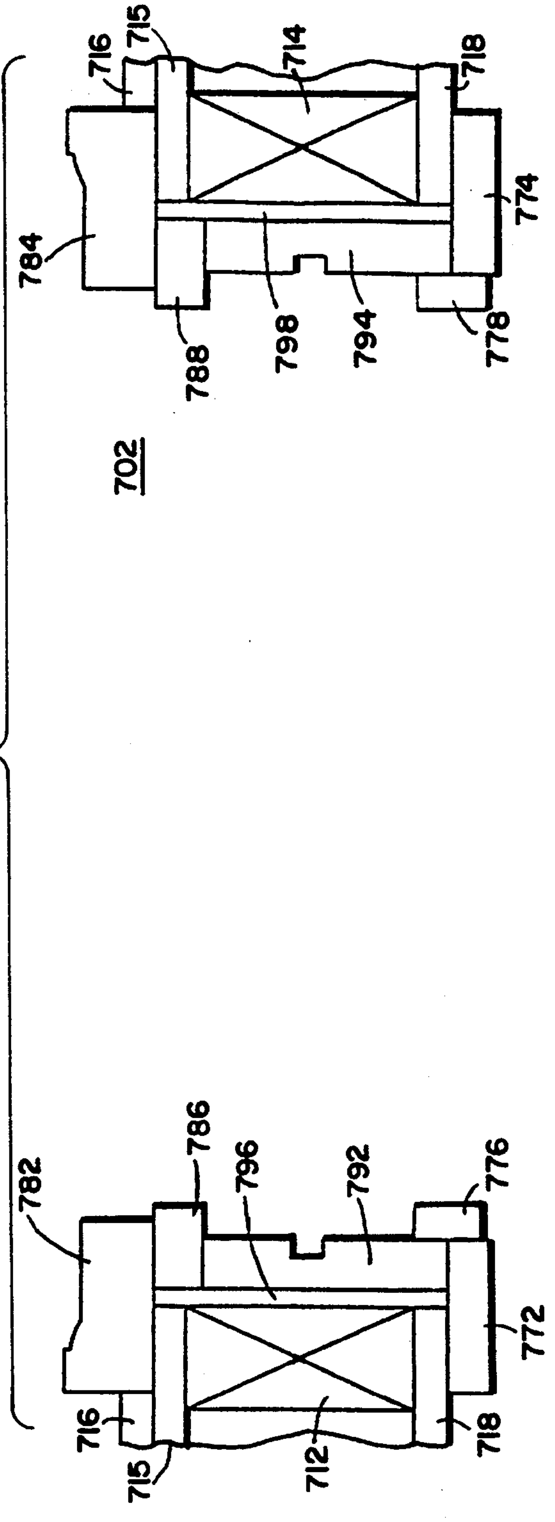
FIG. 16 is a sectioned top view of the rough opening depicted in FIG. 14.
Figure 18:
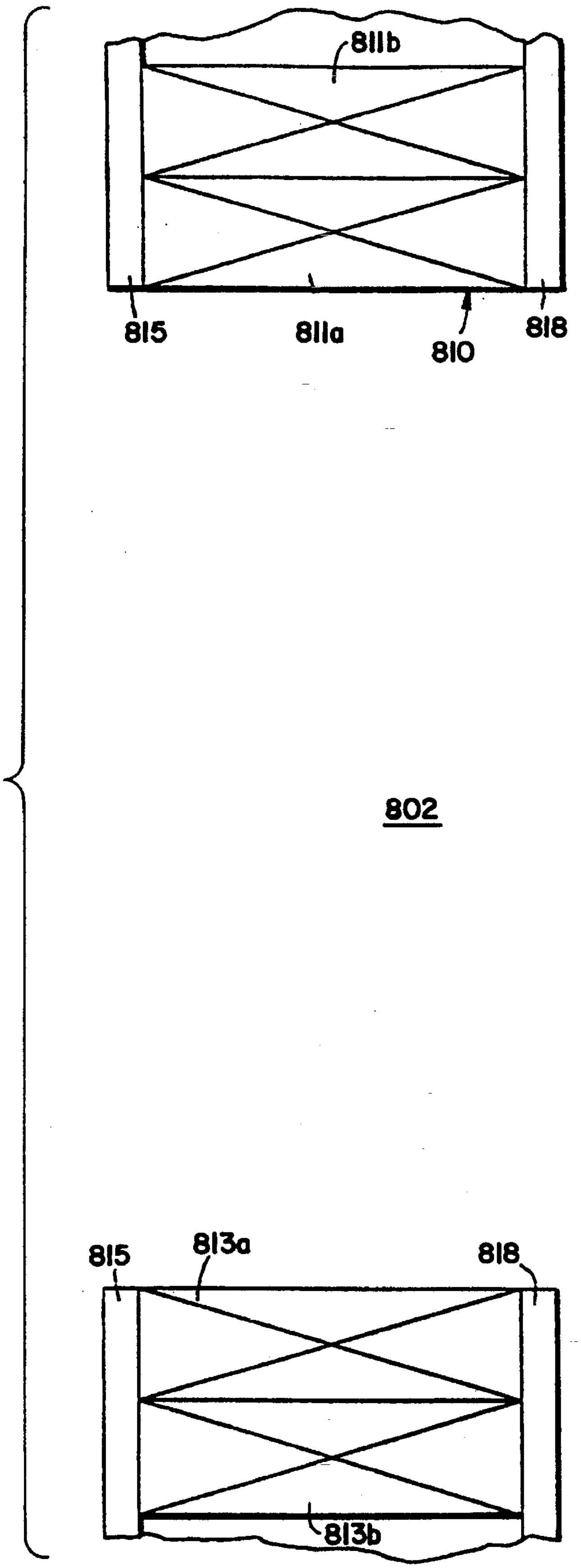
FIG. 18 is a sectioned side view of a rough opening suitable for supporting a double hung window assembly constructed according to the principles of the present invention for window in/window out replacement of an existing double hung window assembly.
Figure 19:
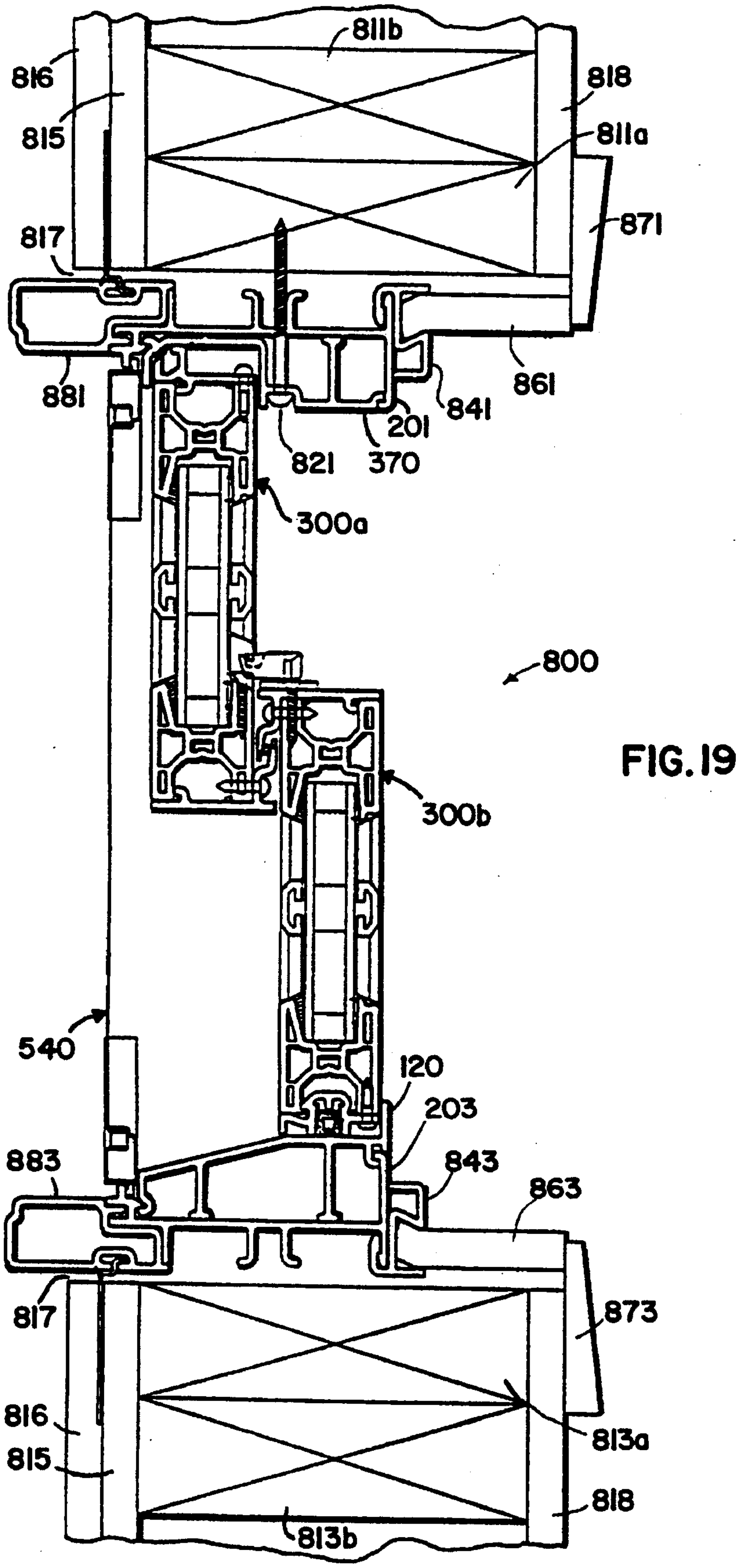
FIG. 19 is a sectioned side view of a preferred embodiment double hung window assembly constructed according to the principles of the present invention for window in/window out replacement of an existing double hung window assembly and shown secured within the rough opening depicted in FIG. 18.
Figure 20:
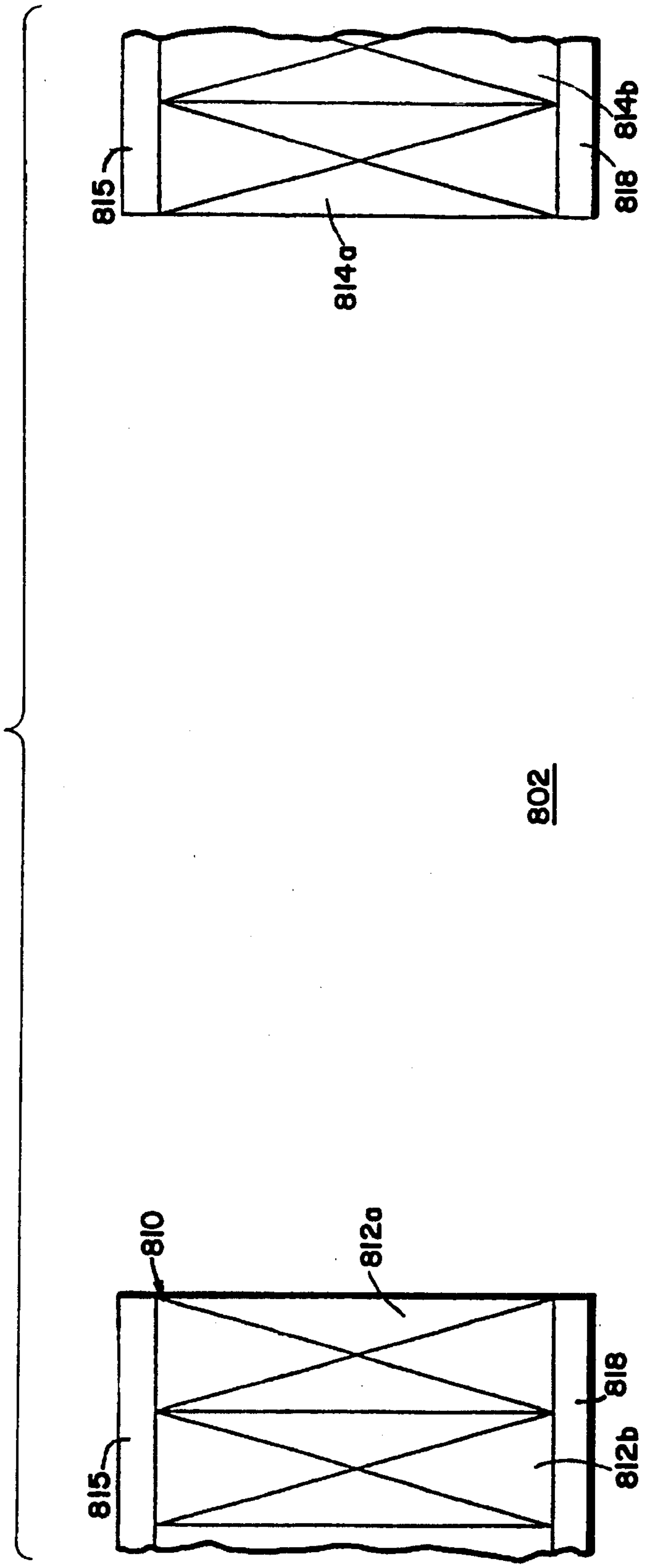
FIG. 20 is a sectioned top view of the rough opening depicted in FIG. 18.
Figure 21:
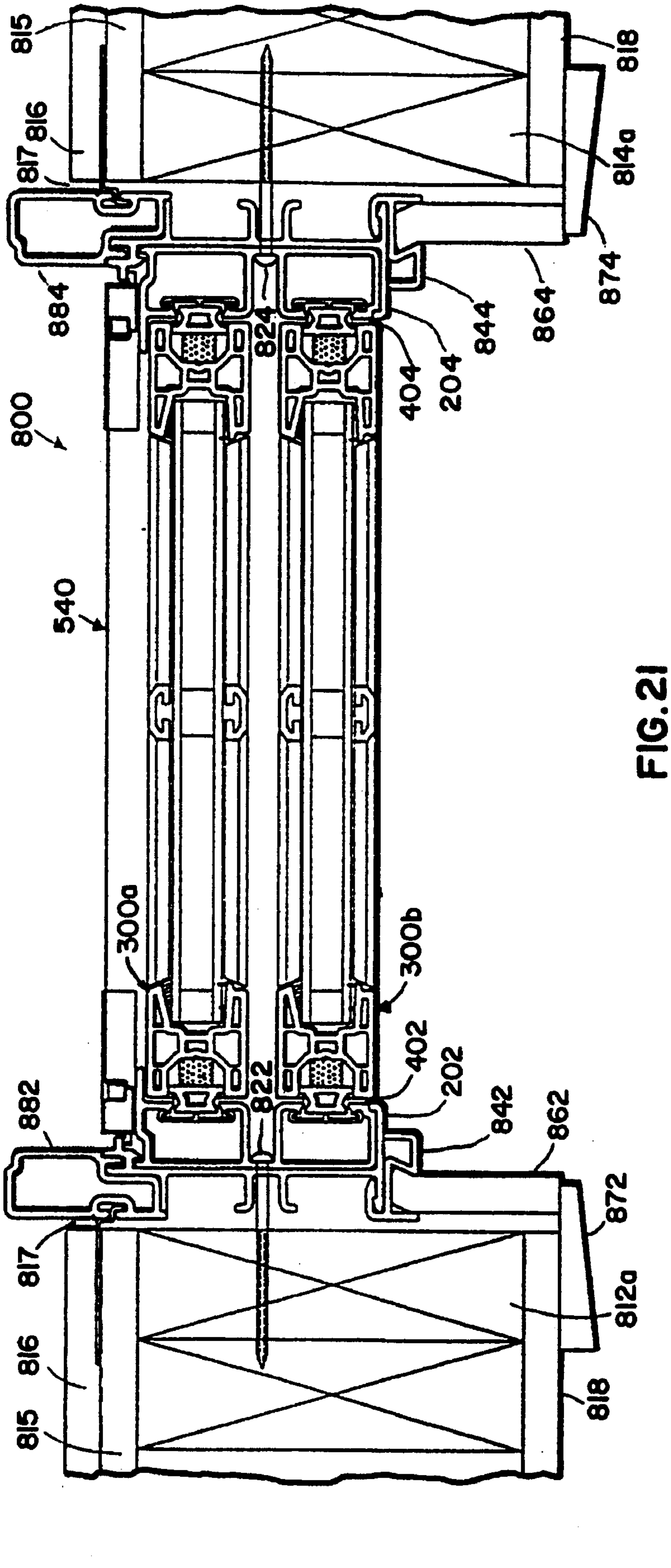
FIG. 21 is a sectioned top view of the rough opening and preferred embodiment double hung window assembly depicted in FIG. 19.

As shown in FIG. 13, a sash interlock 270*a* is secured to the lower sash member 303 on the upper sash 300*a*, and another, identical sash interlock 270*b* is secured to the upper sash member 301 on the lower sash 300*b*. The two sash interlocks 270*a* and 270*b* are reversed relative to one another, so that corresponding parts thereof extend in opposite directions. The sash interlocks 270*a* and 270*b* interengage in a gap 288 between the glass panels 390*a* and 390*b*.

Each of the sash interlocks includes a main beam 271 that abuts the frameward walls 321 and 322 and covers the channel 340 on a respective sash. An L-shaped member 277 on the outer sash interlock 270*a* extends from the main beam 271 into the channel 340 on the upper sash 300*a* and toward the exterior wall 323 of the sash 300*a* to define a notch 278 that receives the tab 348. Similarly, an L-shaped member 277 on the inner sash interlock 270*b* extends from the main beam 271 into the channel 340 on the lower sash 300*b* and toward the interior wall 320 to define a notch 278 that receives the tab 347. A flange 272 on the outer sash interlock 270*a* extends perpendicularly from the main beam 271 and adjacent the interior wall 320 of the upper sash 300*a*. This flange 272 is secured relative to the sash 300*a* by means of a screw 273 extending into and through the flange 272, the exterior wall 323, and the third compartment 354. Similarly, a flange 272 on the inner sash interlock 270*b* extends perpendicularly from the main beam 271 and adjacent the exterior wall 323 of the lower sash 300*b*. This flange 272 is secured relative thereto by means of a screw 273 extending into and through the flange 272, the exterior wall 323, and the third compartment 354.

The flange 272 extends into and integrally joins a standoff 274 that extends substantially perpendicular away from the flange 272 and toward the opposing interlock. The standoff 274 and a distal portion of the main beam 271 extending beyond the flange 272, form opposing sides of a recessed space that shelters the head of the screw 273. The standoff 274 extends into and integrally joins a tip 275 that extends substantially perpendicular away from the standoff 274 and toward the opposing interlock. The tip 275 on the upper sash interlock 270*a* cooperates with the standoff 274 and the interior wall 320 to define a substantially U-shaped channel 276. Similarly, the tip 275 on the lower sash interlock 270*b* cooperates with the standoff 274 and the exterior wall 323 to define a substantially U-shaped channel 276. Each of the channels 276 receives the tip 275 on an opposing interlock when the sashes are moved to their respective closed positions. A weather strip 279 extends from the tip 275 and into the channel 276 to provide an overlapping seal across any gap between the interlocking tips 275.

A catch 280 is secured to the interior wall 319 of the upper sash 300*a* by means of a screw 281 that threads into and through the interior wall 319 and the fourth compartment 359. The groove 316 in the interior wall 319 functions as a pilot for the screw 281, and the compartment 359 functions as a superior chase for the screw 281. A latch 284 is secured to the lower sash 300*b* by means of a screw 281 that threads into and through the beam 271 and the third compartment 354. The latch 284 includes a rotatable bearing surface 286 that engages a mating bearing surface 282 on the catch 280 to secure the upper sash 300*a* against downward movement relative to the lower sash 300*b*, and to secure the lower sash 300*b* against upward movement relative to the upper sash 300*a*.

Windows for Pocket Replacement

One suitable application for the present invention may be described with reference to "pocket replacement" of existing windows. An example of this application is discussed with reference to FIGS. 14–17.

In this application, the existing window is removed from its frame by removing the molding on one side of the window. For example, as shown in FIGS. 14–17, only the exterior moulding pieces 781, 782, and 784 and the stops 785, 786, and 788 need be removed in order to gain sufficient access to the rough opening 702 from the exterior of the building. The interior finish 718 and trim pieces 771–778, the existing frame elements such as the sill 707, and the exterior finish 716 are left intact. The only preparation to the existing frame structure involves installation of a sill angle member or wedge 740 across the sill 707.

The sill angle member 740 includes a first panel or base 750 and a second panel or beam 760 integrally interconnected by a living hinge 759 extending the width of the sill 707. The first panel 750 extends from a living hinge end 752 to a distal end 751. The second panel 760 extends from a living hinge end 762 to an opposite end 761. The first panel 750 is secured to the pre-existing sill 707 by caulk and or fasteners. A pair of flanges 753 and 754 extend upward from the first panel 750 proximate the distal end 751 and define a channel 756 therebetween.

The opposite end 761 of the second panel 760 is integrally joined to a wall or flange 763 that cooperates with the second panel 760 to define a substantially T-shaped structure. In other words, an upper portion 764 of the wall 763 extends perpendicularly up from the second panel 760 to a distal end 765, and a lower portion 766 of the wall 763 extends perpendicularly down from the second panel 760 to a distal end 767. The distal end 767 of the lower portion 766 inserts into the channel 756 to establish a second interconnection between the base 750 and the beam 760. The lower portion 766 cooperates with the base 750 and the beam 760 to define a triangular or wedge-shaped support for the window frame member 203.

A series of parallel lines or grooves 768 are formed into the lower portion 766, and the parallel lines 768 extend parallel to the base 750. A cut made along any of the parallel lines 768 effectively shortens the length of the lower portion 766 and thus, decreases the angle defined between the base 750 and the beam 760 when the distal end of the lower portion 766 interengages the channel 756. Accordingly, by cutting along an appropriate one of the lines 768, one can configure the sill angle member 740 so that the angle between the base 750 and the beam 760 approaches the angle defined between the existing sill 707 and the main beam 220 on the frame member 203, which should extend substantially horizontally when the window assembly 100 is properly installed.

Once the sill angle member 740 is secured in place and properly adjusted relative to the pre-existing sill 707, the window assembly 700 is positioned within the opening 702 and on the beam 760. The interior walls 230 of the frame members 201–204 contact respective interior trim members 775–778, and the flange 250 on the lower frame member 203 rests just inside the upper portion 764 of the wall 763. The window assembly 700 is then secured within the opening 702 by means of screws 722 and 724 through respective side jamb liners 402 and 404, frame members 202 and 204, and pre-existing side liners 792 and 794 and into respective side jambs 712 and 714. Screws 721 are threaded through the head jamb liner 401, the frame member 201, the pre-existing head liner 791 and into the head jamb 711.

Exterior trim members, such as the pieces 785, 786, and 788 previously removed, are secured, together with respective clips 731, 732, and 734, to respective pre-existing liners 791, 792, and 794 just outside the flanges 250 on the frame members 201, 202, and 204. As shown in FIG. 4, the clip 731, as well as the other clips 732 and 734, includes a beam 735 that extends from a distal end 739 toward the exterior side of the window assembly 700. Opposite the distal end 739, the beam 735 integrally joins a wall 736 that extends substantially perpendicular away from the beam 735 and the window frame 200. Just inside the juncture between the beam 735 and the wall 736, a substantially L-shaped member 737 extends in an opposite direction from the beam 735 and then toward the window frame 200. The L-shaped member 737 and the beam 735 cooperate to define a notch 738 that opens toward the interior side of the window assembly 700 interlocks with the notch 246 on the window frame 200. Finally, exterior trim members, such as the pieces 781, 782, 784 previously removed, are secured relative to the wall and respective trim pieces 785, 786, and 788, and a bead of caulk is deposited in a corners defined between respective moulding members 781, 782, and 784 and clips 731, 732, and 734.

In view of the foregoing, the present invention may also be seen to provide a method of installing a replacement window within an existing window pocket with a sill disposed at a sill angle relative to horizontal. A base is secured relative to the sill in such a manner that a hinge at one end of the base is uphill on the sill, and a beam extending from an opposite end of the hinge is disposed above the base; the beam is pivoted relative to the base in such a manner that an excessively long wall extending downward from the beam engages the base; an assessment is made as to how much of a distal portion must be removed from the wall so that the wall will be properly sized and the beam will be substantially horizontal when the wall engages the base; the beam is pivoted relative to the base in such a manner that the excessively long wall extending from the beam disengages the base; the distal portion is removed from the wall; the beam is pivoted relative to the base in such a manner that the properly sized wall engages the base; and the replacement window is placed on the substantially horizontal beam. The replacement window is maneuvered relative to the beam in such a manner that an upwardly extending continuation of the wall is adjacent and outside a downwardly extending flange on a frame portion of the replacement window.

Windows for New Construction

Another suitable application for the present invention may be described with reference to new construction of houses and other buildings. An example of this application is discussed below with reference to FIGS. 18–21.

A wall 810 is built to have a rough opening 802 bounded by structural members, in this case "2×6" boards approximately five and one-half inches wide and one and one-half inches thick. More specifically, boards **811*a* and 811*b* form a head jamb; boards 812*a* and 812*b* form a side jamb; boards 813*a* and 813*b* form a sill jamb; and boards 814*a* and 814*b* form an opposite side jamb. The exterior of the wall 810 is covered by a first sheet of material 815, such as fiber board. The interior of the wall 910 is covered by an interior sheet of material 917**, such as sheet rock.

The rough opening 802 is sized and configured to receive a new construction window assembly 800. The window assembly 800 is similar in many respects to the preferred embodiment window assembly 100 discussed above with reference to FIGS. 1–13. In addition to the elements discussed above with reference to the window assembly 100, the new construction window assembly 800 further includes extension jamb clips 841–844 secured about an inwardmost portion of the frame members 201–204, and outer frame members or moulding 881–884 secured about an outwardmost portion of the frame members 201–204, respectively. Extending from the outer frame members 881–884 are nailing flanges 891–894, which are shown and described in U.S. Pat. No. 4,958,469 to Plummer. To the extent that it facilitates disclosure of the present invention, this patent application is incorporated herein by reference to same.

When the window assembly 800 is placed within the rough opening 802, the frame members 201–204, extension jamb clips 841–844, and outer frame members 881–884 are adjacent respective jambs 811–814. The nailing flanges 891–894 are arranged to extend outward from the outer frame members 881–884 and to lie substantially flush against the first exterior sheet 815. Nails or other fasteners are then used to secure the nailing flanges 891–894 to the first exterior sheet 815, either before or after a second exterior sheet 816, such as wood siding, is placed over the nailing flanges and the first exterior sheet 815. The nailing flanges 89–894 span and thereby seal any gap between the window frame 200 and the jambs about the rough opening 802. A bead of caulk is then disposed along the juncture 817 between the outer frame members 881–884 and the second exterior sheet 816 to provide an additional seal. The window assembly 800 is also secured within the rough opening 802 by screws 822 and 824 through the side jamb liners 402 and 404 and the frame members 202 and 204, and into the side jambs 812 and 814, respectively, and screws 821 through the head jamb liner 370 and the frame member 201, and into the head jamb 811.

Recognizing that the three and one-half inch deep window assembly 800 does not fully occupy the five and one-half inch deep rough opening 802, extension jambs 861–864 are provided to span the unoccupied depth of the rough opening 802. Each of the extension jambs 861–864 is wood and has the cross-sectional shape or profile of that shown in FIG. 22 for the sill extension jamb 861. The profile includes a relatively long segment 865 and a relatively short segment 866 that are integrally joined at an obtuse angle relative to one another to define an elbow 867. An opposite, distal end 868 of the longer segment 865 is square relative to the sides of the longer segment 865, as is an opposite, distal end 869 of the shorter segment 866. The resulting configuration may be said to provide a half dovetail arrangement having a leading corner 860 that is chamfered in the manner shown.

Figure 22:
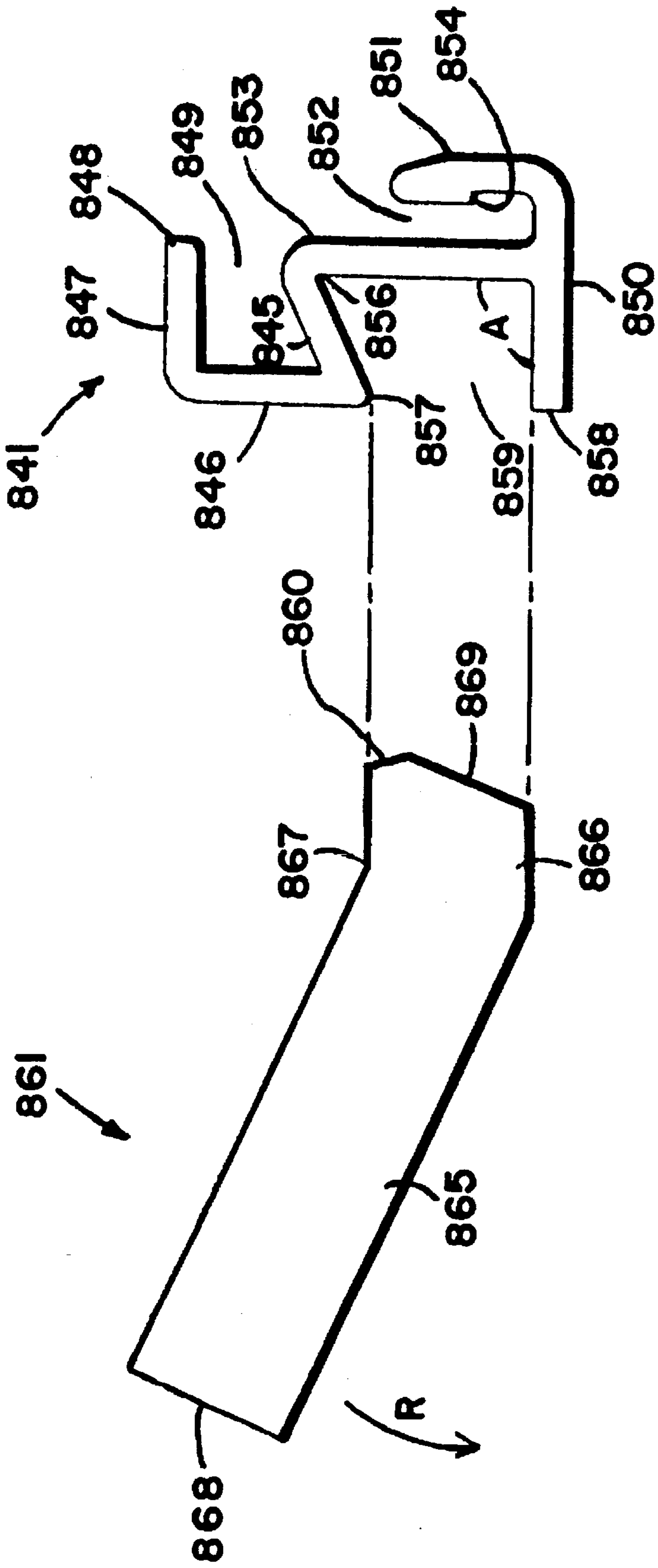
FIG. 22 is a profile or sectioned side view of a preferred embodiment extension jamb and extension jamb clip constructed according to the principles of the present invention and shown in projection relative to one another.

Each of the extension jamb clips 841–844 has the cross-sectional shape or profile of that shown in FIG. 22 for the clip 841. The profile includes a substantially S-shaped portion extending from an upper distal end 848, laterally across an upper horizontal member 847, downward along an upper vertical member 846, substantially laterally across an intermediate member 845, downward along a lower vertical member 853, and laterally across a lower horizontal member 850, to a lower distal end 858. The upper horizontal member 847, the upper vertical member 846, and the intermediate member 845 define a channel or groove 849 therebetween, having a substantially trapezoidal profile and opening in a direction opposite the extension jamb 861. The intermediate member 845, the lower vertical member 853, and the lower horizontal member 850 define a channel or groove 859 therebetween, having a substantially trapezoidal profile and opening in a direction toward the extension jamb 861. The lower horizontal member 850 and the lower vertical member 853 cooperate to define an angle A therebetween. The angle A is slightly less than ninety degrees, eight-eight degrees to be exact, so as to provide a resilient clamping force against an extension jamb inserted therebetween. The chamfered corner 860 helps to wedge the end 869 between corner 857 and the end 858 of the wall 850.

The lower horizontal member 850 extends from the distal end 858 beyond the lower vertical member 853 and integrally joins an additional vertical member 851 that may be said to be barbed. The barbed vertical member 851 cooperates with the lower vertical member 853 and a portion of the lower horizontal member 850 to define a channel or groove 852, which opens in a direction away from the lower horizontal member 850. A shoulder 854 projects from the barbed vertical member 851 into the groove 852. The groove 852 receives the barbed end 232 on the window frame 201 and the respective shoulders 234 and 854 on the frame end 232 and the barbed vertical member 852 interengage to resist withdrawal of the frame end 232 from the groove 852. In this manner, the jamb extension clips 841–844 are secured to the window frame members 201–204, respectively, to arrive at the arrangement 840 shown in FIG. 23.

The width of each channel 859 is substantially similar to the width of the shorter segment 866 on each of the extension jambs 861–864. Beginning with each of the side jamb extensions 862 and 864, each extension is oriented relative to a respective clip as shown in FIG. 22. The shorter segment 866 is inserted into the channel 859 until the leading corner 860 contacts the lower vertical member 853. Each of the side extension jambs 862 and 864 is then rotated relative to a respective clip 842 and 844 in the manner indicated by the arrow R in FIG. 22. The corner 860 travels into a recessed area formed by the acutely angled corner 856 between the intermediate member 845 and the lower vertical member 853; the end 869 moves into a substantially flush or aligned orientation relative to the lower vertical member 853; and a portion of the longer member 865 moves into a substantially flush or aligned orientation relative to the lower horizontal member 850. The same procedure is then followed for the head jamb extension 861 and the sill jamb extension 863.

Figure 23:
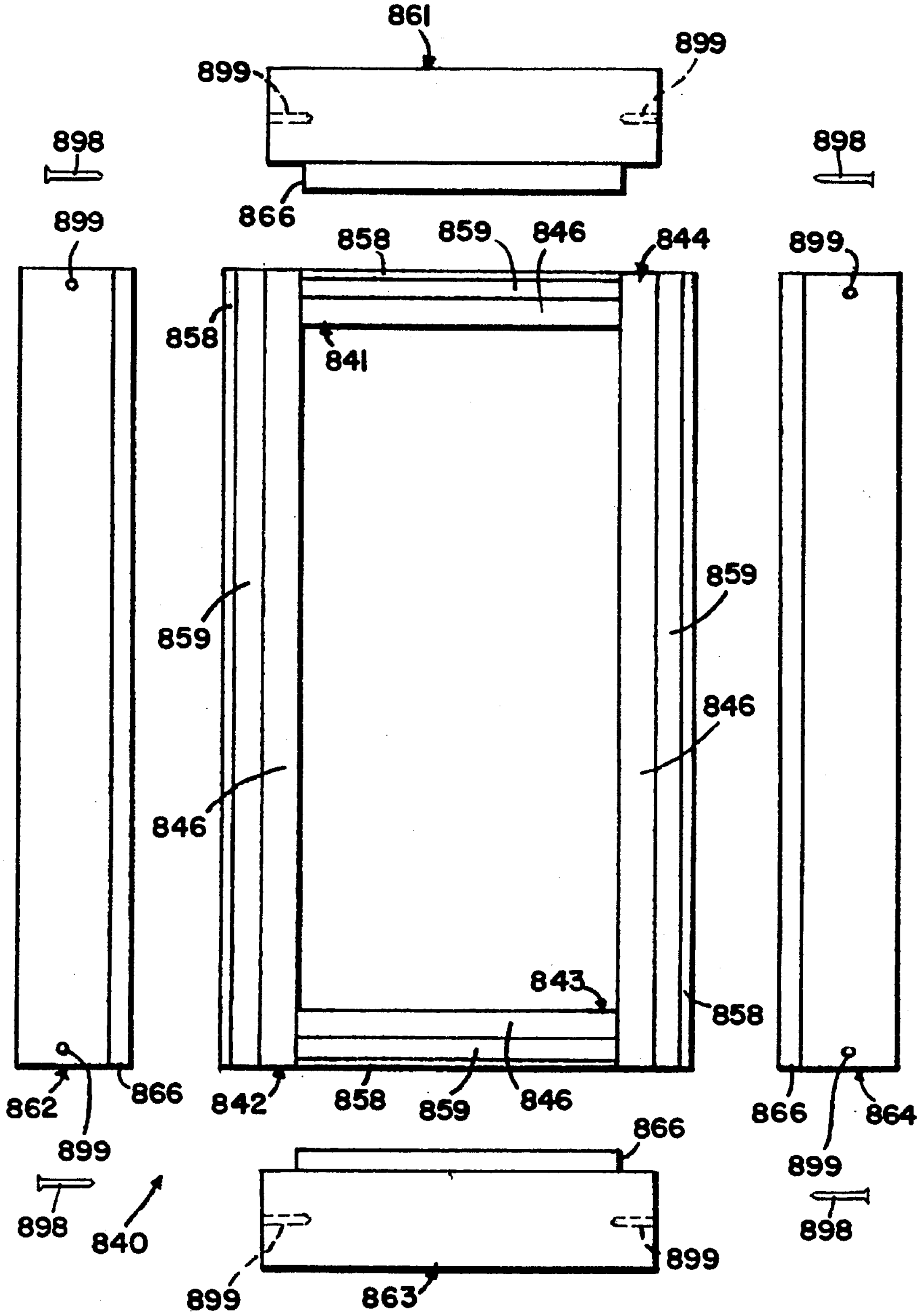
FIG. 23 is a front view of a partially assembled extension jamb assembly constructed according to the principles of the present invention.

As shown in FIG. 23, the side jamb clips 842 and 844 and the side jamb extensions 862 and 864 extend lengthwise substantially the entire length of the window assembly 800. On the other hand, the head jamb clip 841 and the sill jamb clip 843, and the head jamb extension 861 and the sill jamb extension 863 extend lengthwise less than the entire width of the window assembly 800, because they are bordered at opposite ends by the side jamb clips 842 and 844 and the side jamb extensions 862 and 864, respectively. The shorter segments 866 of the head and sill jamb extensions 861 and 863 extend lengthwise the same distance as the head and sill jamb clips 841 and 843, respectively. The longer segments 865 of the head and sill jamb extensions 861 and 863 extend lengthwise beyond the shorter segments 866 to span the upper vertical members 846 of the side jamb clips 842 and 844 and abut the side jamb extensions 862 and 864. Once the head and sill jamb extensions 861 and 863 are inserted into their respective clips 841 and 843 and rotated between the opposing side jamb extensions 862 and 864, the four jamb extensions are secured in place by screws 898, which extend through holes 899 in the side jamb extensions and into the head and sill jamb extensions. This half dovetail extension jamb arrangement 840 requires only four screws to assemble and eliminates the need or use of nails or other fasteners extending from the extension jambs into the window frame or associated structure.

Once the extension jambs are secured in place, trim members 871–874 are secured between the square ends 868 of the respective extension jambs 861–864 and the interior sheet of material 817, either before or after the interior sheet of material 817 is coated with paint or some other finish.

Windows for Window Out/Window In Replacement

Yet another suitable application for the present invention may be described with reference to replacement of entire window assemblies in existing houses and other buildings. An example of this application is discussed below with reference to FIGS. 24–27.

Figure 24:
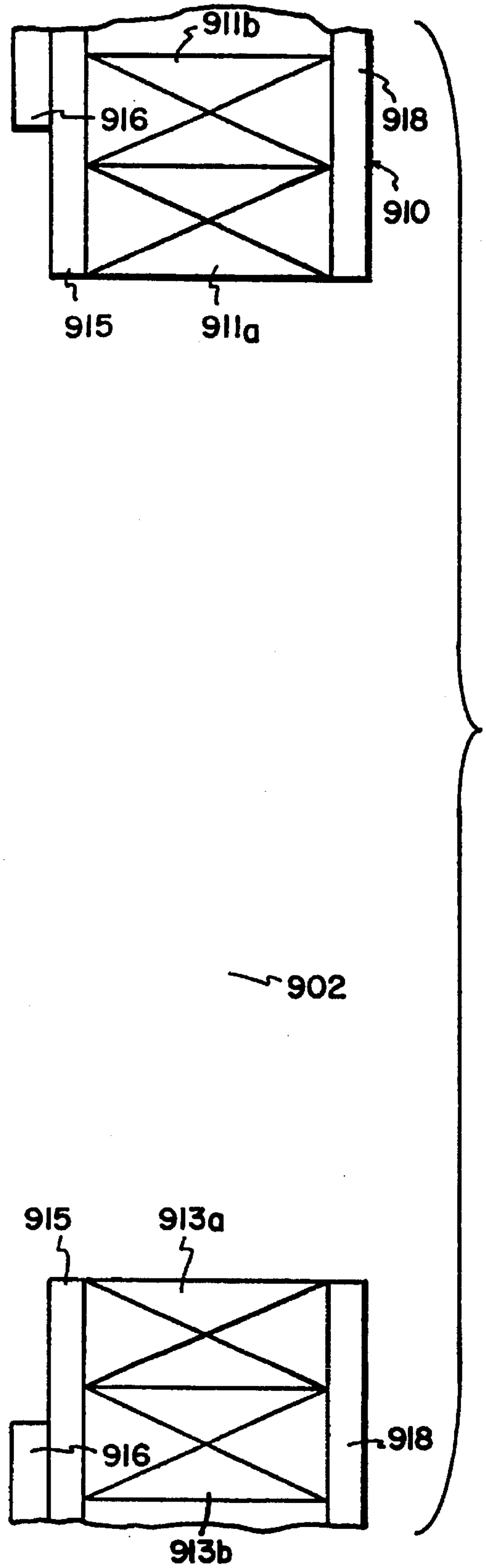
FIG. 24 is a sectioned side view of a rough opening suitable for supporting a double hung window assembly constructed according to the principles of the present invention for new construction.
Figure 25:
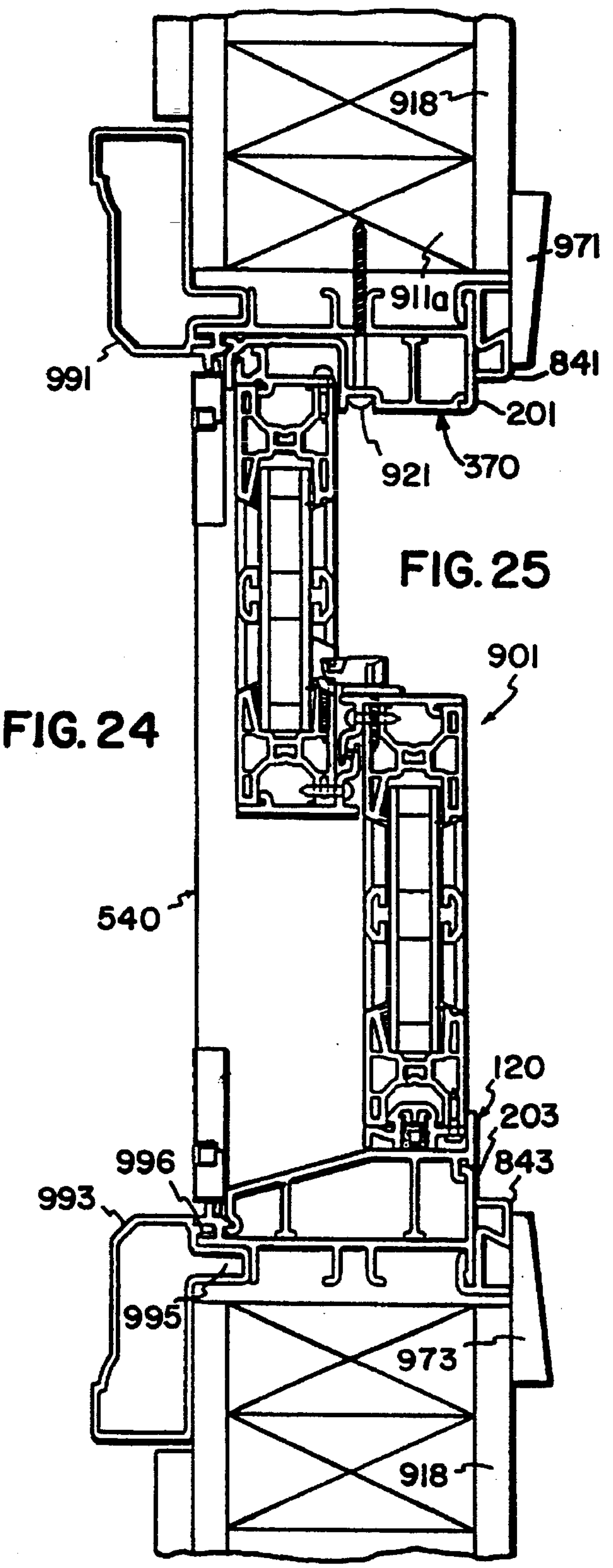
FIG. 25 is a sectioned side view of a preferred embodiment double hung window assembly constructed according to the principles of the present invention for new construction and shown secured within the rough opening depicted in FIG. 24.
Figure 27:
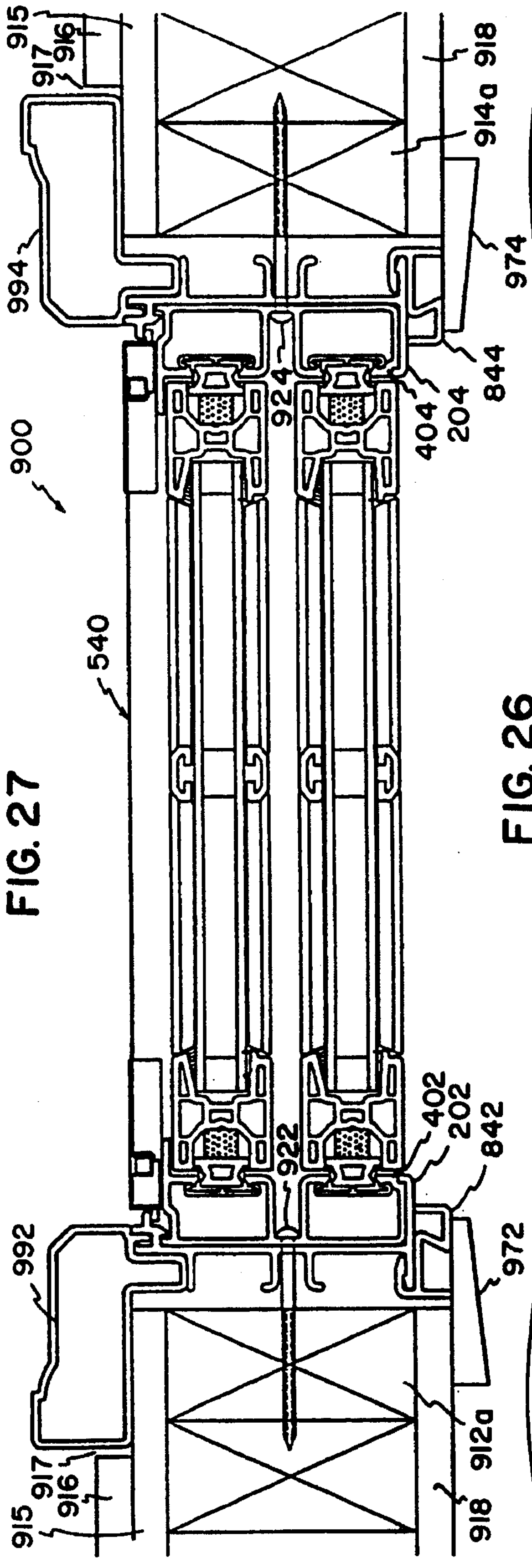
FIG. 27 is a sectioned top view of the rough opening and preferred embodiment double hung window assembly depicted in FIG. 25.
Figure 26:
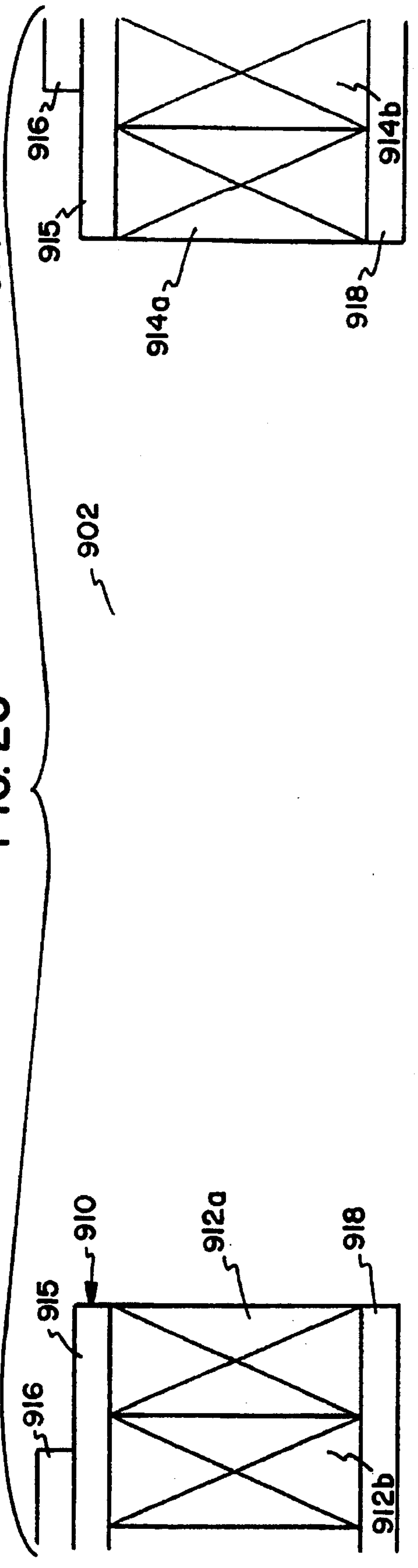
FIG. 26 is a sectioned top view of the rough opening depicted in FIG. 24.

Removal of an existing window assembly, including the frame and moulding, leaves a rough opening 902 in a wall 910 as shown in FIGS. 24 and 26. The rough opening 902 is bounded by structural members, in this case "2×4" boards approximately three and one-half inches wide and one and one-half inches thick. Boards **911*a* and 911*b* form a head jamb; boards 912*a* and 912*b* form a side jamb; boards 913*a* and 913*b* form a sill jamb; and boards 914*a* and 914*b* form an opposite sill jamb. The exterior of the wall 910 is covered by a first sheet of material 915, such as fiber board, which in turn is covered by a finish material 916, such as wood siding. The interior of the wall 910 is covered by an interior sheet of material 917**, such as sheet rock, which in turn is covered by a finish material, such as paint.

A suitably sized replacement window 901 is positioned within the rough opening 902 and secured in place by means of screws 921 driven through the head liner 370 and upper frame member 201 and into the head jamb 911*a*, and screws 922 and 924 driven through the side jamb liners 402 and 404 and side frame members 202 and 204 and into the side jambs 912*a* and 914*a*, respectively. Interior trim members 971–974 are secured between the interior sheet of material 917 and the upper vertical members 846 on respective jamb clips 841–844. Exterior trim members 991–994 are secured to the exterior sheet of material 916. Each of the exterior trim members 991–994 includes a wall 995 that extends toward the interior side of the window assembly 900 and abuts the flange 250 on the window frame 200, and a flange 996 that extends toward the interior side of the window assembly 900 and into the notch 246 on the window frame 200. A bead of caulk is disposed along a corner defined between each of the trim members 991–994 and the exterior sheet of material 916.

Mulling

Figure 28:
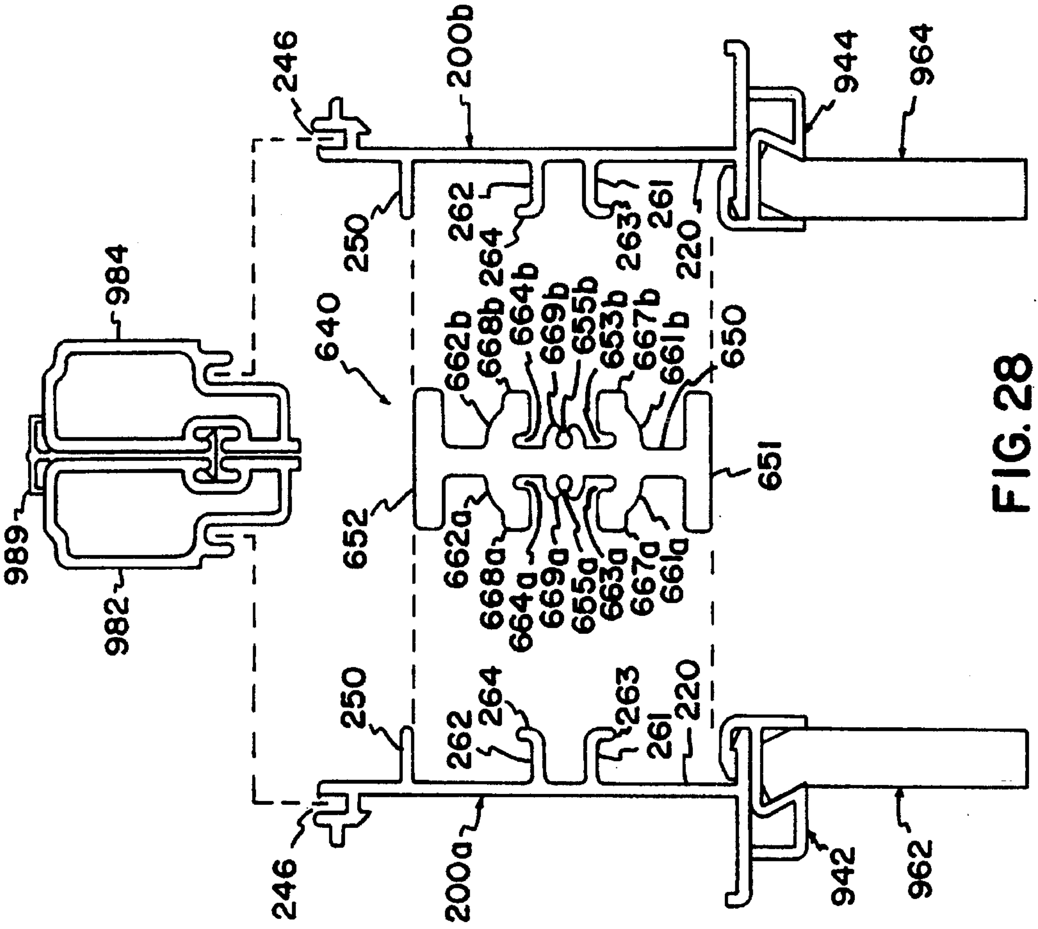
FIG. 28 is a profile or sectioned side view of a preferred embodiment mulling joining strip and a pair of window frames constructed according to the principles of the present invention and shown in projection relative to one another.

In situations where it is desirable to join two or more window assemblies side-by-side, the present invention also provides a mulling strip or spline 640. The mulling strip 640 is an aluminum extrusion having the profile shown in FIG. 28. The mulling strip 640 is generally shaped like an I-beam having a main beam or base 650 and a pair of flanges 651 and 652 disposed at opposite ends of the base 650. The top and bottom flanges 651 and 652 extend parallel to one another and perpendicular to the base 650 to define a profile width. The top and bottom flanges 651 and 652 also define a profile height therebetween. The profile is symmetrical about its longitudinal axis and about a lateral axis disposed halfway between and parallel to the top and bottom flanges 651 and 652.

On opposite sides of the midpoint of the base 650, curved fingers extend from each side of the base and toward their counterparts on the same side of the base and opposite side of the lateral axis to substantially C-shaped members 669*a* and 669*b*. The C-shaped members 669*a* and 669*b* extend between the legs 261 and 262 on the frame member 200*b* and thereby function as a means for maintaining a minimum distance therebetween. The C-shaped members 669*a* and 669*b* also define screw chases or grooves 655*a* and 655*b* on opposite sides of the base and extending the length of the strip 640. The grooves 655*a* and 655*b* receive screws that secure a cover over the ends of the mulling strip 640 and interconnected frames 203*a* and 200*b*.

Intermediate the C-shaped members 669*a* and 669*b* and each flange 651 or 652, intermediate flanges or arms 661*a*, 661*b*, 662*a*, and 662*b* extend from each side of the base 650 and toward their counterparts on the same side of the base and opposite side of the lateral axis about which the profile is symmetrical. Each of the arms 661*a*, 661*b*, 662*a* and 662*b* curves toward the lateral axis and terminates in a respective block-shaped end 667*a*, 667*b*, 668*a*, and 668*b* and defines a respective gap or slot 663*a*, 663*b*, 664*a*, or 664*b* together with the base 650. The arms 661*a*, 661*b*, 662*a* and 662*b* are sized and configured to receive and retain the legs 261 and 262 and feet 263 and 264 on adjacent window frames 200*a* and 200*b*. Also, each block-shaped end 667*a*, 667*b*, 668*a*, and 668*b* engages an outer side of a respective leg 261 or 262 and extends between a respective foot 263 or 264 and a main beam 220.

The arms 661*a*, 661*b*, 662*a*, and 662*b* extend about the outer sides of the legs 261 and 262 and thereby function as a means for maintaining a maximum distance therebetween. The arms 661*a*, 661*b*, 662*a*, and 662*b*, as well as the top and bottom flanges 651 and 652, also extend between the main beams 220 on the frame members 200*a* and 200*b* and thereby function as a means for maintaining a minimum distance therebetween. The mulling strip or spline 640 is installed by placing the two window frames an appropriate distance apart from one another and sliding the strip 640 therebetween along an axis perpendicular to the main beam 650 and the top and bottom flanges 651 and 652.

Figure 29:
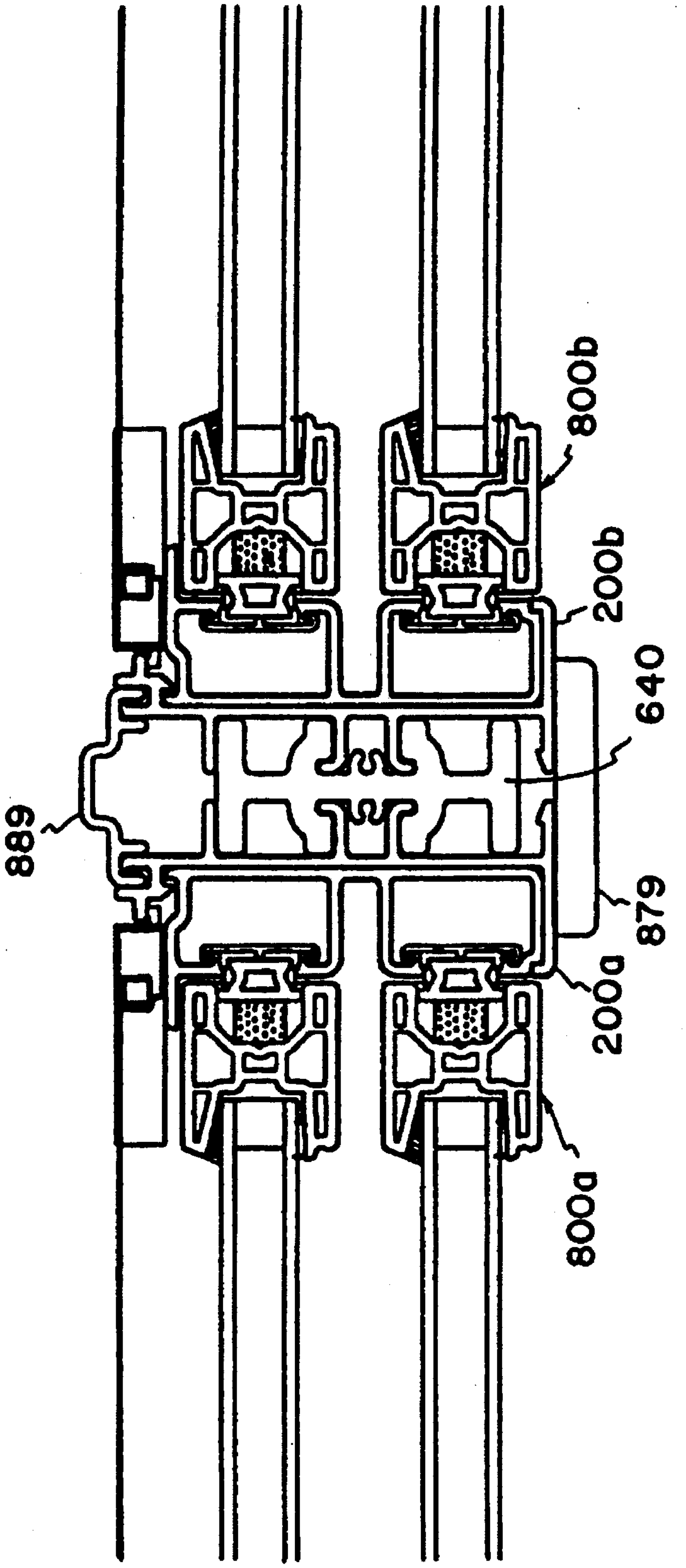
FIG. 29 is a profile or sectioned side view of a preferred embodiment mulling joining strip constructed according to the principles of the present invention and shown interconnecting two pocket replacement type window assemblies constructed according to the principles of the present invention.

In FIG. 29, the mulling strip 640 is shown interconnecting a pair of pocket type replacement windows 800*a* and 800*b*. An interior trim piece 879 is secured to and extends between the interior walls 230 on the respective frames 200*a* and 200*b*. An exterior trim piece 889 is secured to and extends between the channels 246 on the respective frames 200*a* and 200*b*.

Figure 30:
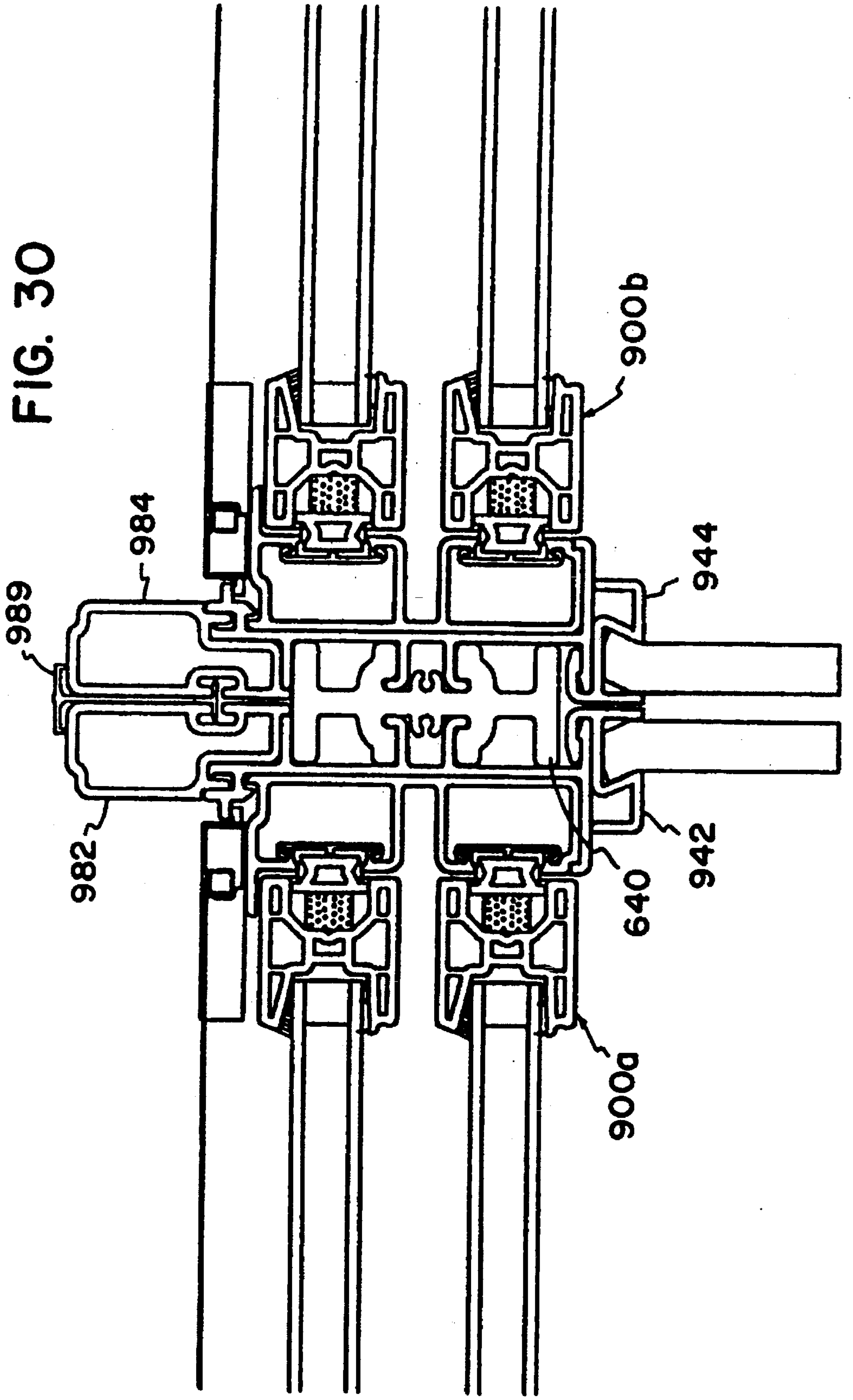
FIG. 30 is a profile or sectioned side view of a preferred embodiment mulling joining strip constructed according to the principles of the present invention and shown interconnecting two new construction type window assemblies constructed according to the principles of the present invention.

In FIG. 30, the mulling strip 640 is shown interconnecting a pair of new construction type windows 900*a* and 900*b*. The extension jamb clips 942 and 944 on the respective windows 900*a* and 900*b* abut one another on the interior side of the connected windows. Exterior trim pieces 982 and 984 on the respective windows 900*a* and 900*b* abut one another on the exterior side of the connected windows and are secured relative to one another by a substantially I-shaped clip 989.

Figure 31:
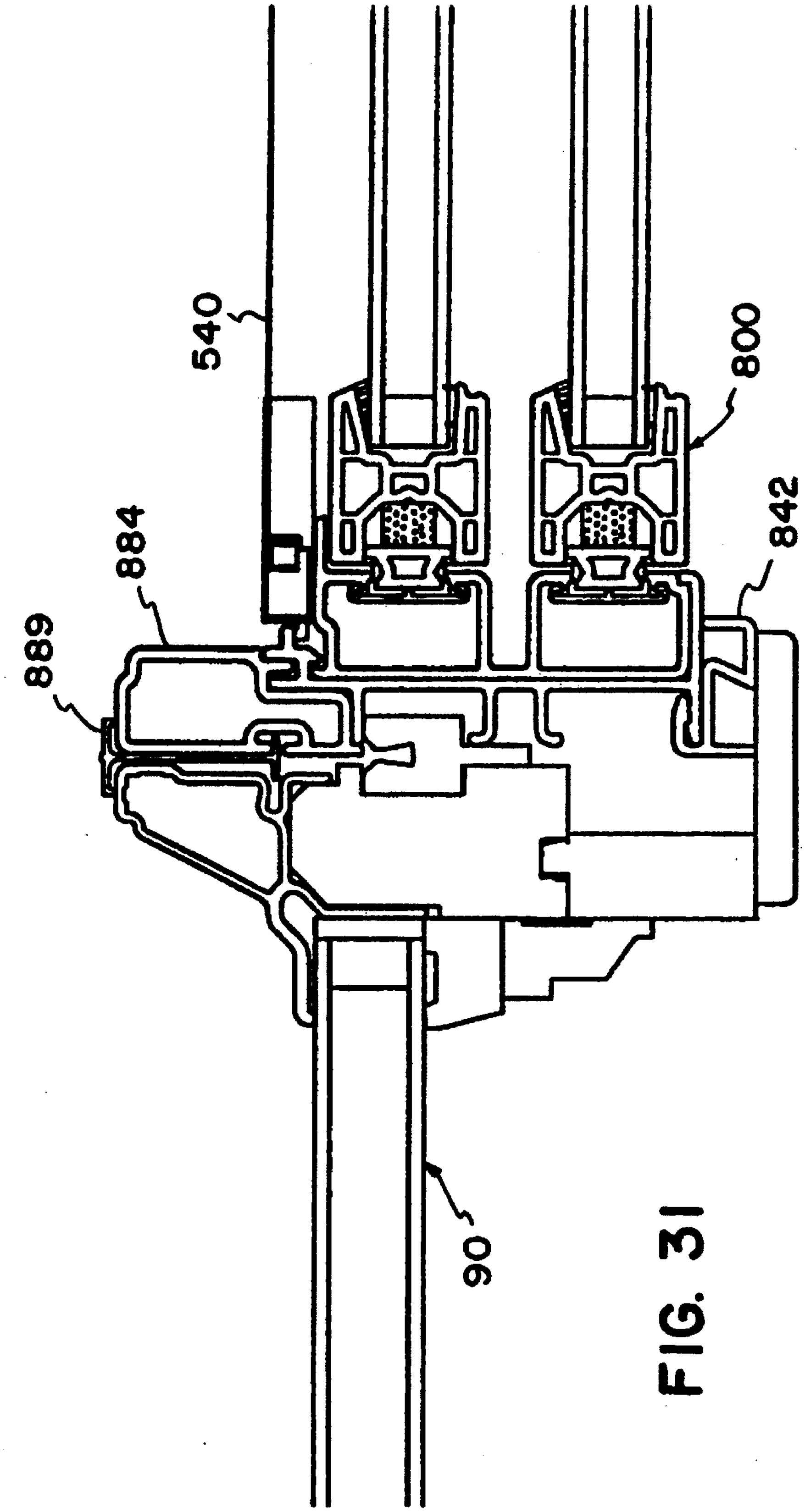
FIG. 31 is a profile or sectioned side view of a preferred embodiment mulling joining strip constructed according to the principles of the present invention and shown interconnecting a Prior Art window assembly to a window assembly constructed according to the principles of the present invention.

In FIG. 31, a pocket type replacement window 800 is shown connected to a Prior Art window 90. The mulling strip 640 is not used to effect this particular interconnection.

Window Grille

The window assemblies shown in FIGS. 15, 17, 19, 21, 25, and 27 are depicted with window grilles secured to both sides of the glass panels by means of double-sided adhesive tape. The tape is intended to be permanent, so that one cannot readily remove and reinstall the grille for whatever reason, such as a change in aesthetic preference or to simplify cleaning of the exposed faces of the glass panels.

In FIG. 1, a grille 500 is shown releasably secured to the interior side of the lower sash 302 according to the principles of the present invention. More specifically, the grille 500 is secured adjacent the interior side 396 of the glass panel 390 and within the perimeter of the sash frame 300. In a preferred embodiment, the grille 500 is made of a composite material including wood and polyvinyl chloride. Those skilled in the art will recognize that the grille 500 could be made from any of a variety of other materials, such as wood or plastic alone.

The grille 500 includes at least one horizontal member 501 and at least one vertical member 502. In a preferred embodiment, all of the horizontal member(s) 501 and the vertical member(s) 502 have the cross-section of the horizontal member 501 shown in FIGS. 32 and 33. A distal portion 503 of the vertical member 502 is configured to have a beveled end 504 that faces somewhat toward the glass panel 390. An opening 505 extends from the beveled end 504 into the distal portion 503, and a plunger assembly 510 is inserted into the opening 505.

The plunger assembly 510 includes an anchor 511 and a tip 512 which are interconnected by a shaft 513 and a helical spring 514. The anchor 511 is fixedly secured within the vertical member 502, and the shaft 513 is fixedly secured to the anchor 511. The tip 512 is secured to the shaft 513 in such a manner that the tip 512 is free to slide a limited distance along the shaft 513. In particular, the tip 512 moves between a first, unlatched position effectively within the confines of the opening 505, to a second, latched position wherein at least a portion of the tip 512 extends beyond the confines of the opening 505. The spring 514 is slideably mounted on the shaft 513 and is effectively retained in compression between the anchor 511 and the tip 512. The compressive force of the spring 514 urges the tip 512 away from the anchor 511 and toward the second, latched position shown in FIGS. 32 and 33.

Figure 33:
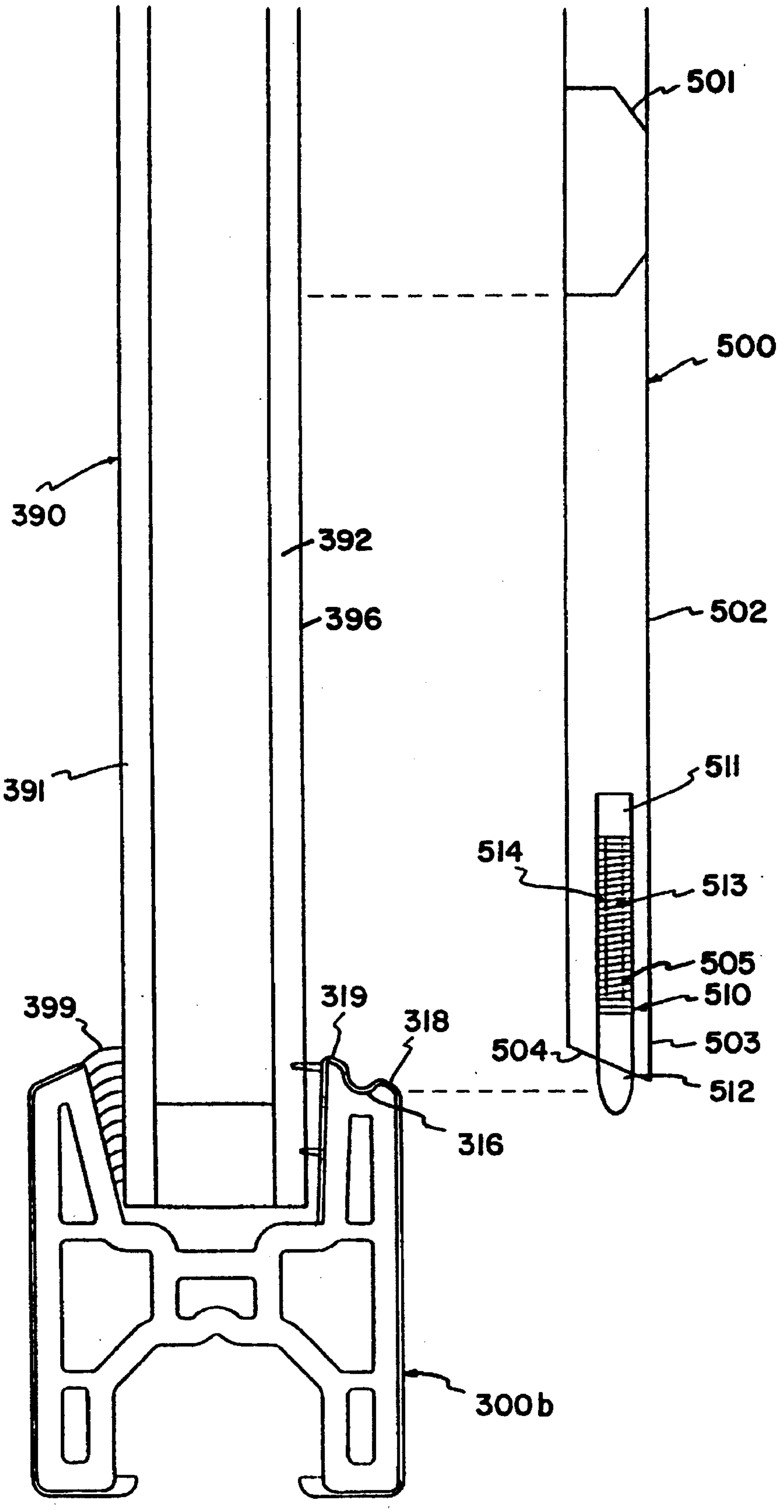
FIG. 33 is a profile or sectioned side view of a preferred embodiment window sash and grille constructed according to the principles of the present invention and shown in projection relative to one another.

As discussed above, the sash profile 310 includes an inclined surface 319 that faces somewhat away from the glass panel 390, and a concave notch 316 is formed in the inclined surface 319. Recognizing that the view shown in FIG. 33 is representative of any orthogonal section taken through the glass panel 390 and any of the sash members 301–304, the inclined surface 319 extends about the entire sash perimeter and thereby defines a closed curve sidewall extending away from the glass panel 390 in such a manner that opposing portions of the sidewall may be said to be divergently directed away from the glass panel 390. The groove 316 extends about the entire sash perimeter and thereby defines a continuous groove in the sidewall. The groove 316 is disposed at a fixed distance inward from the interior side 396 of the glass panel 390.

Figure 32:
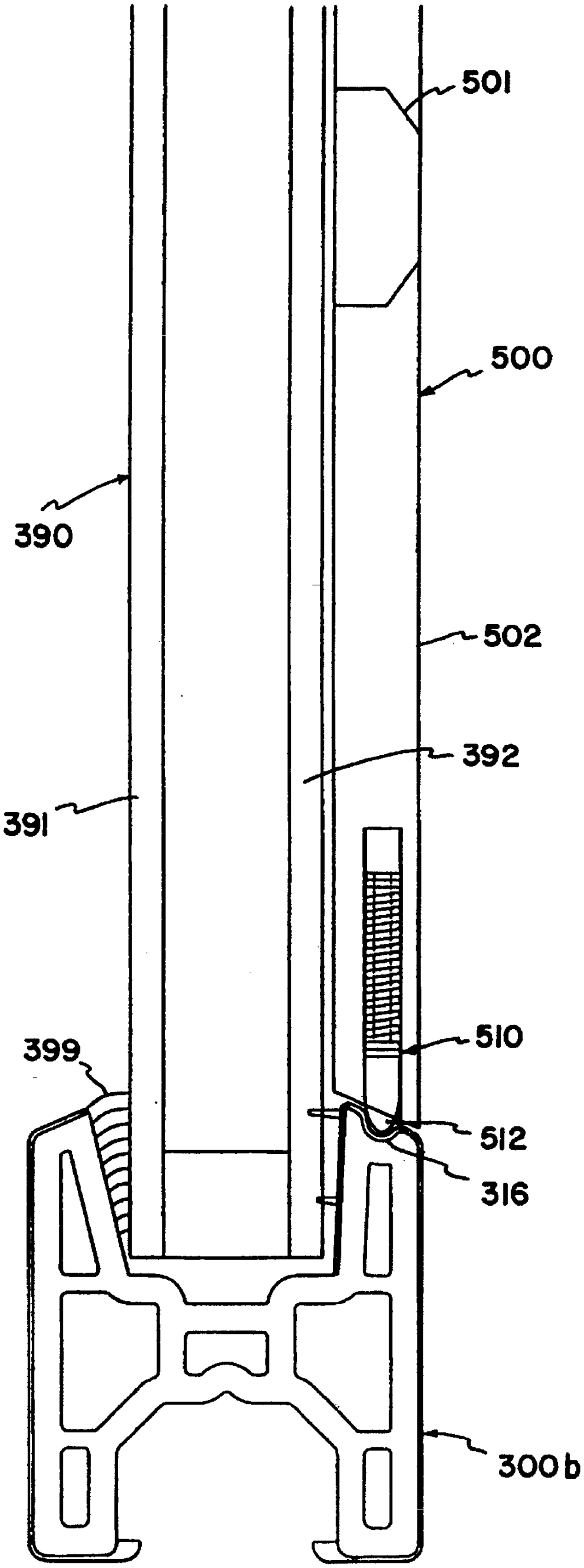
FIG. 32 is a profile or sectioned side view of a preferred embodiment window sash and grille constructed according to the principles of the present invention and shown attached to one another.

The angle between the inclined surface 319 and the glass panel 390 is complementary to the angle between the beveled ends 504 and the glass panel 390. Accordingly, the inclined surface 319 and the beveled ends 504 are substantially parallel to one another when the grille 500 is adjacent the glass panel 390, as shown in FIG. 32. In order to arrive at the latched position shown in FIG. 32, the grille 500 is simply moved toward the sash 302. The beveled ends 504 cooperate with the inclined surface 319 to align the grille 500 with the sash frame 300. Upon encountering an inwardmost edge 318 of the sash frame 300, the plunger tips 512 retract into the distal end openings 505 until clearance is attained. The tips 512 subsequently encounter the inclined surface 319 and then the groove 316. At this point, the compressive force of the spring 514 urges the tips 512 into engagement with the groove 316, thereby latching the grille 500 relative to the sash **300*b*. The grille 500 is unlatched simply be pulling outward on the grille members until the tips 512 ease out of the groove 316**.

In a preferred embodiment, all of the grille's distal ends are beveled in the manner shown in FIGS. 32 and 33, and one such plunger assembly 504 is nested within each distal end 503 of each vertical member 502. However, those skilled in the art will recognize that the present invention is not limited in this regard. For example, plunger assemblies 504 could additionally or alternatively be nested within distal ends of the horizontal members 501 and/or plunger assemblies 504 could be nested within every other vertical member 502 and/or horizontal member 501. At a minimum, two plunger assemblies 500 are necessary to secure the grille 500 to the sash **300*b*, and the two assemblies or groove engaging members must engage opposite sides of the sash frame 300**.

The contours of the groove 316 and the tips 512 are such that the grille 500 is conveniently snapped into and out the latched position shown in FIG. 32. The arrangement of the inclined surface 319 and the beveled ends 504 is such that the groove 316 and the plunger tips 512 are effectively hidden from view. The provision of a lineal groove about the entire perimeter of the sash frame 399 is advantageous in other respects, as well. For example, initial installation of the grille 500 does not require any prepatory work on the sash frame 399, and there is no need to worry about the relative locations of the grille's distal ends along the sash frame 399. Once the size of the sash frame 399 is known, any sort of grille that is fitted with the plunger assemblies 500 or functionally similar structure can be made for attachment to the sash frame 399.

In view of the foregoing, the present invention may also be seen to provide a method of securing a grille to a glass panel that is mounted within a perimeter of a sash frame. A continuous groove is formed about the perimeter of the sash frame at a fixed distance from the glass panel; groove engaging members are disposed at distal ends of the grille; and the grille is sized relative to the sash frame so that the groove engaging members engage the continuous groove when the grille is adjacent the glass panel.

Screen

Figure 34:
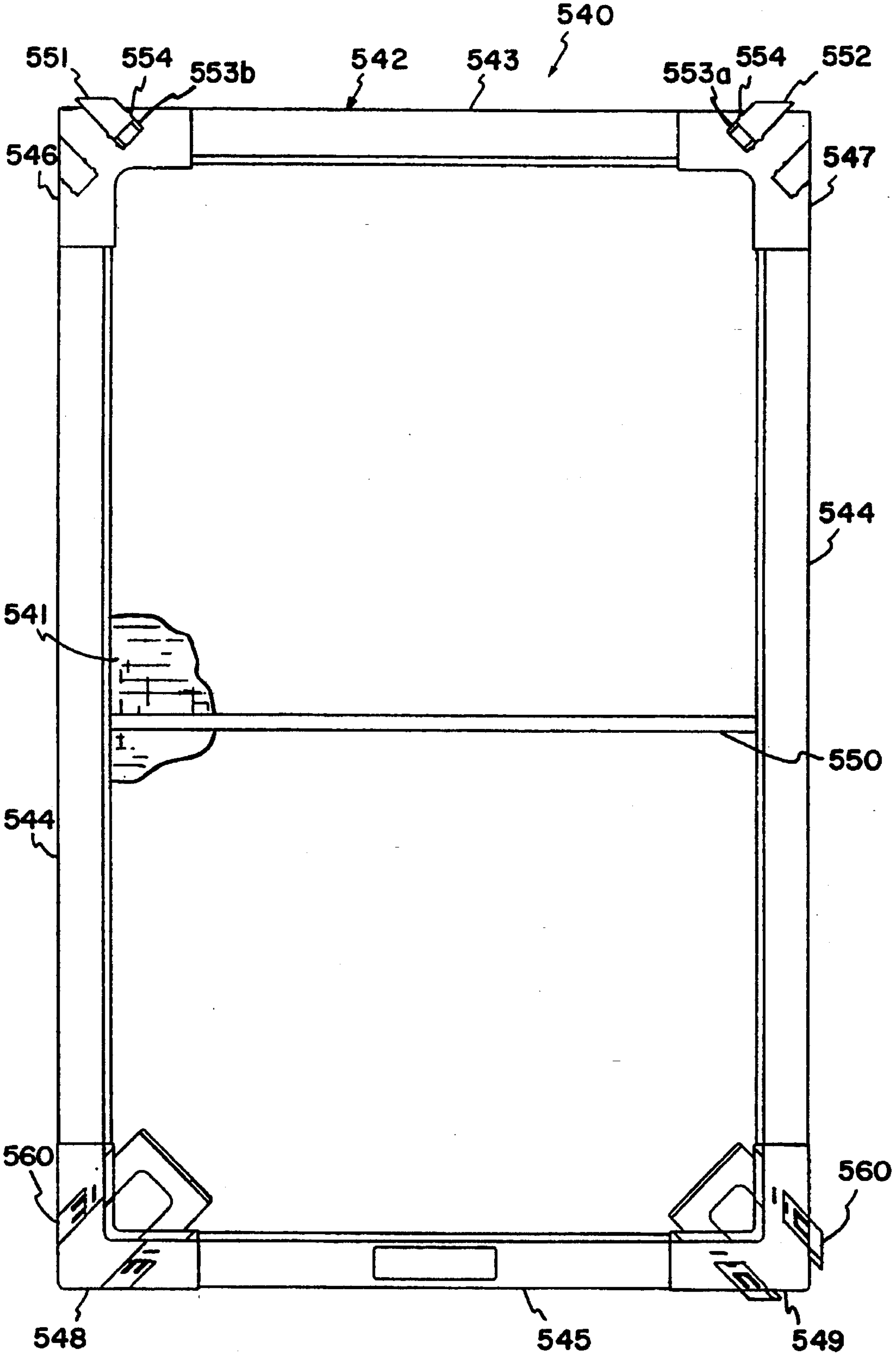
FIG. 34 is a profile or sectioned side view of a preferred embodiment window screen constructed according to the principles of the present invention.

Each of the three types of windows described herein is shown with a screen 540 attached thereto. As shown in FIG. 34, the screen 540 generally includes a screen material 541, supporting means 542 for supporting the screen material 541 in a desired configuration, and connecting means for releasably connecting the supporting means 542 to the window frame 200.

The supporting means 542 includes an upper bar 543, a pair of side bars 544, and a lower bar 545, which are arranged to correspond in size and configuration with the opening defined by the window frame 200, which is a rectangle in the preferred embodiment. The ends of the upper bar 543 are connected to upper ends of the side bars 544 by corner members 546 and 547, and the ends of the lower bar 545 are connected to lower ends of the side bars 544 by corner members 548 and 549. The corner member 546 may be said to be a mirror image of the corner member 547, and the corner member 548 may be said to be a mirror image of the corner member 549. An additional lateral bar 550 extends between the side bars 544 intermediate the upper bar 543 and the lower bar 545 to provide additional structural support. Those skilled in the art will recognize that a single type of corner member could be used at all four junctures between the bars.

Figure 35:
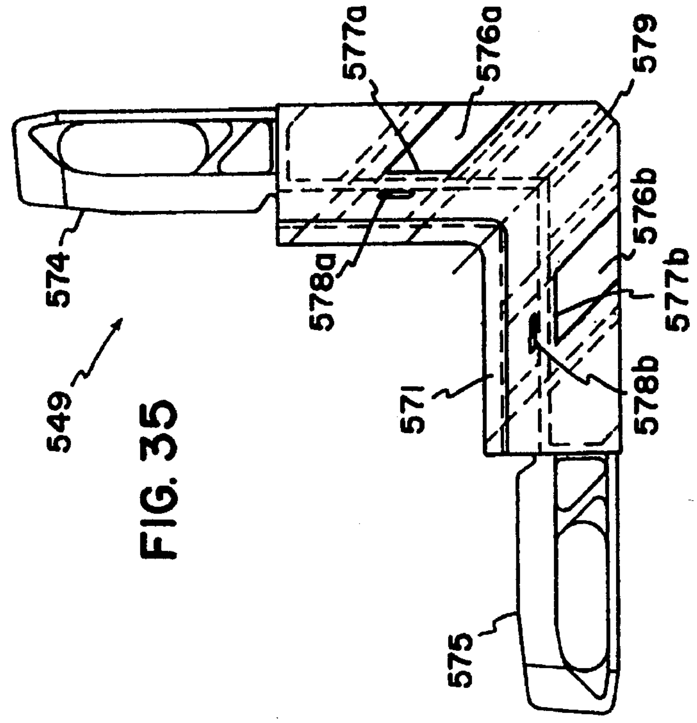
FIG. 35 is a front view of a corner from the window screen depicted in FIG. 34.
Figure 36:
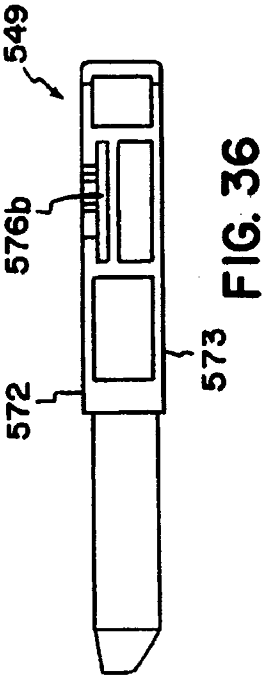
FIG. 36 is an end view of the corner depicted in FIG. 35.

The lower corner 549 is shown in greater detail in FIGS. 35–36. The lower corner 549 includes a spline channel 571 for retaining the screen material 541. The lower corner 549 has an interior face 572 and an exterior face 573. The lower corner 549 further includes a first tongue 574 to which the lower end of a side bar 544 is secured, and a second tongue 575 to which an end of the lower bar 545 is secured. The tongues 574 and 575 extend perpendicularly away from one another and share a common outer edge at outer corner 579. A pair of parallel T-shaped slots **576*a* and 576*b* are formed in the lower corner 549 on opposite sides of the outer corner 579. The slots 576*a* and 576*b* define angles of forty-five degrees relative to the tongues 574 and 575. A portion of each slot 576*a* and 576*b* is exposed to the interior side 572 of the corner 549 from an outer edge of the corner 549 inward to a respective intermediate edge 577*a* and 577*b*. An opening 578*a* or 578*b* extends from the interior side of each slot 576*a* and 576*b* through the corner member 549** and into the slot for reasons that will become apparent below.

Figure 37:
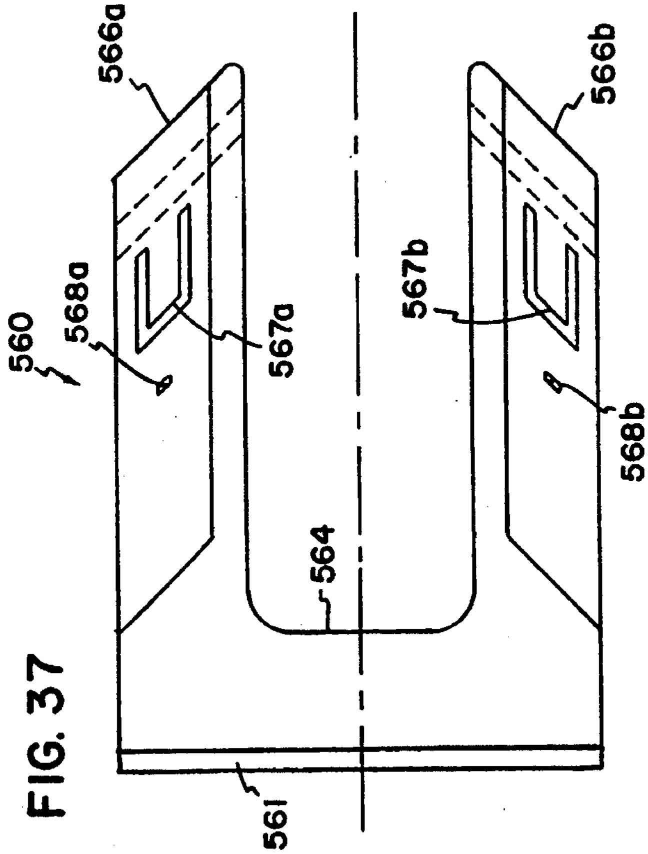
FIG. 37 is a front view of an operator from the window screen depicted in FIG. 34.
Figure 38:
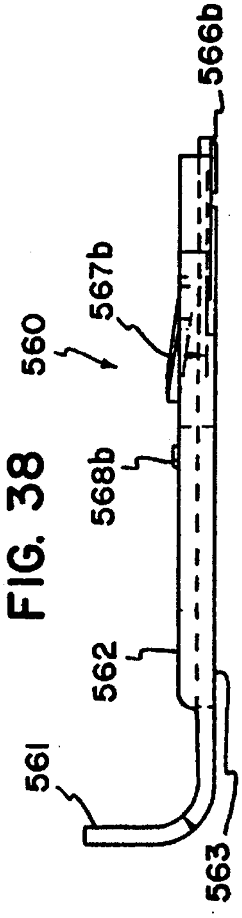
FIG. 38 is an end view of the operator depicted in FIG. 37.

The connecting means includes a pair of latch operators 551 and 552 associated with each of the upper corners 546 and 547, and a U-shaped latch operator 560 associated with each of the lower corners 548 and 549. The operator 560 is shown in greater detail in FIGS. 37–38. The operator 560 includes a handle 561, a main body 564, and a pair of parallel rails **566*a* and 566*b* having T-shaped cross-sections that correspond to the T-shaped slots 576*a* and 576*b* in the corner member 549. The operator 560 has an interior face 562 and an exterior face 563. Each of the rails 566*a* and 566*b* is formed with a resiliently deflectable shoulder 567*a* and 567*b* which projects beyond the interior face 562 when in an unbiased state, and a nub 568*a* or 568*b* which projects beyond the interior face 562, as well. Assembly of the screen 540 requires passage of the rails 566*a* and 566*b* into the slots 576*a* and 576*b* to arrive at an "unlatched" position of the operator 560 relative to the corner 548 shown in FIG. 34. The shoulders 567*a* and 567*b* deflect back toward the interior face 562 during insertion of the rails until they clear the edge 577a and 577b, at which point they "snap" into the inwardly open portions of the slots, and the nubs 568a and 568b come into alignment with the openings 578a and 578b. Further insertion of the rails places the operator 560 in a "latched" position relative to the corner member 549, at which point the nubs 568a and 568b "snap" into the inwardly open portions of the slots 576a and 576b**, respectively.

The upper corners 546 and 547 and the upper operators 551 and 552 are functionally similar to the lower corners 548 and 549 and the lower operators 560. However, the upper operators 551 and 552 have only a single rail and thus, engage only a single side of the frame. The single rail operators 551 and 552 are designed to be moved to their latched positions prior to installation and allowed to remain in their latched positions thereafter. Those skilled in the art will recognize that double rail operators 560 could be used at all four corners of the screen 540. However, the absence of any handle for unlatching the upper operators 551 and 552 results in a less obstructed view through the screen 540. Like the lower corners 548 and 549, the upper corners 546 and 547 have T-shaped slots formed therein. The upper operators 551 and 552 include rails having T-shaped cross-sections or profiles that correspond to the slots. The upper corners 546 and 547 have a pair of detents 553a and 553b formed in each of the opposing sidewalls of each slot, and each operator 551 or 552 has a nub 554 projecting outward from each side of its rail. As shown in FIG. 34, the nubs 554 engage the inwardly disposed detents 553a to bias the operator in an unlatched or non-protruding position relative to an upper corner, and the nubs 554 engage the outwardly disposed detents 553b to bias the operator in a latch position relative to an upper corner.

Figure 39:
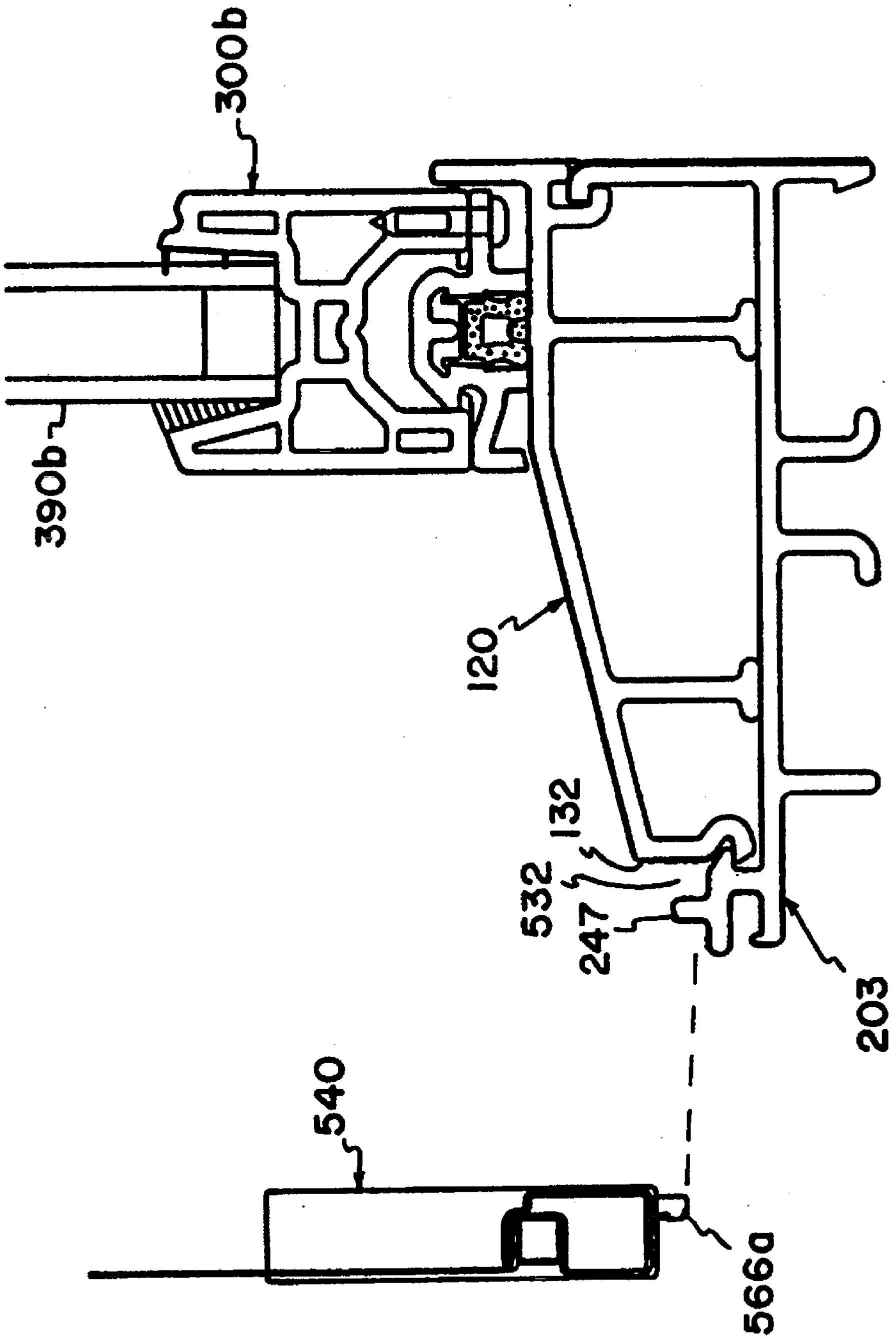
FIG. 39 is a profile or sectioned side view of a preferred embodiment window screen and frame constructed according to the principles of the present invention and shown in projection relative to one another.

The operators 551, 552 and 560 project beyond the screen, frame 542 to latch the screen 540 relative to the window frame 200. As shown in FIG. 39, the projecting rails, including rail 566a, engage a channel 532 extending about an outermost perimeter of the window frame 200. The outer wall of the channel 532 is formed by an inwardly facing distal flange 247 on the exterior side of the window frame 200, which extends away from its supporting jamb. Along the sill of the window, the inner wall of the channel 532 is formed by the outwardmost wall 132 on the sill liner 120. Along the sides of the window, the inner wall of the channel 532 is formed by the outwardmost wall 443 on the side jamb liners 402 and 404. Along the head of the window, the inner wall of the channel 532 is formed by the outwardmost wall 380 on the head liner 370.

The screen 540 is installed by (a) moving the single rail operators 551 and 552 to their latched positions; (b) moving the double rail operators 560 to their unlatched positions; (c) moving the screen 540 so that the single rail operators 551 and 552 engage the channel 532 formed between the flange 247 on the frame member 201 and the wall 380 on the head jamb liner 370; (d) moving the screen into a parallel orientation relative to the window panel 390b; and (e) moving the double rail operators 560 to their latched positions.

According to this aspect of the present invention, a screen or other insert is secured relative to each side of a framed opening. The latch operator 60 requires only a single user manipulation to latch the screen or other insert relative to each of two sides that form a corner of the framed opening. Furthermore, the latch operators cooperate with the corners to provide a positive locking arrangement to signal when the operators are properly latched and/or unlatched relative to the framed opening.

Joint Structure

Figure 40:
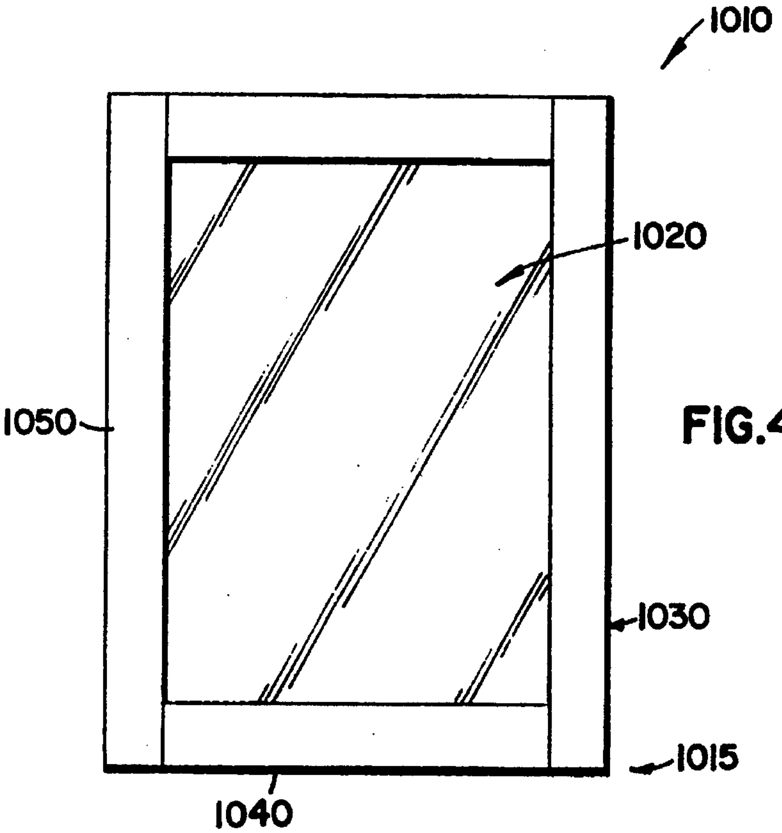
FIG. 40 is an elevational view of an interior side of a sash and window assembly utilizing a preferred joint structure consistent with the invention.
Figure 41:
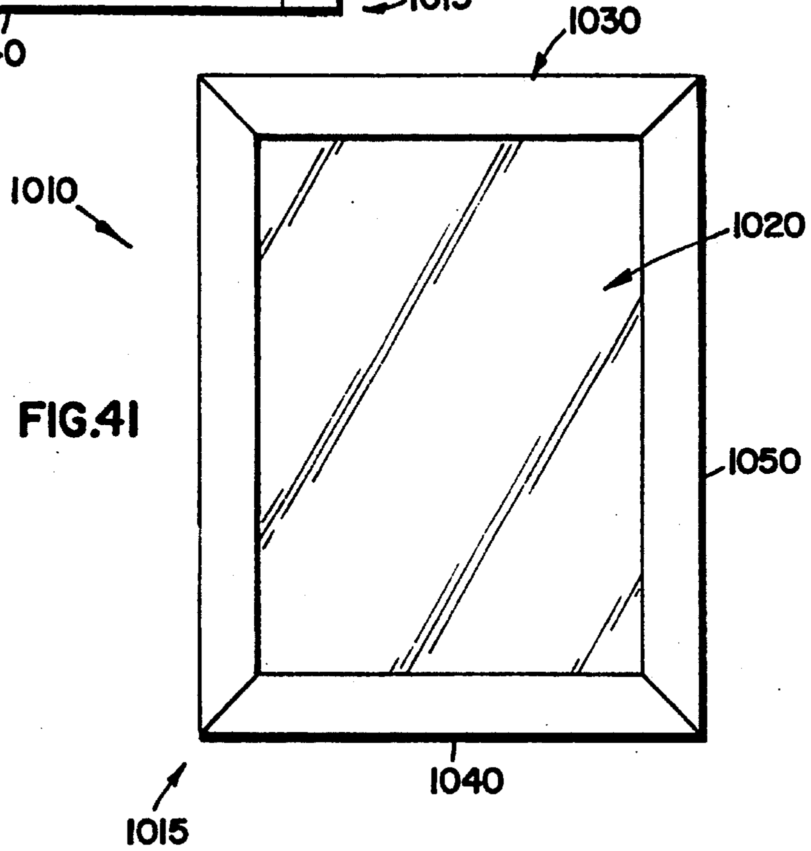
FIG. 41 is an elevational view of the opposite, exterior side of the sash of FIG. 40.

FIGS. 40–41 show a window 1010 constructed according to the principles of the present invention. The method by which the window 1010 is constructed, which is described below, can be applied to appropriate portions of the embodiments discussed above with reference to other aspects of the present invention.

Window 1010 generally includes a window glass assembly 1020 retained within a sash 1030. Window glass assembly 1020 is preferably a double-paned glass assembly, although it will be appreciated that different single paned constructions, triple paned constructions, etc. are known in the art. Window glass assembly 1020 is preferably a self-contained sealed unit.

Sash 1030 generally includes a pair of stile sash members 1050 which extend vertically along the side perimeter of the window glass assembly 1020, as well as a pair of rail sash members 1040 which extend horizontally along the top and bottom edges of window glass assembly 1020. The joints, designated at 1015, include the appearance of a mortise and tenon joint structure on the interior side as shown in FIG. 40. A similar joint structure may be provided on exterior side, however, it is preferred to include the conventional mitered appearance on the exterior side of the sash as shown in FIG. 41.

While the principles of the invention will be discussed in detail hereinafter with regard to a sash for a window, it will be appreciated that other types of framing structures, such as sashes and frames for windows, doors, patio doors, etc., or the like, may be constructed according to the principles of the invention. In addition, other framing structures which require decorative framing surfaces such as picture frames and the like may benefit from the invention.

SASH MEMBER PROFILE

FIG. 42 shows a cross-sectional view of window 1010 through one of the rail sash members 1040. Member 1040 is preferably formed of an extruded composite material which includes wood fiber disposed in a thermoplastic polymer such as polyvinyl chloride (PVC), such as is the subject matter of U.S. patent application Ser. No. 07/938,364, filed by Michael J. Deaner et. al. on Aug. 31, 1992, which was continued as Ser. No. 08/224,396 on Apr. 7, 1994. Other U.S. patent applications directed this composite material include Ser. No. 07/938,365, filed by Michael J. Deaner et. al. on Aug. 31, 1992, which was continued as Ser. No. 08/224,399 on Apr. 7, 1994; Ser. No. 08/017,240 filed by Michael J. Deaner et. al. on Feb. 12, 1993; and Ser. No. 07/938,604, filed by Giuseppe Puppin et. al. on Sep. 1, 1992. To the extent necessary to support this disclosure, the disclosure of these references is incorporated by reference herein.

Member 1040 is preferably formed by an extrusion process, such that common lineal parts may be manufactured and cut to size for forming custom sized framing components. While the preferred members are constructed of the aforementioned composite material, it will be appreciated that other materials, such as thermoplastic or thermosetting polymers and other heat weldable materials, may be used. Furthermore, other materials, such as metals or wood, may benefit from the invention. In addition, while the preferred members are formed by extrusion, it will be appreciated that different manufacturing techniques which are suitable for the particular materials involved may also be used.

Member 1040 includes opposing exterior portion 1040a and interior portion 1040b which typically form the exposed surfaces on the exterior and interior sides of window 1010, respectively. While these surfaces are generally shown as parallel planes, it will be appreciated that different profiles, incorporating curves, ridges, grooves, etc. may be used to provide different decorative features on the opposing surfaces of the member. These portions are preferably coated by a decorative coating 1042 which is preferably a polyvinyl chloride or other material which forms a smooth and aesthetically pleasing surface. Furthermore, the coating is preferably a paintable surface.

The preferred coating is typically extruded during the extrusion process which forms member 1040, however, other manners of coating or layering the coating 1042 onto member 1040 are known in the art. For example, the coating could be provided as a film which adheres to the surfaces of member 1040. The film could include a decorative pattern, such as to simulate wood. Alternatively, a wood veneer may also be layered on top of portions **1040*a* and 1040*b*** to give a pleasing natural wood appearance to the member.

A first, outer hardware mounting channel 1041 is oriented on member 1040 between exterior and interior portions **1040*a* and 1040*b*. This channel is used to form the mechanical connections between the sash and a window frame. Depending on the particular type of window, e.g., a double hung window, a casement window, an awning window, a gliding window, etc., different mechanical devices would be retained by channel 1041**.

Channel 1041 is generally formed by portions **1040*j* and 1040*k* which are joined by portion 1040*m*. Portions 1040*j* and 1040*k* extend generally parallel to portions 1040*a* and 1040*b*, respectively, as well as generally parallel to one another. Portion 1040*m* which joins the portions is curved in cross-section and preferably includes a groove open to channel 1041 which is useful as a pilot for starting screws or other fasteners mounted within the channel. Furthermore, a pair of ridges 1044 extend from portions 1040*j* and 1040*k* into channel 1041 for the purpose of retaining a mechanical device therein. These ridges are preferably formed from the decorative coating material 1042**; however, it will also be appreciated that the composite material discussed above may also be used, whereby the ridges would be part of the standard profile for the member.

It will be appreciated that the cross-sectional profile of channel 1041 will vary depending upon the particular application in which the member 1040 is utilized. For example, different mechanical components may be retained within channel 1041 depending upon whether the sash is used in a double hung, casement, awning, or gliding window, etc.

A second, glass receiving channel 1043 is formed opposite first channel 1041. Channel 1043 receives and supports window glass assembly 1020 in sash 1030. Channel 1043 is a generally U-shaped groove formed by opposing portions **1040*c* and 1040*g* connected by portions 1040*d*, 1040*e*, and 1040*f*. Portion 1040*c* acts as a ramp on which window glass assembly 1020 preferably rides during insertion into the channel. Portion 1040*g* on the opposing side of the channel preferably includes first and second flexible members, or flexibles, 1046*a* and 1046*b*** which are preferably formed of a plastic such as PVC.

Flexibles **1046*a* and 1046*b* extend along the length of channel 1043, and are preferably compressible and/or bendable. The flexibles are preferably extruded onto member 1040 after extrusion of the member and coating 1042 thereon. During assembly, insertion of window glass assembly 1020 into channel 1043 tends to compress the flexibles and thereby wedge the window glass assembly within the channel against portion 1040*c*. It has been found that this construction generally provides an easily installable yet secure connection between window glass assembly 1020 and sash member 1040**.

Channel 1043 also includes portions **1040*d* and 1040*e* which extend generally parallel to the end surface of window glass assembly 1020. Each portion separately receives one of the panes of glass (1022 and 1024) to individually support these glass panes substantially along their entire lengths. Through proper sizing of the sash members, window glass assembly 1020 is able to rest securely against portions 1040*e* and 1040*d* substantially around its perimeter. Furthermore, by individually supporting each pane 1022 and 1024 against the portions, movement of either pane relative to the other is restricted, which reduces the possibility of leakages being formed in assembly 1020**.

Portions **1040*e* and 1040*d* are connected by recessed portion 1040*f* which is spaced away from window glass assembly 1020 to provide a condensation channel substantially along the entire perimeter of assembly 1020**. This condensation channel is for providing an air pocket around the edges of the window glass assembly, which provides insulation and reduces thermal transfer.

It will be appreciated that in lieu of portions **1040*d*, 1040*e*, and 1040*f***, a planar portion could be provided with rubber stops interspersed along the channel as is found in many conventional constructions. However, it is believed that the support of the individual panes substantially along their entire perimeters, while retaining a condensation channel therebetween, offers significant structural advantages over conventional rubber stop constructions given the additional support provided thereby.

Between channels 1041 and 1043, a pair of reinforcing portions **1040*n* and 1040*p* extend between portions 1040*m* and 1040*f* defining channels 1041 and 1043, respectively. The purpose of these portions is to reinforce the member and form three chambers through the cross-sectional profile of member 1040. By forming these chambers, thermal transfer through the member is reduced, thus improving the insulating capability of member 1040**.

A grooved portion **1040*h* is preferably formed on the interior side of member 1040 facing window glass assembly 1020**. The purpose of this groove, which runs substantially along the entire perimeter of the sash, is for accepting one or more pins provided on a decorative grill.

Many conventional constructions utilize individual grommets for receiving the pins on the grill. This typically requires an additional step during assembly of the window for individually drilling the grommets. Furthermore, this typically requires an exact correspondence between the grill and the window.

However, by providing a groove along the perimeter of the sash, the grill in the preferred construction may be secured to the sash at any point along the groove. This is especially important for replacement and custom window applications, since the size of the grill will typically change for different window sizes. Furthermore, this allows different types of grills, for example square shaped, diamond shaped, etc., to be used on the same sash without requiring different spacing of grommets along the perimeter of the sash. The groove along the sash is also less distinct than separate grommets, thereby improving the appearance of the sash.

As seen in FIG. 42, it is preferable to gusset portions of the profile (e.g. at the junctions between portions **1040*k* and 1040*m* and 1040*j* and 1040*m***) and to round off some corners and taper the chambers in the profile, all of which tend to strengthen the mandrel in the extrusion die used to form the lineal member. Also, it is preferable for each portion of the profile to have a similar thickness so that each portion will tend to extrude from the extrusion die at a similar rate and produce a substantially straight extruded lineal member.

The above-described cross-sectional profile of sash member 1040 provides an extremely strong and well insulated, yet lightweight construction. Further, by including insulating chambers formed in the profile, the member may be provided with excellent structural integrity using a minimum amount of materials, thus providing cost savings without sacrificing structural performance.

Furthermore, the profile of member 1040 provides most, if not all, of the necessary structural components for the assembly and operation of the window sash. Since all of these components and features are preferably molded into the profile during the extrusion, the number of additional components and process steps which are typically necessary to manufacture a window are reduced, thus providing substantial savings in cost and complexity.

Components In Assembled Sash and Window Assembly

FIG. 42 also shows the components of a finished assembly with the window glass assembly secured in the glass receiving channel 1043 of member 1040. Window glass assembly 1020 is preferably a double paned insulated glass unit which is generally known in the art. However, it will be appreciated that other glass assemblies, including single or triple pane units, may be used. Separate interior and exterior panes 1022 and 1024 are provided in the assembly. These panes may be coated for UV protection, tinting, etc., as is known in the art. A spacer 1026 is disposed between the panes around their perimeters with silicone sealant disposed upon both sides thereof. The spacer is preferably formed of aluminum or stainless steel, and it operates to seal the unit, preferably under a partial vacuum with argon or another insulating gas disposed therein. Various constructions of window assemblies are known in the art.

It may be preferable to include a filler around the inner surface of channel 1043 to aid in securing window glass assembly 1020 to member 1040. This is shown as filler material 1047 in FIG. 42. Filler 1047 is preferably formed of silicone adhesive sealant, and is typically applied along the interior of glass receiving channel 1043 prior to assembly, typically disposed in individual puddles at quarter points along each window receiving channel. The condensation channel formed between the window receiving channel 1043 and the window glass assembly 1020, however, preferably remains substantially free of material except at the puddles of filler material disposed along the channel.

As also is shown in FIG. 42, a silicone sealant 48 is preferably filled between exterior pane 1024 and ramp 1040*c* on member 1040. The silicone seal not only seals the unit around the perimeter of the glass, but it also assists in adhering the window glass assembly within member 1040. It may also be preferable to include a back fill material of silicone adhesive sealant on the interior side of the window to further increase the structural bond and insulation between member 1040 and window glass assembly 1020.

Mortise and Tenon Joint Structure

As discussed above, separate rail and stile sash members are used in the preferred joint structure having the appearance of a mortise and tenon joint. FIGS. 43–45 show a stile sash member 1050, and FIGS. 46–48 show a rail sash member 1040.

Stile Sash Member

As seen in FIGS. 43–45, stile sash member 1050 has the same profile as shown in FIG. 42. For example, similar to portions 1040*a* and 1040*b*, portions 1050*a* and 1050*b* form the exposed surfaces on the exterior and interior sides of member 1050.

A flange 1056 is provided on member 1050 which is a continuation of interior portion 1050*b* at each end of member 1050. As seen in FIG. 45, the flange may also include material from portion 1050*g*, which roughly corresponds to portion 1040*g* in FIG. 42. The flange preferably overlaps a recess formed on an adjacent stile sash member to give the appearance of a mortise and tenon joint structure. It will be appreciated that the flange may be located on either side of member 1050.

A squared end surface 1052 is provided at the end of flange 1056, which is oriented in a plane which is generally orthogonal to the longitudinal axis of member 1050. This end surface generally forms the decorative surface which defines the visible joint structure for the sash. It will be appreciated that the decorative surface may have many different surface contours and orientations for providing different decorative/architectural features on the interior side of the sash.

A mitered, mating portion 1051 also extends from each end of member 1050. Mating portion 1051 preferably spans from the exterior side of member 1050 to flange 1056 and is terminated in a mating surface 1054 which is for mating with a similar surface on member 1040 and forming the structural connection between the members. Mating surface 1054 preferably is a planar surface extending generally transverse to the interior and exterior sides of window 1010 at a 45 degree angle with respect to the longitudinal axis of member 1050. However, one skilled in the art will appreciate that mating surface 1054 may have any number of surface contours which can mate with another surface to form a structural connection therewith.

Rail Sash Member

FIGS. 46–48 show a rail sash member 1040 for mating with the stile sash members 1050. Member 1040 has the profile shown in FIG. 42, which is preferably identical to the profile of stile sash members 1050. Therefore, both components may be formed from the same lineal extrusions.

Rail sash member 1040 includes a mitered, mating portion 1045 disposed at each end thereof. Each mating portion 1045 preferably spans inward from the exterior side of member 1040, and each mating portion preferably has the same width as mating portion 1051 on member 1050. By "width", we mean the distance in the direction extending between the interior and exterior sides of members 1040 and 1050.

Mating portion 1045 is terminated in a mating surface 1057 which is for abutting and mating with surface 1054 on member 1050 to form the structural connection between the members. Mating surface 1057 preferably is a planar surface extending generally transverse to the interior and exterior sides of window 1010 at a 45 degree angle with respect to the longitudinal axis of member 1040. However, one skilled in the art will appreciate that mating surface 1057 may have any number of surface contours which can mate with a similarly configured surface 1054 to form a structural connection therewith. Further, it will be appreciated that since members 1040 and 1050 preferably have identical cross-sectional profiles, the mating surfaces 1054 and 1057 will typically match up to one another substantially throughout the junction therebetween.

In the preferred embodiment, a recessed surface 1059 is defined on the interior side of mating portion 1045 by portions 1040*g* and 1040*k* (shown in the cross-sectional profile of FIG. 42). Furthermore, a second squared end surface 1058 is preferably oriented on the interior side of member 1040 in a plane which is generally orthogonal to the longitudinal axis thereof. The recessed surface 1059 and squared end surface 1058 therefore define a recess on the interior side of member 1040 for receiving flange 1056 on member 1050.

Squared end surface 1058 preferably abuts the squared end surface of flange 1056 to cooperatively form the decorative surface which defines the visible joint structure for the sash. As discussed above, different surface contours may be utilized to provide different decorative features on the interior side of the sash.

As shown in FIGS. 44 and 47, mating portions 1045 and 1051 on members 1040 and 1050, respectively, preferably include a welding or mating surface on both sides of the glass receiving channel on each member. For example, at least parts of portions 1040*k* and 1040*g* (as shown in FIG. 42) preferably form a portion of the mating surface of member 1040. In the preferred embodiment, this results in mating portions which span about 85–90% of the overall width of the sash members. While it is not necessary to provide mating surfaces on each sides of the glass receiving channel of a member, it is believed that a stronger structural connection between members 1040 and 1050 will be provided therefrom.

Manufacturing and Assembly Process

The manufacturing and assembly process for producing a sash and window assembly consistent with the invention is described hereinafter. The first step in the process is to extrude a lineal component having the cross-sectional profile shown in FIG. 42. The extrusion process is generally disclosed in the aforementioned U.S. Patent Applications to Deaner et al. and Puppin et. al. In addition, separate extrusions of decorative coating 1042 and flexibles 1046*a* and 1046*b* are also separably provided during the extrusion process, in a manner generally known in the art.

After lineal extrusions have been generated using the extrusion process described above, individual sash members are cut to the correct size for the particular size of sash to be constructed. The size of each member will typically be dictated by the desired size of window sash. Furthermore, where the sash members are formed of heat weldable material which commonly forms flashing during heat welding, the size of the members may need to compensate for the amount of material which collapses and forms flashing during the welding process. This additional factor bearing on the correct sizing of members is discussed below in the section entitled “Controlled Collapse of Sash Members”.

For stile sash members such as member 1050 shown in FIGS. 43–45, the flanges and mating surfaces of the members are preferably formed by a series of cope head and trim saw operations. The cope head preferably rotates about an axis perpendicular to the surface of the flanges and includes a profile corresponding to the shape of the desired mating surfaces. The cope head will then be run across the mating portions at an angle corresponding to the desired angle of mating surfaces (45 degrees in the preferred embodiment). It will be appreciated that a separate trimming operation for the end surfaces of the flange will typically be required when additional flashing material is provided at the end of the mating surfaces since this additional material will typically project beyond the flanges at the ends of the member (see, e.g., FIG. 43). It will also be appreciated that ends of the flanges may need to be cut or shaped in an additional process to modify their exposed contours.

For rail sash members such as member 1040 shown in FIGS. 46–48, the mating surfaces and recesses of the members are preferably formed by a series of cope head and cutting operations. The cope head preferably rotates about an axis perpendicular to the interior and exterior surfaces of the mating portions and includes a profile corresponding to the shape of the desired recesses of the member. The cope head will then be run across the mating portions at an angle corresponding to the desired angle of the end surfaces defining the recess (90 degrees in the preferred embodiment). Next the member is preferably cut by a saw blade to form the mating surface (e.g., at a 45 degree angle in the preferred embodiment).

It will be appreciated that different manufacturing techniques and combinations thereof which are known in the art may be used to form the surfaces at the ends of the sash members, such as with a router, jump dado, scoring saw, trim saw, cope head, etc. The particular processes used will vary upon the contours and dimensions of the mating portions, flanges and recesses defined at the ends of each member.

After the individual rail and stile members have been cut to size, the next step in the preferred process is to apply the silicone sealant filler material 1047 if it is so desired. This step occurs by a hydraulic pump gun application process, whereby puddles of sealant are preferably placed proximate the quarter points within the glass receiving channel of each member.

The next step is to heat weld the sash members to one another with the window glass assembly 1020 retained therein. Similar to the aforementioned German process, the window glass assembly and sash members are placed in a heat welding machine in a generally common plane with the sash members oriented around the perimeter of the assembly. The machine is then actuated to clamp the individual members, insert heating platens horizontally between the members, and then force the members toward the glass and the heating platen to plasticize the mitered surfaces of the sash members.

One of the heating platens used to plasticize the mating surfaces of the sash members is shown in FIG. 51. Heating platen 1070 is preferably an aluminum block with a non-stick coating and includes opposing surfaces 1071*a* and 1071*b* for heating mating surfaces 1054 and 1057 of members 1050 and 1040, respectively. Preferably, heating platen 1070 includes a notch or recess 1072 for receiving the window glass assembly therein such that substantially all of the mating surfaces are able to abut the heating surfaces of platen 1070 while the window glass assembly is at least partially disposed within the glass receiving channels formed therein.

Platen 1070 further includes a second recess 74 formed in the first side 1071*a*. This recess is sized and configured to receive flange 1056 on interior side 1050*b* of member 1050. By virtue of this recess, the decorative end surface of the flange does not contact any heating surface while mating surface 1054 abuts surface 1071*a* of platen 1070. Consequently, flange 1056 is not plasticized and deformed during the heating process.

Once the mating surfaces of the sash members are sufficiently heated to be plasticized, the sash members are partially withdrawn, while the platens are fully withdrawn therefrom. Next, the sash members are forced together with their opposing mating surfaces in pressurized contact, such that the plasticized material forms a butt weld with the window glass assembly held within the glass receiving channel in the sash members. The plasticized material typically collapses to an extent and forms flashing around the edges of the mating surfaces. However, as discussed later, the extent and flow of the flashing may be controlled in the preferred construction.

It will be appreciated that the particular heat welding parameters used, e.g., temperature and time of heating and butt welding the members, and the pressure applied to the members during heating and butt welding, will vary depending upon the composition, size, etc. of the members.

Preferably, the window glass assembly is oriented to ride along the ramp formed by portion 1040*c* as shown in FIG. 42. Typically, this is performed by orienting the window glass assembly approximately 1/16 inch toward the exterior side of the sash members during insertion. When the window glass assembly is inserted into the channel, the ramp formed by portion 1040*c* compresses the window glass assembly against the flexibles 1046*a* and 1046*b* until the edge of the assembly abuts end portions 1040*d* and 1040*e*. By operation of the ramp and flexibles, the window glass assembly is substantially retained within the sash members and without a great deal of available movement.

Once the sash members have been heat welded with the window glass assembly retained therein, the next step is to remove any flashing formed about the mating surfaces, for example using knives, sanding, etc. Then, the silicone seal is applied to the exterior side between the window glass assembly and portion 1040*c* by a pump gun application process. Also, if desired, a back fill is applied to the interior side between window glass assembly 1020 and portion 1040*g* by a pump gun application process.

An additional step which may be useful is to cap the outer channel and/or the exposed ends of the members with a plastic cap or plug for cosmetic purposes. For example, for a double hung type window assembly, it may be preferable to cap the outer channels of the rail sash members (which are typically not used to retain mounting hardware as are the stile sash members in this type of window). The caps may also include components to form the interlock between sashes, e.g. to provide the seals therebetween. Other cosmetic attachments and components for improving the decorative appearance of exposed portions of the sash members will be appreciated by one skilled in the art.

While the preferred method of connecting the members is a heat welding process, it will be appreciated that other connecting means utilizing fasteners or adhesives, for example, or utilizing other processes such as welding, etc. may be used. Further, it will be appreciated that the specific process used to interconnect the sash members may depend upon the particular materials, e.g., metals, woods, plastics, etc., used for the sash members.

It can be seen that by virtue of the above process, a substantially modular system of constructing custom-sized windows may be provided. Furthermore, a common profile, using identical lineal construction may he used for each of the custom-sized sash members. It will also be appreciated that significant cost savings are provided by using a minimum number of components with a high degree of commonality of parts, and a minimum number of automatable processing steps, to construct the custom-sized assemblies.

Furthermore, it will be appreciated that the exterior side of the finished sash and window assembly will have the appearance as shown in FIG. 41 (i.e., with mitered joint structures), while the interior side will have the appearance of a mortise and tenon joint structure as shown in FIG. 40. In addition, given the ability to have separate mating and decorative surfaces for the joint structures described herein, it will be appreciated that any number of architectural/decorative surfaces may be constructed by the principles of the invention.

Controlled Collapse of Sash Members

Members 1040 and 1050 are preferably constructed of the aforementioned composite material, which tends to collapse and form flashing during heat welding. Therefore, it is preferable to compensate for the material lost from heat welding to correctly size the finished product. In particular, it is preferable to include additional material at the ends of the mating portions on each member.

For example, as seen in FIG. 43, flashing portions 1053 are provided at the ends of mating portions 1051 of member 1050. Similarly, as seen in FIG. 46, flashing portions 1055 are provided at the ends of mating portions 1045 of member 1040. In the preferred embodiment, the flashing portions 1053 and 1055 extend inwardly between 2 and 5 mm, more preferably about 3 mm, from mating surfaces 1054 and 1057.

Figure 49:
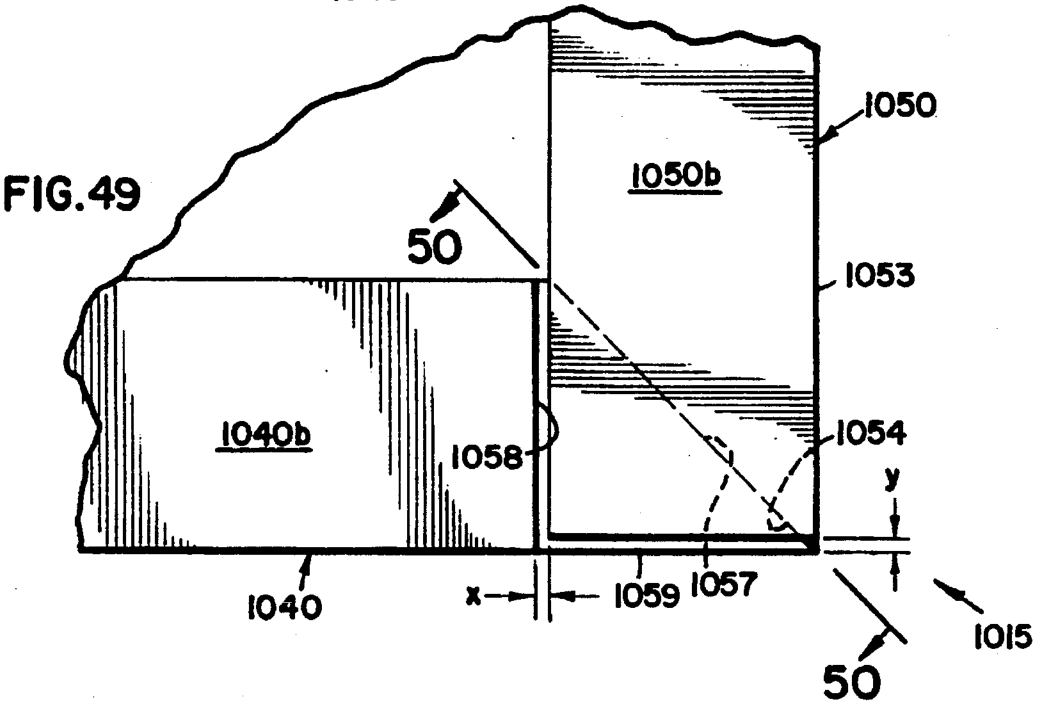
FIG. 49 is a partial fragmentary elevational view of an interior side of a joint structure between the stile and rail sash members of FIGS. 43–45 and 46–48 prior to heat welding.
Figure 50:
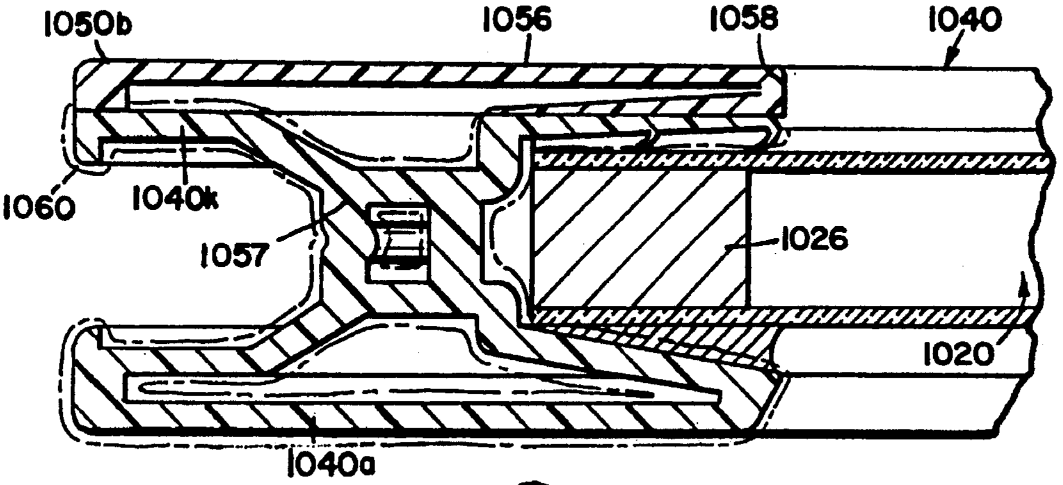
Figure 49:
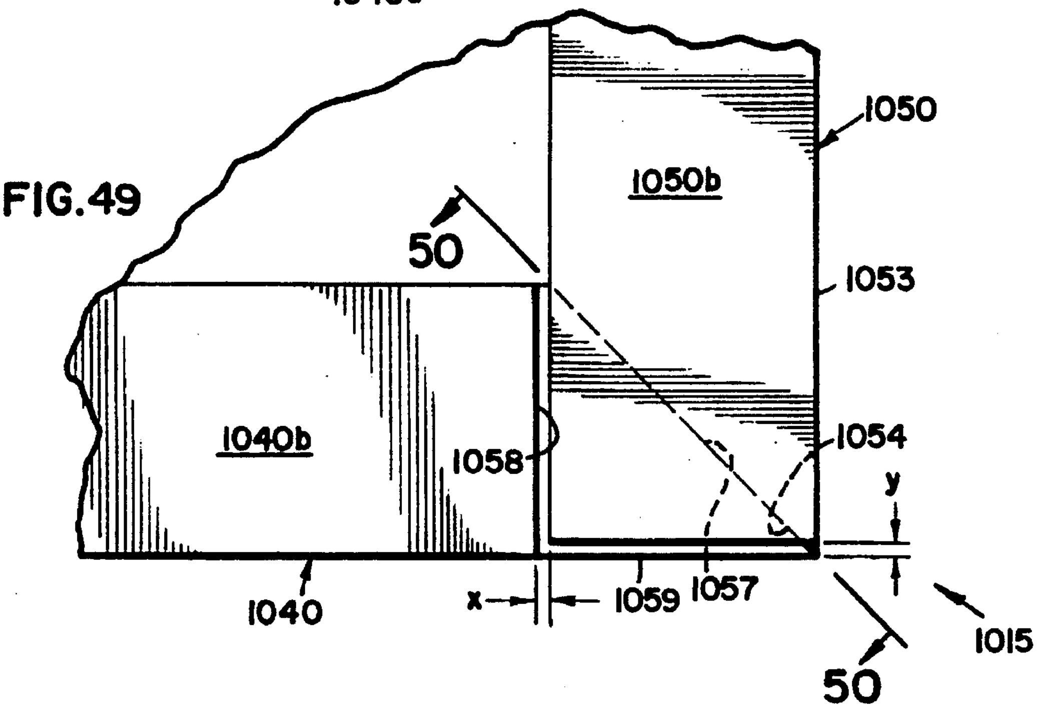

FIG. 49 shows joint structure 1015 prior to the heat welding operation with members 1040 and 1050 placed in an abutting relationship with mating surfaces 1054 and 1057 opposing one another and with flange 1056 overlapping the recess formed by surfaces 1058 and 1059. The inclusion of flashing portions 1053 and 1055 results in gaps of x and y between members 1040 and 1050 as shown in FIG. 49.

After heat welding, the flashing portions 1053 and 1055 will collapse and form flashing material which is expelled from the junction between mating surfaces 1054 and 1057. The flashing is preferably removed by a subsequent flashing removal process, e.g., by cutting or sanding, so that the joint structure will have the appearance shown in FIG. 40, with gaps x and y closed and flange 1056 cleanly abutting the squared end surface 1058. Therefore, through proper sizing of the flashing portions of the members, as well as proper control of the heat welding parameters, a controlled collapse of the flashing portions may be performed, resulting in a properly sized sash circumscribing the window glass assembly.

Controlled collapse of members 1040 and 1050 may also be important where a non-collapsible and non-heat weldable decorative coating, such as a wood veneer, is provided on one or more surfaces of the members. In this situation, the coating would be removed from the flashing portions, or alternatively, could be selectively deposited to leave these portions exposed in the first place. Then, after controlled collapse, the edges of the decorative coatings could abut one another and form a clean and aesthetically pleasing junction therebetween.

The preferred joint structures and methods of construction therefor offer several advantages over many conventional designs. For example, the preferred joint structures include mating surfaces and decorative surfaces which have portions that are substantially non-coplanar from one another. This allows design of a decorative joint structure with a particular architectural design (i.e., the structure which is visible on a completed assembly) independent of the design of the mating surfaces which form the structural junction between members. Therefore, the architectural/decorative and functional aspects of the preferred joint structures may be maximized independently from one another without significant tradeoffs.

For example, it has been found that mating surfaces which are planar, orthogonal to the plane of the window glass assembly, and angled at 45 degrees from the longitudinal axis of the members (such as are shown in FIGS. 43–45 and 46–48), form generally strong connections therebetween and are particularly easy to heat weld in the automated process discussed herein. Nonetheless, any desired decorative joint structure, such as the preferred joint structure having a mortise and tenon look, may be independently designed by modifying the contours of the flanges and recesses formed on the members.

Figure 50:
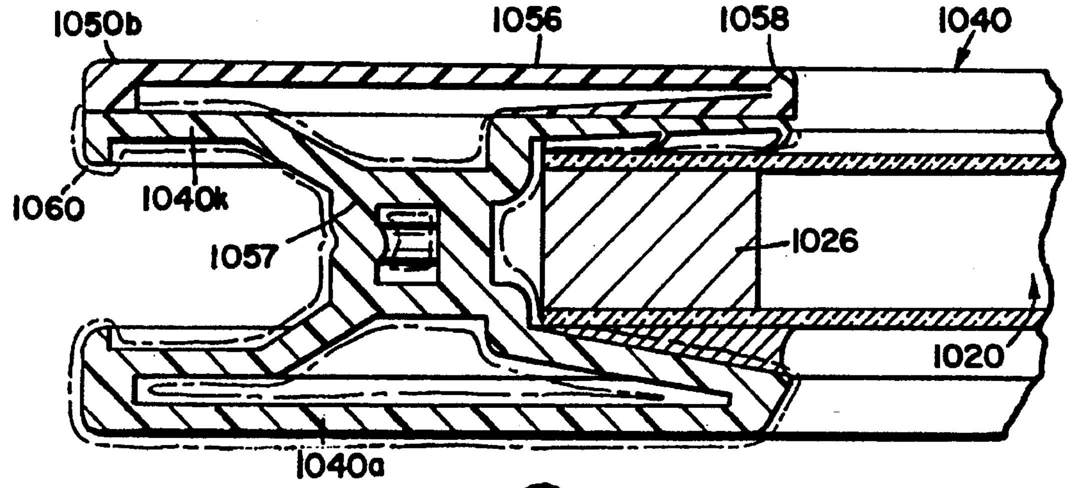
FIG. 50 is a cross-sectional view of the joint structure of FIG. 49 after heat welding, taken along line 6—6 thereof.

In addition, as shown in FIG. 50, it has been found that the preferred joint structures also offer the advantage that flashing is preferably diverted away from the interior surface by flange 1056. FIG. 50 shows a cross section of joint structure 1015 after the heat welding operation, where the flashing portions have collapsed and formed flashing 1060 about the junction formed between mating surfaces 1054 and 1057 (surface 1054 not shown in FIG. 50).

As discussed above, the flashing 1060 may be removed by a subsequent removal operation. However, it will also be noted that little or no material will be expelled onto the interior surface of the window sash, and will therefore not mar the interior surface, since flange 1056 substantially overlaps the junction between mating surfaces 1054 and 1057 proximate the interior side thereof.

It will be appreciated that plasticized material under pressure will take the path of least resistance, and therefore, by overlapping one junction, flashing material will tend to be expelled out of other exposed portions of the junction between mating surfaces 1054 and 1057, such as on the exterior side of the sash members, as well as within the glass receiving and outer channels thereof. The flashing material may then be removed from areas in which cosmetic appearance is not a significant concern, rather than requiring material to be removed from the decorative interior surface of the sash.

various modifications and changes may be made to the preferred embodiments without departing from the spirit and scope of the invention. For example, as discussed above, a wide variety of architectural/decorative and functional junctions may be formed independently of one another in a joint structure consistent with the invention. Decorative or functional junctions which include curved, mitered, squared, offset, etc. components may be constructed consistent with the invention.

Figure 52:
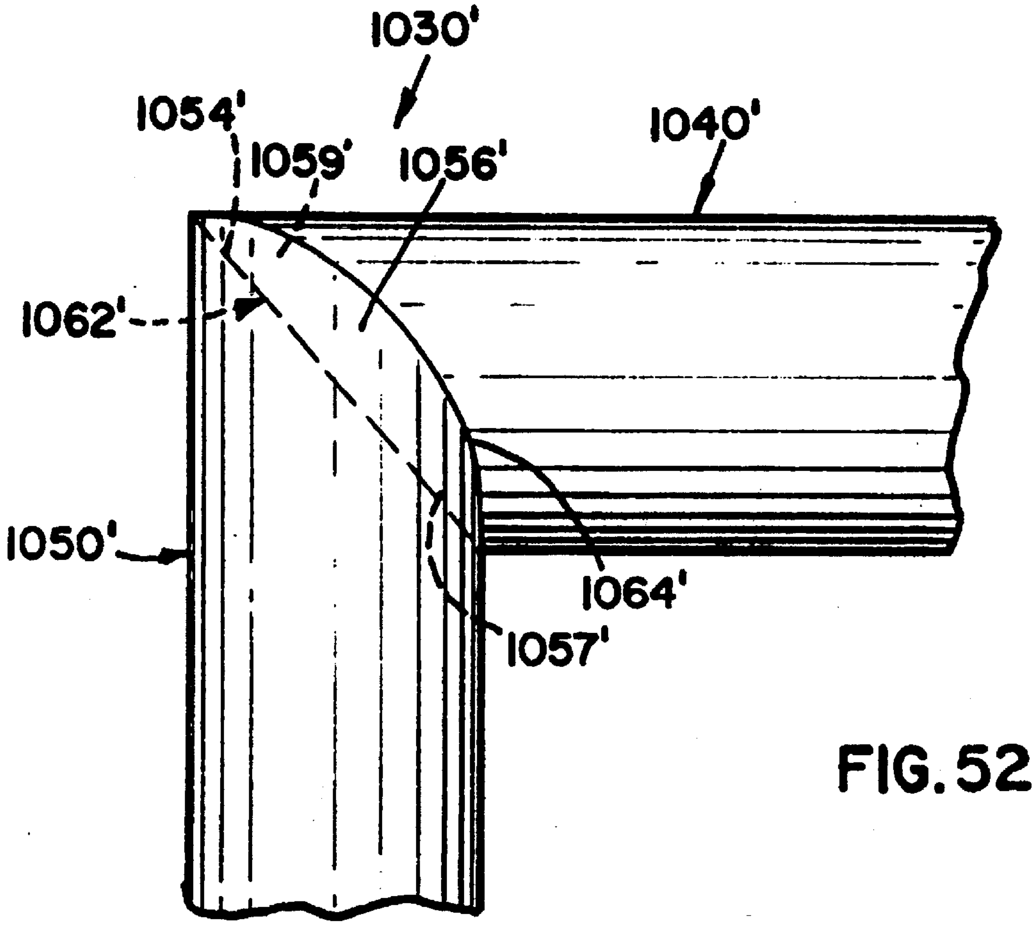
FIG. 52 is a partial fragmentary elevational view of an alternate joints structure consistent with the invention.

For example, as seen in FIG. 52, one alternative joint structure is shown for sash 1030' which includes members 1040' and 1050'. Member 1040' includes a mitered mating surface 1057' and a recessed surface 1059'. Member 1050' includes a similarly configured mitered mating surface 1054' with a curved flange 1056'. Members 1040' and 1050' are joined to form independent decorative and functional junctions 1064' and 1062', respectively.

It will also be appreciated that decorative junctions, such as defined by a flange and recess configuration disclosed herein, may be formed on the exterior side of a sash either in lieu of or in addition to the decorative junction formed on the interior side of the sash. For example, each end of a member could include either opposing flanges or recesses, or alternatively, each end could include a recess opposing a flange. In each configuration, the design of the decorative appearance of each side of the sash could be made independent of the design of the functional junction between the members. Furthermore, it is believed that by providing flanges overlapping the mating surfaces on both sides thereof, substantially all of the flashing material could be diverted away from the interior and exterior surfaces of the sash.

Various aspects of the present invention are described beneath specific headings within the Detailed Description of the Preferred Embodiment. These headings are included simply to assist the Examiner and anyone else who may wish to read this disclosure and should not be construed to limit any aspect of the present invention. The present invention is also described with reference to particular embodiments and applications. However, those skilled in the art will recognize additional embodiments and applications of the present invention. Accordingly, the present invention is to be limited only to the extent of the following claims:

I claim:

1. A window frame support, comprising:

a base designed to rest against a surface;

a beam designed to support a window frame at a first angle relative to said surface;

a hinge interconnecting said base and said beam at a second angle relative to one another; and a wall extending substantially perpendicular from said beam to a wall retaining means on said base, wherein said wall has a length that is selectively variable in order to approximately equate said second angle with said first angle.

2. A support according to claim 1, wherein said wall, said beam, and said base cooperate to define a substantially triangular support.

3. A support according to claim 1, wherein said wall, said beam, said hinge, and said base are integrally joined to one another.

4. A support according to claim 1, wherein said wall retaining means includes a pair of flanges extending substantially perpendicular from said base toward said beam and spaced just far enough apart to receive a distal end of said wall therebetween.

5. A support according to claim 1, wherein said wall has a distal edge that engages said wall retaining means, and grooves extend across said wall substantially parallel to said distal edge to facilitate cutting across said wall to reduce said length.

6. A support according to claim 1, wherein said wall, said beam, said hinge and said base are integrally joined to one another and cooperate to define a substantially triangular support, and said wall has a distal edge that engages said wall retaining means, and grooves extend across said wall substantially parallel to said distal edge to facilitate cutting across said wall to reduce said length and thereby reduce said second angle.

7. A window frame support, comprising:

a base extending from a first base end to a second base end and designed to rest against a surface;

a beam extending from a first beam end to a second beam end and designed to support a window frame at a first angle relative to said surface;

a first interconnecting means for interconnecting said first base end and said first beam end proximate one another; and a second interconnecting means for interconnecting said second base end and said second beam end at a selectively variable distance from one another and thereby allowing a second angle, defined between said base and said beam, to be adjusted to approximate said first angle.

8. A support according to claim 7, wherein said base, said beam, and said first interconnecting means are integrally joined to one another.

9. A support according to claim 8, wherein said first interconnecting means is a living hinge.

10. A support according to claim 7, wherein said second interconnecting means includes a downwardly extending flange on said beam and an upwardly extending member on said base, and said downwardly extending flange contacts said base proximate a side of said member relatively nearer to said first interconnecting means.

11. A support according to claim 10, wherein said first interconnecting means includes a hinge.

12. A support according to claim 11, wherein a distal portion of said downwardly extending flange is removed along a line parallel to said hinge to adjust said second angle.

13. A window assembly, comprising:

a window sash;

a window frame that extends about and supports said window sash and provides a substantially horizontal surface beneath said window sash when the window assembly is properly oriented;

a generally planar, window sill engaging member designed to rest upon an existing window sill that defines a sill angle relative to the horizontal surface when the window assembly is properly oriented;

a generally T-shaped, window frame engaging member having a main beam that supports said window frame and a transversely oriented flange that extends in opposite directions from one end of said main beam; and a hinge that interconnects an opposite end of said main beam to an end of said sill engaging member, wherein a downwardly extending portion of said flange engages said sill engaging member and thereby limits pivoting of said beam toward said sill engaging member, and increments of said downwardly extending portion are selectively removable so that said downwardly extending portion can be sized to limit pivoting of said beam toward said sill engaging member to a relative orientation wherein said beam and said window sill define said sill angle therebetween.

14. A window assembly according to claim 13, wherein said increments are delineated by grooves extending across said downwardly extending portion of said flange and parallel to said beam.

15. A window assembly according to claim 13, wherein an upwardly extending portion of said flange is disposed just outside a downwardly extending member on said window frame when said window frame is properly supported on said frame engaging member.

16. A window assembly according to claim 13, wherein at least two legs extend downward from said window frame and into contact with said frame engaging member.

17. A window assembly according to claim 13, wherein a member extends upward from said sill engaging member and just outside said downwardly extending portion of said flange to limit downward movement of said downwardly extending portion relative to said sill engaging member.

18. A window assembly according to claim 17, wherein said sill engaging member includes a distal panel disposed downhill from said member and through which fasteners may be driven in order to secure said sill engaging member relative to said sill.

19. A method of installing a replacement window within an existing window pocket having a sill disposed at a sill angle relative to horizontal, comprising the steps of:

securing a base relative to the sill in such a manner that a hinge at one end of the base is uphill on the sill, and a beam extending from an opposite end of the hinge is disposed above the base;

pivoting the beam relative to the base in such a manner that an excessively long wall extending downward from the beam engages the base;

assessing how much of a distal portion must be removed from the wall so that the wall will be properly sized and the beam will be substantially horizontal when the wall engages the base;

pivoting the beam relative to the base in such a manner that the excessively long wall extending from the beam disengages the base;

removing the distal portion;

pivoting the beam relative to the base in such a manner that the properly sized wall engages the base; and resting the replacement window on the substantially horizontal beam.

20. A method according to claim 19, further comprising the step of arranging the replacement window relative to the beam in such a manner that an upwardly extending continuation of the wall is adjacent and outside a downwardly extending flange on a frame portion of the replacement window.

* * * * *

UNITED STATES PATENT AND TRADEMARK OFFICE

CERTIFICATE OF CORRECTION

PATENT NO. : 5,491,940

DATED : February 20, 1996

INVENTOR(S) : Bruchu

It is certified that error appears in the above-indentified patent and that said Letters Patent is hereby corrected as shown below:

On the title page, item [63]: Related Application Data, insert 08/243,981 filed May 17, 1994--

On column 1, line 31, please delete "According" and substitute therefore --Accordingly--

On column 13, line 1, please delete "of" after the word "window"

On column 13, line 6, please insert --is-- after the word "as"

On column 15, line 65, please delete "simple" and substitute therefore --simply--

On column 18, line 66, please delete "and or" and substitute therefore --and/or--

On column 19, line 63, please delete "a" after the word "in"

On column 20, line 65, please delete "89" and substitute therefore --891--

On column 21, line 13, please delete "is" and substitute therefore --are--

On column 21, line 13, please delete "has" and substitute therefore --have--

On column 21, line 43, please delete "eight-eight" and substitute therefore --eighty eight--

UNITED STATES PATENT AND TRADEMARK OFFICE
CERTIFICATE OF CORRECTION

PATENT NO. : 5,491,940

DATED : February 20, 1996

INVENTOR(S) : Bruchu

It is certified that error appears in the above-indentified patent and that said Letters Patent is hereby corrected as shown below:

On column 28, line 22, please insert --the-- after the word "on"

On column 28, line 44, please insert --to-- after the word "directed"

On column 33, line 26, please delete "sides" and substitute therefore --side--

On column 37, line 40, please delete "various" and substitute therefore --Various--

Signed and Sealed this

Twentieth Day of August, 1996

*Attest:*

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,491,940
DATED : February 20, 1996
INVENTOR(S) : Bruchu

It is certified that error appears in the above-indentified patent and that said Letters Patent is hereby corrected as shown below:

On the title page, item [63]: Related Application Data, delete 08/243,981 filed May 17, 1994--

On column 1, line 31, please delete "According" and substitute therefore --Accordingly--

On column 13, line 1, please delete "of" after the word "window"

On column 13, line 6, please insert --is-- after the word "as"

On column 15, line 65, please delete "simple" and substitute therefore --simply--

On column 18, line 66, please delete "and or" and substitute therefore --and/or--

On column 19, line 63, please delete "a" after the word "in"

On column 20, line 65, please delete "89" and substitute therefore --891--

On column 21, line 13, please delete "is" and substitute therefore --are--

On column 21, line 13, please delete "has" and substitute therefore --have--

On column 21, line 43, please delete "eight-eight" and substitute therefore --eighty eight--

UNITED STATES PATENT AND TRADEMARK OFFICE
CERTIFICATE OF CORRECTION

PATENT NO. : 5,491,940

DATED : February 20, 1996

INVENTOR(S) : Bruchu

It is certified that error appears in the above-indentified patent and that said Letters Patent is hereby corrected as shown below:

On column 28, line 22, please insert --the-- after the word "on"

On column 28, line 44, please insert --to-- after the word "directed"

On column 33, line 26, please delete "sides" and substitute therefore --side--

On column 37, line 40, please delete "various" and substitute therefore --Various--

This certificate supersedes Certificate of Correction issued August 20, 1996

Signed and Sealed this

Tenth Day of February, 1998

*Attest:*

BRUCE LEHMAN

*Attesting Officer*

*Commissioner of Patents and Trademarks*